United States Patent
Ruggiero et al.

(10) Patent No.: US 12,201,570 B2
(45) Date of Patent: Jan. 21, 2025

(54) SYSTEMS AND METHODS FOR USER CONTROL OF ELECTRONIC CHAIRS

(71) Applicant: Innovative Vending Solutions LLC, Clayton, NJ (US)

(72) Inventors: Richard Ruggiero, Sewell, NJ (US); Gregory Ruggiero, Sewell, NJ (US); Matthew Marino, Mullica Hill, NJ (US); Jonathan M. Ruggiero, Turnersville, NJ (US); Patrick Rice, Broadhead, WI (US)

(73) Assignee: Innovative Vending Solutions LLC, Clayton, NJ (US)

( * ) Notice: Subject to any disclaimer, the term of this patent is extended or adjusted under 35 U.S.C. 154(b) by 927 days.

(21) Appl. No.: 17/191,044

(22) Filed: Mar. 3, 2021

(65) Prior Publication Data

US 2021/0275388 A1    Sep. 9, 2021

Related U.S. Application Data

(60) Provisional application No. 63/058,595, filed on Jul. 30, 2020, provisional application No. 62/985,208, filed on Mar. 4, 2020.

(51) Int. Cl.
*G06Q 20/18* (2012.01)
*A61H 15/00* (2006.01)
(Continued)

(52) U.S. Cl.
CPC ......... *A61H 15/0078* (2013.01); *A61H 37/00* (2013.01); *G06Q 20/18* (2013.01);
(Continued)

(58) Field of Classification Search
CPC .................. G06Q 20/18; A61H 2201/0149
See application file for complete search history.

(56) References Cited

U.S. PATENT DOCUMENTS 9,904,917 B2  2/2018  Ruggiero et al.
10,614,694 B1  4/2020  Zwier et al.
(Continued)

FOREIGN PATENT DOCUMENTS

WO    2020232296 A1   11/2020

OTHER PUBLICATIONS

International Search Report issued in PCT/US2022/029375 dated Aug. 11, 2022.
(Continued)

*Primary Examiner* — Daniel Rodriguez
(74) *Attorney, Agent, or Firm* — Fox Rothschild LLP; Carol E. Thorstad-Forsyth

(57) ABSTRACT

Systems/methods for user control of a vending massage chair. The methods comprise: detecting, by the vending massage chair, when a mobile communication device is located in proximity to the vending massage chair; triggering operations by the vending massage chair to relinquish operational control to the mobile communication device, in response to a detection that the mobile communication device is proximate to the vending massage chair; receiving, by the vending massage chair, a wireless signal that was transmitted from the mobile communication device; performing operations, by the vending massage chair, to relinquish control of at least one massage chair operation to the mobile communication device in response to a reception of the wireless signal; and performing the at least one massage chair operation by the vending massage chair in response to a wireless command issued by the mobile communication device.

20 Claims, 43 Drawing Sheets

(51) Int. Cl.
    *A61H 37/00*     (2006.01)
    *G06Q 20/32*     (2012.01)
    *G06Q 30/0226*     (2023.01)
    *H04W 4/80*     (2018.01)

(52) U.S. Cl.
    CPC ....... *G06Q 20/326* (2020.05); *G06Q 30/0226* (2013.01); *H04W 4/80* (2018.02); *A61H 2201/0149* (2013.01); *A61H 2201/501* (2013.01); *A61H 2201/5017* (2013.01); *A61H 2201/502* (2013.01); *A61H 2201/5025* (2013.01); *A61H 2201/5097* (2013.01)

(56) References Cited

U.S. PATENT DOCUMENTS

| | | | |
|---|---|---|---|
| 10,765,219 B1 | 9/2020 | Cabble et al. | |
| 11,682,256 B2 | 6/2023 | Ruggiero et al. | |
| 2008/0018588 A1 | 1/2008 | Yoshihara et al. | |
| 2008/0185888 A1 | 8/2008 | Beall et al. | |
| 2009/0253969 A1* | 10/2009 | Wu | A61B 5/6887 |
| | | | 601/84 |
| 2011/0055720 A1* | 3/2011 | Potter | G06F 3/0481 |
| | | | 709/217 |
| 2012/0290515 A1* | 11/2012 | Frank | G06F 3/013 |
| | | | 706/12 |
| 2015/0027878 A1 | 1/2015 | Funakawa et al. | |
| 2015/0278786 A1* | 10/2015 | Ruggiero | G06Q 50/06 |
| | | | 601/99 |
| 2017/0105540 A1 | 4/2017 | Jacobs et al. | |
| 2019/0018372 A1 | 1/2019 | Blanckaert et al. | |
| 2019/0029053 A1 | 1/2019 | Quan et al. | |
| 2019/0183722 A1 | 6/2019 | Le et al. | |
| 2019/0290533 A1 | 9/2019 | Le et al. | |
| 2020/0012403 A1* | 1/2020 | Sculley | H04W 4/30 |
| 2020/0085673 A1* | 3/2020 | Seo | A61H 9/0078 |
| 2020/0121556 A1 | 4/2020 | Tian et al. | |
| 2020/0234526 A1 | 7/2020 | Ruggiero et al. | |
| 2021/0007734 A1 | 1/2021 | Kubiak et al. | |
| 2021/0027538 A1 | 1/2021 | Bleyer et al. | |
| 2021/0077346 A1 | 3/2021 | Luong et al. | |
| 2021/0085558 A1* | 3/2021 | Shin | G06V 40/169 |
| 2021/0110257 A1* | 4/2021 | Shin | G06N 3/088 |
| 2021/0219891 A1* | 7/2021 | Zhu | A61B 5/165 |
| 2021/0275388 A1 | 9/2021 | Ruggiero et al. | |
| 2021/0308415 A1* | 10/2021 | Tan | A61B 5/165 |
| 2021/0346237 A1* | 11/2021 | Jin | A61H 15/0078 |
| 2021/0386963 A1* | 12/2021 | Kang | G16H 40/67 |
| 2022/0021571 A1 | 1/2022 | Gao et al. | |
| 2022/0024932 A1 | 1/2022 | Lim et al. | |
| 2022/0039542 A1 | 2/2022 | McGrath | |
| 2022/0215711 A1 | 7/2022 | Ruggiero et al. | |
| 2022/0234210 A1 | 7/2022 | Inada | |
| 2022/0239762 A1* | 7/2022 | Vankipuram | G06F 3/016 |
| 2022/0249322 A1 | 8/2022 | Liu et al. | |
| 2022/0257454 A1 | 8/2022 | Kong et al. | |
| 2022/0395422 A1* | 12/2022 | Le | A61H 9/0078 |
| 2023/0368599 A1 | 11/2023 | Ruggiero et al. | |
| 2024/0033154 A1 | 2/2024 | Park et al. | |

OTHER PUBLICATIONS

International Search Report and Written Opinion issued in PC/US2021/020658 dated Jun. 1, 2021.

International Search Report issued in PCT/US22/21100 dated Jun. 14, 2022.

\* cited by examiner

Relax & Recharge

Massage Selection

Our Massage is the best in the business.
Select The Type of Massage from the following:

Customer Favorites

- Gentile
- Medium
- Intense

Saved Massages

- Nick's Favorite
- Airport Stress

Create Your Own

- Custom Massage

Relax & Recharge

Massage Time

Our Massage is the best in the business.
Select The Amount Of Time Would Like:

- 15 Minutes
- 10 Minutes
- 5 Minutes

Next →

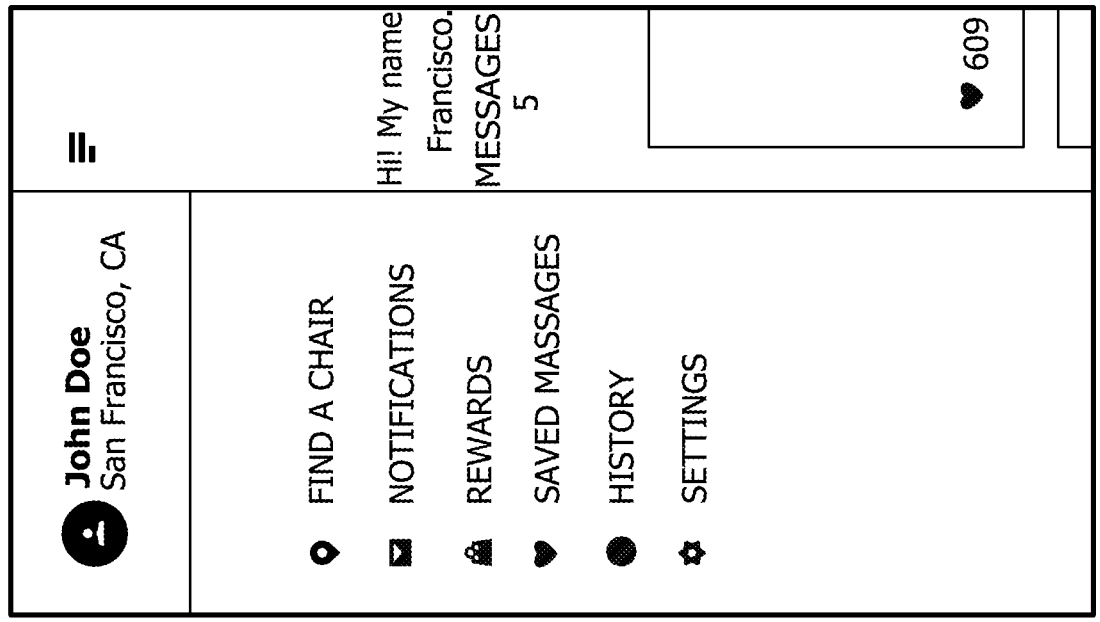
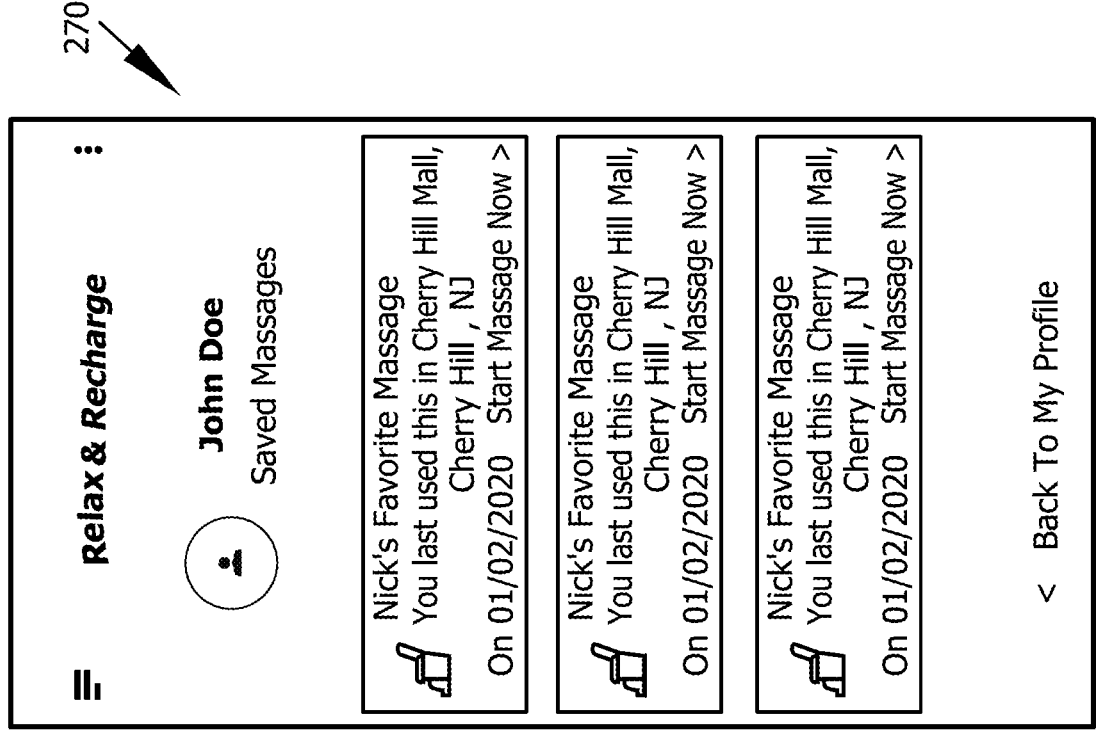
FIG. 28
FIG. 27

FIG. 34

Relax & Recharge

John Doe
Notifications

Customer Service — 2h
Excepteur sint occaecat cupidatat non proident, sunt in culpa qui officia deserunt.

Rewards Earned — 1h
Lorem ipsum dolor sit amet, consectetur.

Thanks For Signing Up! — 5m
Excepteur sint occaecat cupidatat non proident, sunt in culpa qui officia deserunt.

Relax & Recharge

John Doe
Explore Rewards

Explore Our Rewards Program
What can I do with my rewards?
What can I do with my rewards?
What can I do with my rewards?

How it works?
What can I do with my rewards?
What can I do with my rewards?
What can I do with my rewards?

Rewards Work Towards Mall Rides!
You can also use rewards with Zoomaroo Rides Located inside malls Worldwide.
Download the App in the store >

3300

SYSTEMS AND METHODS FOR USER CONTROL OF ELECTRONIC CHAIRS

CROSS-REFERENCE TO RELATED APPLICATIONS

The present application claims the benefit of U.S. Provisional Patent Application No. 62/985,208 entitled "Massage Chair and System Extended for Interactivity via Customer Smart Device" filed on Mar. 4, 2020, and U.S. Provisional Patent Application No. 63/058,595 entitled "Systems and Methods For User Control of Vending Massage Chair" filed on Jul. 30, 2020. The contents of these applications are incorporated herein by reference in their entireties.

BACKGROUND

Statement of the Technical Field

The present document generally relates to electronic chairs (e.g., vending multimedia chairs and/or massage chairs). More particularly, the present solution relates to systems and methods for user control of electronic chairs.

Description of the Related Art

In the art of residential massage chair industry, automated massage chairs may contain internal electronic motors and gears designed to massage the person sitting in them. Some automated massage chairs have some form of controller to vary the type, location, or intensity of massage.

SUMMARY

The present disclosure relates to systems and methods for user control of a vending massage chair. The methods comprise: detecting, by the vending massage chair, when a mobile communication device is located in proximity to the vending massage chair; triggering operations by the vending massage chair to relinquish operational control to the mobile communication device, in response to a detection that the mobile communication device is proximate to the vending massage chair; receiving, by the vending massage chair, a wireless signal that was transmitted from the mobile communication device; performing operations, by the vending massage chair, to relinquish control of massage chair operation(s) to the mobile communication device in response to a reception of the wireless signal; and performing the massage chair operation(s) by the vending massage chair in response to a wireless command issued by the mobile communication device.

The massage chair operation(s) can include, but is (are) not limited to, an operational mode change (e.g., a change from a power save mode to another mode in which a service is provided), a massage service operation (e.g., control of rollers, motors, air bladders and/or hydro massage components), a media service operation (e.g., selection and output of media (audio, visual and/or tactile media)), a charging operation (e.g., enablement of a charger for charging an internal battery of an external device), an advertisement operation (e.g., selection and/or display of advertisements), a survey operation (e.g., selection, display and/or completion of surveys), or a diagnostic operation (e.g., calibration of massage components, circuit fault/error testing, circuit fault/error repairs, and/or fault/error reporting).

In some scenarios, the methods also comprise performing operations by the vending massage chair to validate an identification of the person who is in possession of the mobile communication device. The vending massage chair relinquishes control of the at least one massage chair operation when the identification of the person is validated.

In those or other scenarios, the methods further comprise: transmitting a wireless signal from the vending massage chair to cause the mobile communication device to provide haptic feedback for notifying a user that the massage chair operation has been initiated, completed or terminated.

In those or other scenarios, the methods comprise: detecting, by the vending massage chair, an emotional state of a user of the mobile communication device using at least one of artificial intelligence and a machine learning algorithm. The emotional state of the user may be detected based on (i) images captured by a camera of at least one of the vending massage chair and the mobile communication device, (ii) audio captured by a microphone of at least one of the vending massage chair and the mobile communication device, and/or (iii) information specifying user inputs to the mobile communication device. The massage chair operation(s) may be modified, adjusted or changed based on the detected emotional state of the user.

Additionally or alternatively, the vending massage chair may: enable or disable at least one internal circuit (e.g., a light device) responsive to the detected emotional state of the user; and/or generate a recommendation for characteristics of a massage service based on the detected emotional state of the user. The recommendation may be output from the vending massage chair and/or the mobile communication device.

The implementing systems comprise a processor, and a non-transitory computer-readable storage medium comprising programming instructions that are configured to cause the processor to implement a method for user control of a vending massage chair.

BRIEF DESCRIPTION OF THE DRAWINGS

The present solution will be described with reference to the following drawing figures, in which like numerals represent like items throughout the figures.

FIGS. 7-36 provide illustrations showing illustrative Graphical User Interfaces ("GUIs") that are useful for understanding operations of software application(s) installed on mobile communication device(s).

DETAILED DESCRIPTION

Figure 1:
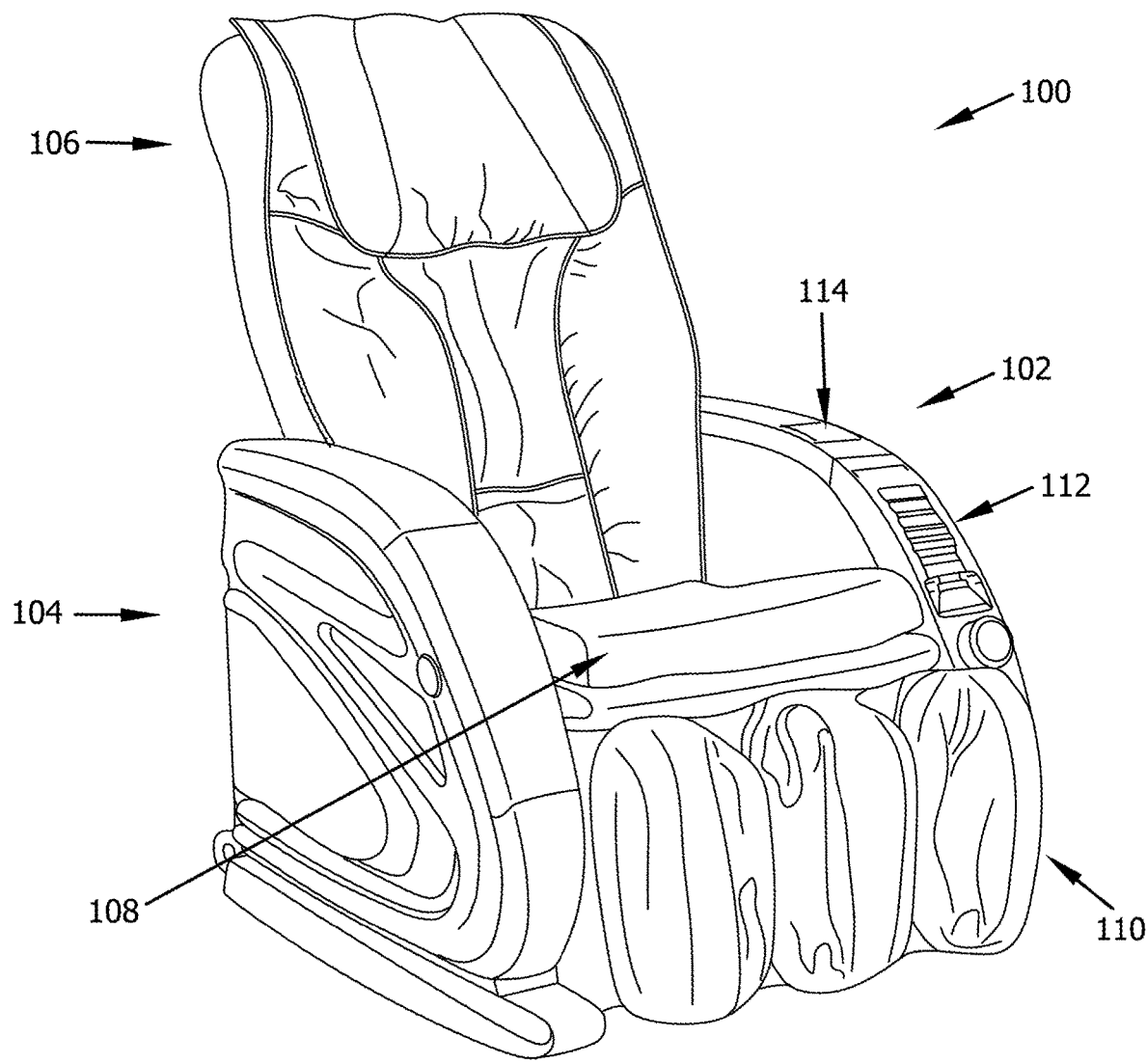
FIG. 1 provides an illustration of an illustrative vending massage chair.

The present invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The present solution relates generally to electronic chairs and user control of the same. The electronic chairs can include, but are not limited to, multimedia chairs (e.g., vending massage chairs). The multimedia chairs can include vending multimedia chairs in which customers pay for services (e.g., a massage service, a multimedia service, a charging service, etc.). Advertising may be displayed on or by the multimedia chairs. There are so many types of advertising vying for customer attention. More of these out-of-home advertising approaches are losing their impact due to the ever growing use and popularity of mobile electronic devices offering the same or similar capabilities, which will likely continue to reduce the popularity and revenue-generating potential of conventional out-of-home advertisement. The present solution provides a way to generate a revenue stream from multimedia chairs by also incorporating mobile communication device based advertisements with multimedia chair usage. In effect, the customer may have an enhanced vending experience and the multimedia chair operator may have increased revenues.

The present solution is also geared towards enhancing the emotional intelligence of electronic chairs by more fully accounting for the likelihood that many users will be preoccupied with their mobile communication devices. Such emotional intelligence is facilitated by providing access to the electronic chair's associated mobile device application (e.g., via scanable codes such as barcodes and/or Quick Response (QR) codes), support for an alternative payment preference to allow the user's mobile communication device to be utilized for electronic payment, obviating the necessity of requiring a hardwire cable for recharging of the user's mobile communication device via the electronic chairs (e.g., through inductive charging), and accommodating the emotional state of users through Artificial Intelligence (AI) and/or machine learning to customize one or more operations, services (e.g., a massage service), advertisements and/or market research surveys.

In some scenarios, an electronic chair of the present solution resides in a public area (e.g., a shopping mall). The electronic chair is configured to operate in an advertising mode when not being used by a person. In the advertising mode, the electronic chair outputs advertisement information (e.g., auditorily, visually and/or tactilely) to attract potential users. The advertisement information is output directly by an output device of the electronic chair (e.g., a speaker, a display screen and/or a vibrator). The operator of the electronic chair may charge an advertising fee to the sources of the advertisement information. The electronic chair may also be configured to operate in a survey mode in which the electronic chair performs operations for conducting market research.

The electronic chair is configured to detect when a person is seated therein. Responsive to such a detection, the electronic chair transitions to a user mode of operation. In this case, the electronic chair performs operations to influence the person to interact therewith via a mobile communication device (e.g., a smart phone or tablet). A software application needs to be installed on the mobile communication device in order to have such interactions. The software application can be downloaded to the mobile communication device by scanning a code disposed on/displayed by the electronic chair. The code can cause the mobile communication device to access a website for downloading the software application. The software application is designed to allow the person to take full advantage of electronic chairs complete suite of functionality. For example, the person is able to interact with the electronic chair via a software application installed on his (her) mobile communication device which is in wireless communication with the electronic chair. The wireless communication between the electronic chair and the mobile communication device can be facilitated by Near Field Communication (NFC) technology and/or Short Range Communication (SRC) technology (e.g., Bluetooth technology). The software application allows the customer to, for example, select a service to be provided by the electronic chair (e.g., a massage service, a media service, a device charging service, etc.), pay for a service, select parameters for a service, initiate a service, pause/suspend a service, terminate a service, and/or complete a survey. In some scenarios, a complimentary service (e.g., a massage service) is provided by the electronic chair to a person who completes a survey (e.g., because the advertiser conducting the market research survey is paying the electronic chair operator for the use of the electronic chair's functionality after completion of such surveys).

When in use, the electronic chair is configured to operate in an advertising support mode. In this mode, the advertisement information may be communicated from the electronic chair to the mobile communication device for output therefrom. After the person completes use of the electronic chair, a transaction record may be generated, stored in a local datastore of the electronic chair, and/or communicated to remote computing device. The electronic chair may also transition its operational mode back to the advertising mode.

The present solution will be described below in relation to multimedia and massage chairs. The present solution is not limited in this regard, and can be used with other types of electronic chairs.

The present solution can be implemented in systems and methods for user control of a vending massage chair. In some scenarios, the methods comprise: detecting, by the vending massage chair, when a mobile communication device is located in proximity to the vending massage chair; triggering operations by the vending massage chair to relinquish operational control to the mobile communication device, in response to a detection that the mobile communication device is proximate to the vending massage chair; receiving, by the vending massage chair, a wireless signal that was transmitted from the mobile communication device; performing operations, by the vending massage chair, to relinquish control of massage chair operation(s) to the mobile communication device in response to a reception of the wireless signal; and performing the massage chair operation(s) by the vending massage chair in response to a wireless command issued by the mobile communication device.

The massage chair operation(s) can include, but is (are) not limited to, an operational mode change (e.g., a change from a power save mode to another mode in which a service is provided), a massage service operation (e.g., control of rollers, motors, air bladders and/or hydro massage components), a media service operation (e.g., selection and output of media (audio, visual and/or tactile media)), a charging operation (e.g., enablement of a charger for charging an internal battery of an external device), an advertisement operation (e.g., selection and/or display of advertisements), a survey operation (e.g., selection, display and/or completion of surveys), or a diagnostic operation (e.g., calibration of massage components, circuit fault/error testing, circuit fault/error repairs, and/or fault/error reporting).

The methods may also comprise performing operations by the vending massage chair to validate an identification of the person who is in possession of the mobile communication device. The vending massage chair relinquishes control of the at least one massage chair operation when the identification of the person is validated.

In those or other scenarios, the methods further comprise: transmitting a wireless signal from the vending massage chair to cause the mobile communication device to provide haptic feedback for notifying a user that the massage chair operation has been initiated, completed or terminated.

In those or other scenarios, the methods comprise: detecting, by the vending massage chair, an emotional state of a user of the mobile communication device using at least one of artificial intelligence and a machine learning algorithm. The emotional state of the user may be detected based on (i) images captured by a camera of at least one of the vending massage chair and the mobile communication device, (ii) audio captured by a microphone of at least one of the vending massage chair and the mobile communication device, and/or (iii) information specifying user inputs to the mobile communication device. The massage chair operation(s) may be modified, adjusted or changed based on the detected emotional state of the user.

Additionally or alternatively, the vending massage chair may: enable or disable at least one internal circuit (e.g., a light device) responsive to the detected emotional state of the user; and/or generate a recommendation for characteristics of a massage service based on the detected emotional state of the user. The recommendation may be output from the vending massage chair and/or the mobile communication device.

The implementing systems may comprise a processor, and a non-transitory computer-readable storage medium comprising programming instructions that are configured to cause the processor to implement a method for user control of a vending massage chair.

Illustrative System

Figure 2:
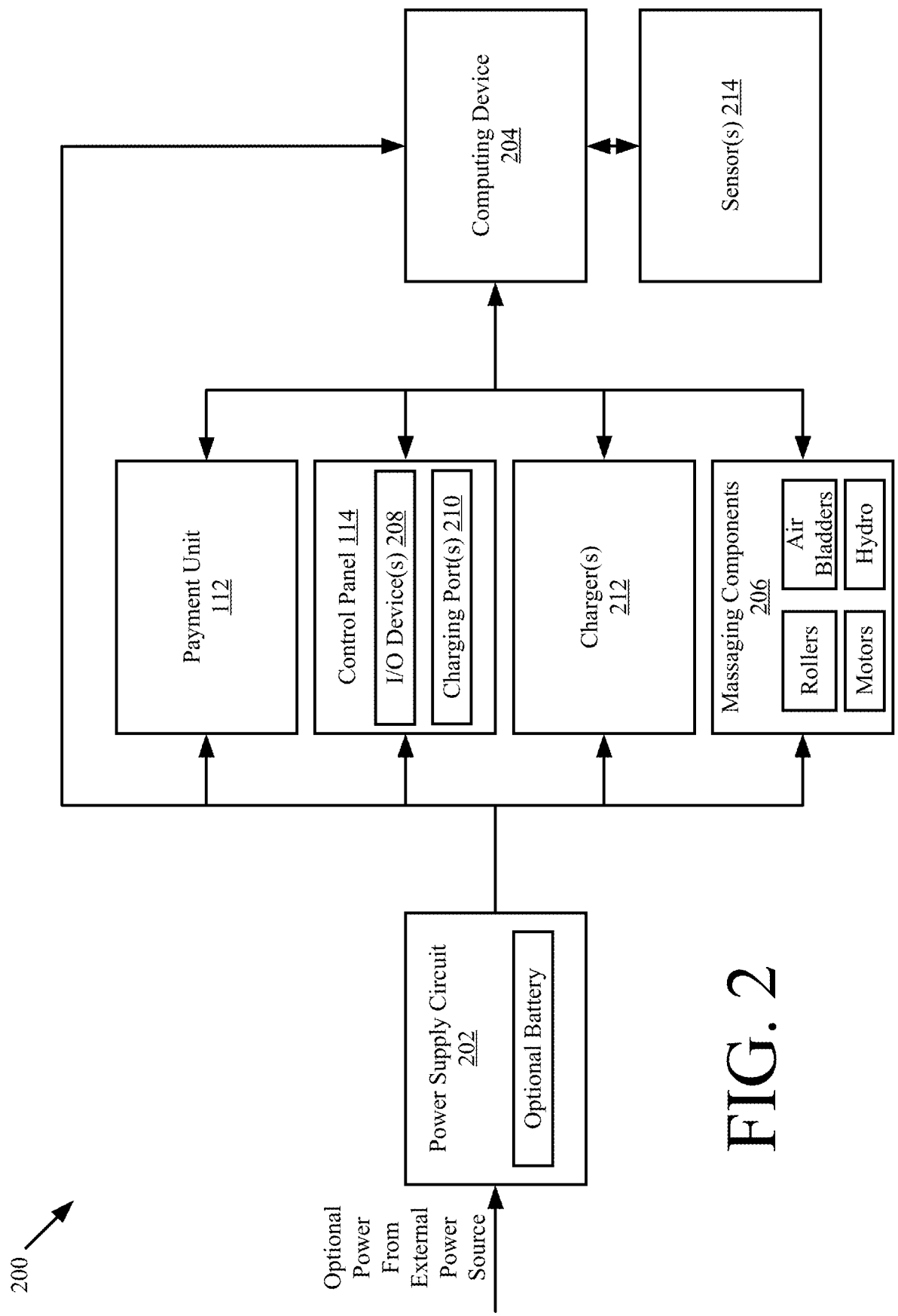
FIG. 2 provides an illustration of an illustrative internal circuit of the vending massage chair shown in FIG. 1.

The present solution generally concerns systems and methods for allowing users to remotely control operations and/or functions of multimedia chairs via their mobile communication devices. The multimedia chairs can include, but are not limited to, massage chairs. Massage chairs are well known in the art. An illustrative message chair that may be modified in accordance with the present solution and employed here is described in U.S. Pat. No. 9,904,917 to Ruggiero et al. ("the '917 patent"). Illustrations of such an illustrative massage chair 100 are provided in FIGS. 1-2. As shown in FIGS. 1-2, the massage chair 100 generally comprises two arm rests 102, 104, a back rest 106, a seat 108, a leg support 110, and an internal circuit 200. The internal circuit 200 may be interconnected with the internal circuits of other proximate massage chairs to allow for sharing and minimization of cost and redundancy of electronic components (e.g., a network adapter).

Massaging components 206 are provided in the back rest 106, the seat 108, and/or the leg support 110. The massaging components 206 are generally configured to mechanically provide a therapeutic manipulation of body tissue as part of a massaging service when the massaging components are enabled and the seat 108 is occupied by a user. In this regard, the massaging components 206 include motors, air bladders, rollers, hydro (or water based) massage components, and/or other mechanical tissue manipulators. The seat 108 is sized and shaped to allow the user to sit thereon so that his (her) body tissue is adjacent to the massaging components when the seat is occupied by the user. The massaging components may be enabled or otherwise activated when (i) a power source (e.g., an AC mains and/or a battery) has been electronically coupled to the vending massage chair 100, (ii) the presence of a seated user is detected by a sensor 214 of the vending massage chair 100, and/or (iii) a successful payment transaction is performed for a massage service. Payment transactions are well known in the art, and therefore will not be described herein.

A payment unit 112 is at least partially disposed in an arm rest 102 of the vending massage chair 100. The payment unit 112 is generally configured to facilitate the payment transactions for the massage services and/or other services. The payment unit 112 may include, but is not limited to, a coin operated payment unit, a bill operated payment unit, a card operated payment unit, and/or a contactless payment unit. Each of the list types of payment units is well known in the art, and therefore will not be described here.

A control panel 114 is also disposed in the arm rest 102 of the vending massage chair 100. The control panel 114 includes one or more Input and/or Output (I/O) devices 208 for controlling operations of the massaging components 206. Such I/O devices 208 can include, but is (are) not limited to, a keypad, a display screen, buttons and/or switches. The display screen may be a Liquide Crystal Display (LCD) and/or a touch screen display. The operations may include, but are not limited to, entering a customer identifier for retrieving pre-stored massage chair configuration preferences, turning a massaging component off, changing a speed of a massaging component, changing a location of the massaging component relative to the user's body, changing an amount of water pressure and/or flow speed of a hydro massage component, changing which hydro massage components are active/inactive, and/or adjusting an amount of air in an air bladder (e.g., disposed in the seat 108 and/or leg support 110).

Electronic advertisements and/or other media may be displayed on the display screen of the control panel 114 prior to, during and/or after provision of a massage service. The I/O devices 208 may also be used by the user to select and/or change the advertisement and/or media content displayed on the display screen. For example, a user may be able to watch a particular video or may be able to listen to a particular song while (s)he receives a massage provided by the vending massage chair 100. The media feature of the vending massage chair 100 may be a complimentary feature or a paid-for feature. In some scenarios, a kiosk may additionally be attached to the vending massage chair 100 that has a display screen for presenting electronic advertisements, surveys and/or other media to a user of the vending massage chair 100.

The control panel 114 may additionally include one or more charging ports 210 (e.g., a Universal Serial Bus (USB) port) to facilitate charging of power sources contained in external electronic devices (e.g., portable computers and/or mobile phones) as part of a paid-for charging service or as part of a complimentary charging service when the external electronic device is connected to the vending massage chair 100 by the user. In the complimentary charging service scenarios, the charging port(s) 210 is (are) supplied power from charger(s) 212 only when the massaging component(s) 206 is (are) enabled. The charger 212 can include, but is not limited to, a wireless or cordless charger (e.g., an inductive charger) and/or a wired charger.

The wireless or cordless charger can include, but is not limited to, an inductive charger configured to wirelessly transfer power from the massage chair to an external device (e.g., a user's mobile communication device) via electromagnetic inductive coupling. The power transfer is achieved by, for example, passing an electrical current through two coils to create an electromagnetic field. The power transfer involves a power transmitting plate and a receiver where an alternating current is run through an induction coil in the charging station. When the receiving magnetic plate on the mobile communication device contacts the transmitter of the massage chair—or at least within the specified range (without needing to be precisely aligned or make electrical contact with a dock or plug)—the magnetic field generates an electrical current within the mobile communication device. This current is then converted by the mobile communication device into Direct Current (DC), which in turn charges the internal battery thereof. The main wireless standard is Qi that has been developed by the Wireless Power Consortium (WPC) for inductive charging over distances of up to 40 mm. By providing inductive charging capabilities in the massage chair, users enjoy increased convenience by avoiding having to bring or borrow a cable, with the added advantage of minimizing the wear and tear of their mobile communication device's charging connector, extending its durability.

In some scenarios, the vending massage chair 100 is optionally configured to cause movement of the massaging component(s) 206 so as to create discomfort at a user's back after the user has occupied the seat 108 for a threshold period of time without paying for a massage service, a charging service, and/or a media service. The effect of this optional discomfort feature is to make a user uncomfortable so the user does not linger in the chair without putting money in, and allows for more efficient marketing of the chair system for paying users. The program can be changed at any time if a situation warrants, for example, by extending a timer, by reducing intensity of a vibrating irritation means, or the like. In addition to rollers, knobs, irregularly positioned nodules, or large, rounded pins, for example, may be used to make the system uncomfortable for sitting, so the user does not linger in the chair without paying for a service, and thereby freeing up the chair for a subsequent paying user. The system allow for changes to the timing requirement and intensity of the discomforting means.

Figure 3:
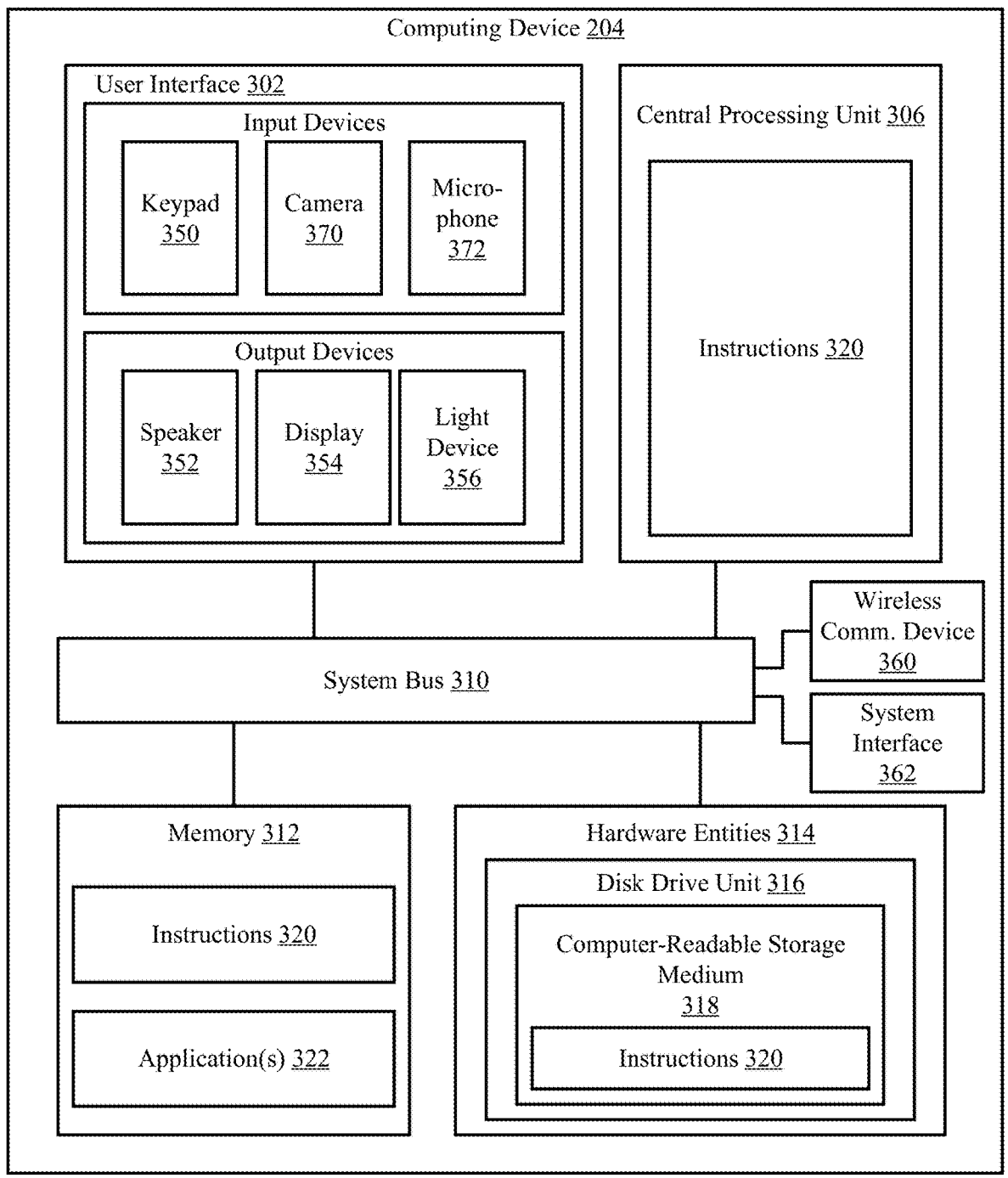
FIG. 3 provides an illustration of an illustrative computing device.

Referring now to FIG. 3, there is provided a detailed block diagram of an illustrative architecture for the computing device 204. Computing device 204 may include more or less components than those shown in FIG. 3. However, the components shown are sufficient to disclose an illustrative embodiment implementing the present solution. The hardware architecture of FIG. 3 represents one embodiment of a representative computing device configured to facilitate the remote control of the vending massage chair 100 for improved customer experiences and/or satisfaction. As such, the computing device 204 of FIGS. 2-3 implements at least a portion of the methods described herein for user control of massage chairs via mobile communication devices.

Some or all the components of the computing device 204 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 3, the computing device 204 comprises a user interface 302, a Central Processing Unit (CPU) 306, a system bus 310, a memory 312 connected to and accessible by other portions of computing device 300 through system bus 310, and hardware entities 314 connected to system bus 310. Various information can be stored in memory 312. Such information includes, but is not limited to, total credits since last reset, total lifetime credits, payment device credits since last reset, payment device lifetime credits, phone app credits since last reset and/or phone app lifetime credits. The user interface can include input devices (e.g., a keypad 350, a camera 370, and/or a microphone 372) and output devices (e.g., speaker 352, a display 354 (e.g., a LCD display), and/or light emitting diodes 356), which facilitate user-software interactions for controlling operations of the computing device 204. The input and/or output devices may be configured for right-handed or left-handed operation by a user. The user interface 320 may be at least partially contained in the control panel 114 of the vending massage chair 100. Audio can be output from speaker 352 prior to, during, and/or subsequent to the provision of a massage by a massage chair. A chair identifier may be displayed on the display 354 of the vending massage chair. The chair identifier can include one or more letters, number and/or symbols. The chair identifier is provided to facilitate control of the vending massage chair by an individual via a mobile communication device as discussed below.

At least some of the hardware entities 314 perform actions involving access to and use of memory 312, which can be a Random Access Memory (RAM). Hardware entities 314 can include a disk drive unit 316 comprising a computer-readable storage medium 318 on which is stored one or more sets of instructions 320 (e.g., software code) configured to implement one or more of the methodologies, procedures, or functions described herein. The instructions 320 can also reside, completely or at least partially, within the memory 312 and/or within the CPU 306 during execution thereof by the computing device 204. The memory 312 and the CPU 306 also can constitute machine-readable media. The term "machine-readable media", as used here, refers to a single medium or multiple media (e.g., a centralized or distributed database, and/or associated caches and servers) that store the one or more sets of instructions 320. The term "machine-readable media", as used here, also refers to any medium that is capable of storing, encoding or carrying a set of instructions 320 for execution by the computing device 204 and that cause the computing device 204 to perform any one or more of the methodologies of the present disclosure.

In some scenarios, the hardware entities 314 include an electronic circuit (e.g., a processor) programmed for facilitating the user control of massage chair operations via a mobile communication device. In this regard, it should be understood that the electronic circuit can access and run a software application 322 installed on the computing device 204. The software application 322 may be configured to cause a code to be displayed on display 354 (e.g., when the multimedia chair is not in use and/or responsive to a detection that a person is in proximity to the multimedia chair). The code can include a sequence of symbols (e.g., letters and/or numbers). The code may be presented in a readable format or in an encoded format (e.g., as a barcode or QR code). The code may be provided to facilitate a user's mobile communication device's access to a website or webpage from which a software application can be downloaded for interacting with the multimedia chair via wireless communication technology (e.g., NFC technology and/or SRC technology).

In some scenarios, the code comprises a QR code. QR codes are well known. Generally, a QR code comprises a machine-readable optical label containing information encoded into a matrix format. The matrix consists of a pattern or grid of black squares on a white background. The user's mobile communication device can be used to capture an image of the QR code, perform image processing to detect pattern(s) of black squares, and use the detected patterns to decode the information. The information can include, but is not limited to, contact information, connection details for a wireless network, an electronic address (e.g., a Uniform Resource Locator (URL) for a web site or a web page), and/or parameter values for the software application installed on the user's mobile communication device. The information may also comprise location details to facilitate tracking of where the code was scanned. This location tracking can additionally or alternatively be achieved using geo information (e.g., Global Positioning System (GPS) information) and/or triangulation.

The software application 322 may implement AI and/or machine-learning algorithm(s) for improving customer experiences. The machine-learning algorithm(s) can employ supervised machine learning, semi-supervised machine learning, unsupervised machine learning, and/or reinforcement machine learning. Each of these listed types of machine-learning algorithms is well known in the art. In some scenarios, the machine-learning algorithm includes, but is not limited to, a decision tree learning algorithm, an association rule learning algorithm, an artificial neural network learning algorithm, a deep learning algorithm, an inductive logic programming based algorithm, a support vector machine based algorithm, a Bayesian network based algorithm, a representation learning algorithm, a similarity and metric learning algorithm, a sparse dictionary learning algorithm, a genetic algorithm, a rule-based machine-learning algorithm, and/or a learning classifier system based algorithm. The machine-learning process implemented by the present solution can be built using Commercial-Off-The-Shelf (COTS) tools (e.g., SAS available from SAS Institute Inc. of Cary, North Carolina).

The software application 322 may be configured to receive information from, for example, a camera 370, a microphone 372, a keypad 350, a display 354, and/or a user's mobile communication device. The information can include, but is not limited to, images (e.g., captured by camera 370 and/or a camera of the user's mobile communication device), audio (e.g., captured by microphone 372 and/or a microphone of the user's mobile communication device), and/or information specifying user inputs (e.g., via gestures captured by camera 370, actuation of keys on keypad 350, actuation of virtual buttons display on touch screen display 354, and/or an input device of the user's mobile communication device).

The software application 322 may analyze the received information to determine an emotional state of the user based on AI and/or machine learned information. The machine learned information can include, but is not limited to, learned relationships between emotional states and facial expressions (e.g., a frown, a smile, a brow furrow, a squint, a lowered/raised eyebrow, and/or a smirk) with certain degrees of likelihoods or probabilities), learned relationships between emotional states and gestures with certain degrees of likelihoods or probabilities), learned relationships between emotional states and body positions/posture with certain degrees of likelihoods or probabilities), learned relationships between emotional states and spoken word(s)/phrase(s) with certain degrees of likelihoods or probabilities), learned relationships between emotional states and sound(s) (e.g., the slamming of an object) with certain degrees of likelihoods or probabilities), and/or learned patterns of user-software interactions indicating respective emotional states with certain degrees of likelihoods or probabilities. The emotional states can include, but are not limited to, neutral/normal, sad, happy, tired, angry, stressed, anxious, annoyed, bored, interested, confused, frustration, disappointment, hesitation, overwhelmed, confident, aloof, engaged, focused, delighted, skeptic, and/or satisfied.

The software application 322 may also cause operations of the vending massage chair and/or mobile communication device to be controlled based on results of the emotional state analysis. For example, a determination that the user has a particular emotional state (e.g., sad or tired) may result in an enablement/disablement/operational mode change of a device (e.g., a light device 356, speaker 352 and/or display 354) of the massage chair, an output of a recommendation to the user for a particular type of service (e.g., a gentle massage or a firm massage) from the massage chair and/or the mobile communication device, the provision of a particular type of service (e.g., a gentle massage or a firm massage) by the massage chair, output of a recommendation to the user for particular multimedia (e.g., song, video, movie, television show, slide show, advertisement, etc.) via the massage chair and/or mobile communication device, and/or the output of particular multimedia (e.g., song, video, movie, television show, slide show, advertisement, etc.) from the massage chair and/or the mobile communication device.

For example, the light device 356 is disabled or transitioned to a dimmed light mode when the software application 322 detects that the user is in a sad emotional state and/or is tired, and enabled or transitioned to a non-dimmed light mode when the software application 322 detects that the user is in a happy/neutral/normal emotional state and/or is not tired. The speaker 352 may be enabled to output a particular song or spoken message when the software application 322 detects that the user is in a respective emotional state. Different songs and/or spoken messages can be output for different emotional states. Similarly, the display 354 may be enabled to output a particular visual media piece (e.g., video, movie, television show, advertisement, and/or survey) when the software application 322 detects that the user is in a respective emotional state. Different video media pieces can be output for different emotional states. Additionally or alternatively, the software application 322 can cause the particular video media piece to be output from the user's mobile communication device. In this way, the massage chair is able to interact more intelligently with users by customizing operations (e.g., to provide customized Graphical User Interfaces (GUIs), advertisements and/or multimedia) and/or customizing services (e.g., massage service, charging services, and/or multimedia services) to be provided to users based on detected emotional states thereof.

A wireless communication device 360 and/or a system interface 362 may also be provided with the computing device 204. The wireless communication device 360 is configured to facilitate wireless communications between the vending massage chair 100 and external devices (e.g., a remote server and/or mobile communication devices). The wireless communications can include, but are not limited to, NFCs and/or SRCs (e.g., WiFi and/or Bluetooth). The system interface 362 is also configured to facilitate wired communications between the vending massage chair 100 and external devices (e.g., mobile communication devices). In this regard, the system interface 362 can include, but is not limited to, an Ethernet interface and/or a USB interface.

The NFC technology can be used to facilitate wireless communications between the computing device 204 and a remote device (e.g., a user's mobile communication device) which is proximate thereto (e.g., ≤4-10 cm). Due to its short range and support for encryption, NFC communication is suitable for secure communication over short distances. NFC communications can be used by the computing device 204 to detect when a person is in proximity to the massage chair and trigger certain operations of the massage chair in response to such detection (e.g., present a code on the display 354 and/or establish a Bluetooth pairing with the user's mobile communication device).

NFC communications may also be used by the computing device 204 to facilitate contactless payments for services. NFC based contactless payment transactions are well known transaction that are quick and convenient, which helps to keep the user satisfied and makes it possible for merchants to process sales efficiently. NFC is also compatible with coupon and special offer redemptions that draw in customers and sales. Perhaps most importantly, NFC transactions are considered to be more secure than those involving traditional magnetic stripe credit cards, which can be stolen or cloned and used for unauthorized purchases.

The interface(s) 360, 362 can be used to report diagnostic information and usage patterns to a remote server of a management system (e.g., management system 408 of FIG. 4) and/or mobile communication device(s) of field service representative(s). The diagnostic information reporting can be achieved via electronic messages (e.g., electronic mail messages and/or text massages). Settings of the vending massage chair 100 can be remotely controlled and/or adjusted by an administrator using the remote server and/or a field service representative using a mobile communication device.

The diagnostic information can include, but is not limited to, information indicating that there is no communication to a mother control board, there is no Alternating Current (AC) to a logic supply, knock motor overcurrent has been detected, knock motor undercurrent has been detected, knock motor undervoltage has been detected, knock motor drive fault has been detected, knead motor overcurrent has been detected, knead motor undercurrent has been detected, knead motor motion timeout has occurred, knead motor overvoltage has been detected, knead motor undervoltage has been detected, a knead motor drive fault occurred, a walk motor overcurrent has been detected, a walk motor undercurrent has been detected, a walk motor timeout has occurred, a walk motor limit switch position, a walk motor overvoltage has been detected, a walk motor undervoltage has been detected, a walk motor drive fault occurred, a solenoid overcurrent has been detected, a solenoid overcurrent has been detected, a solenoid over voltage has been detected, a solenoid under voltage has been detected, a solenoid overpressure has been detected, a solenoid underpressure has been detected, a solenoid drive fault occurred, an air pump overcurrent has been detected, an air pump undercurrent has been detected, an air pump drive fault has occurred, a payment device fault occurred, ejection cycle count, lifetime total minutes of chair use, power cycle count, computer reset count, error codes, temperature data, and/or chair state data. The diagnostic information can be reported continuously, periodically (e.g., three times a day) at predefined times, and/or responsive to trigger events. The trigger events can include, but are not limited to, a powering on of the massage chair, a transition to a maintenance mode, a clearing of transaction totals, and/or a transition from the maintenance mode.

Figure 4:
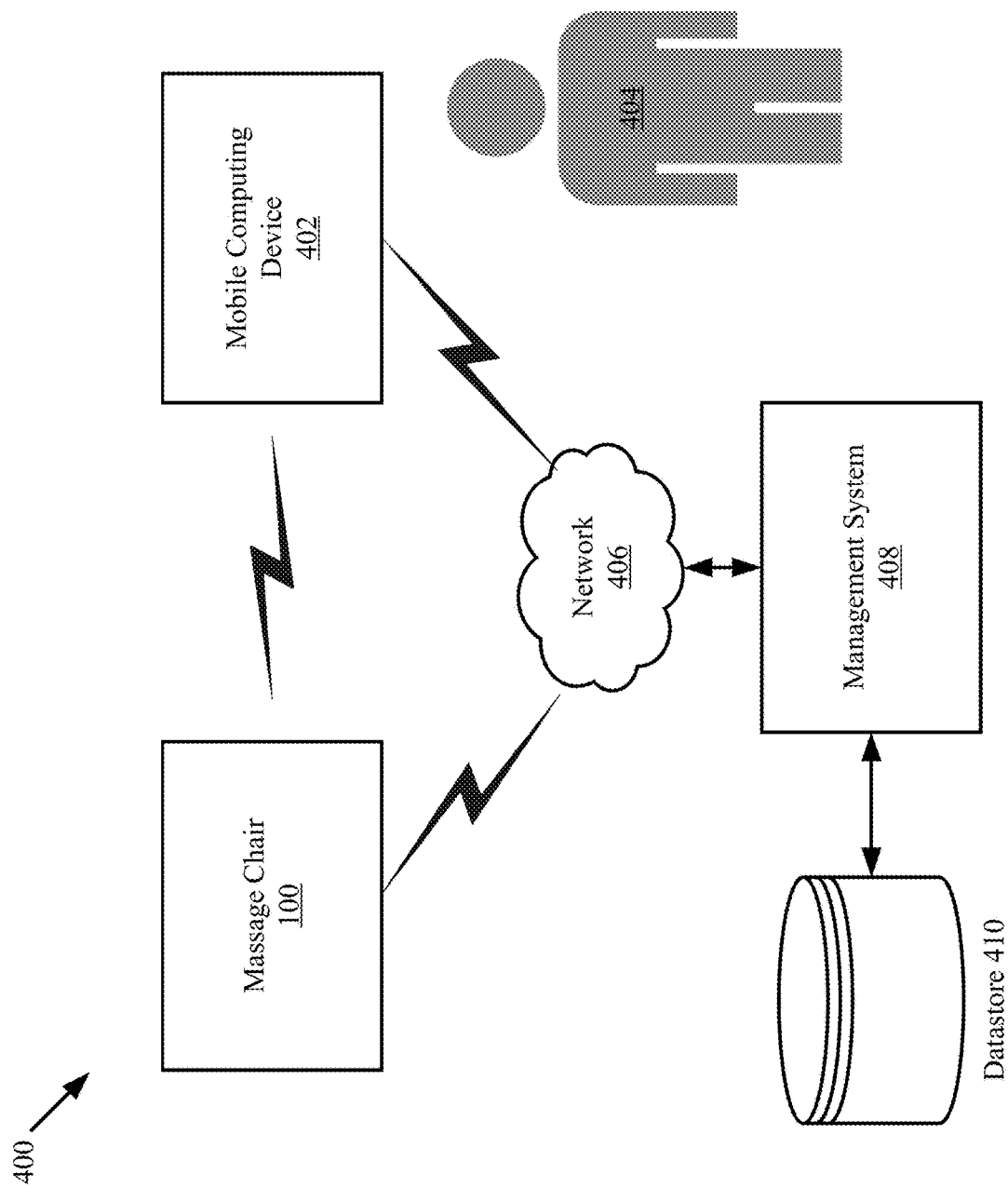
FIG. 4 provides an illustration of an illustrative system implementing the present solution.

Referring now to FIG. 4, there is provided an illustration of an illustrative system 400 implementing the present solution. System 400 comprises the vending massage chair 100 and a mobile communication device 402. The mobile communication device 402 is in the possession of an individual 404. The individual 404 can include, but is not limited to, a customer or a field service representative. The mobile communication device 402 can include, but is not limited to, a portable computer, a mobile phone, a smart phone, a personal digital assistant, a tablet, a smart watch, and/or smart glasses. The individual 404 can use the mobile communication device 402 to control one or more operations of the vending massage chair 100. For example, the mobile communications device 402 can (i) detect gestures, speech and other user-software interactions (e.g., touch screen inputs and/or button depressions), and (ii) send control signals to the vending massage chair 100 in accordance with the detected gestures, spoken words/phrases and/or user-software interactions. The present solution is not limited to the particulars of this example. The manner in which the massage chair operations are controlled via the mobile communication device 402 will become more evident as the discussion progresses.

Figure 5:
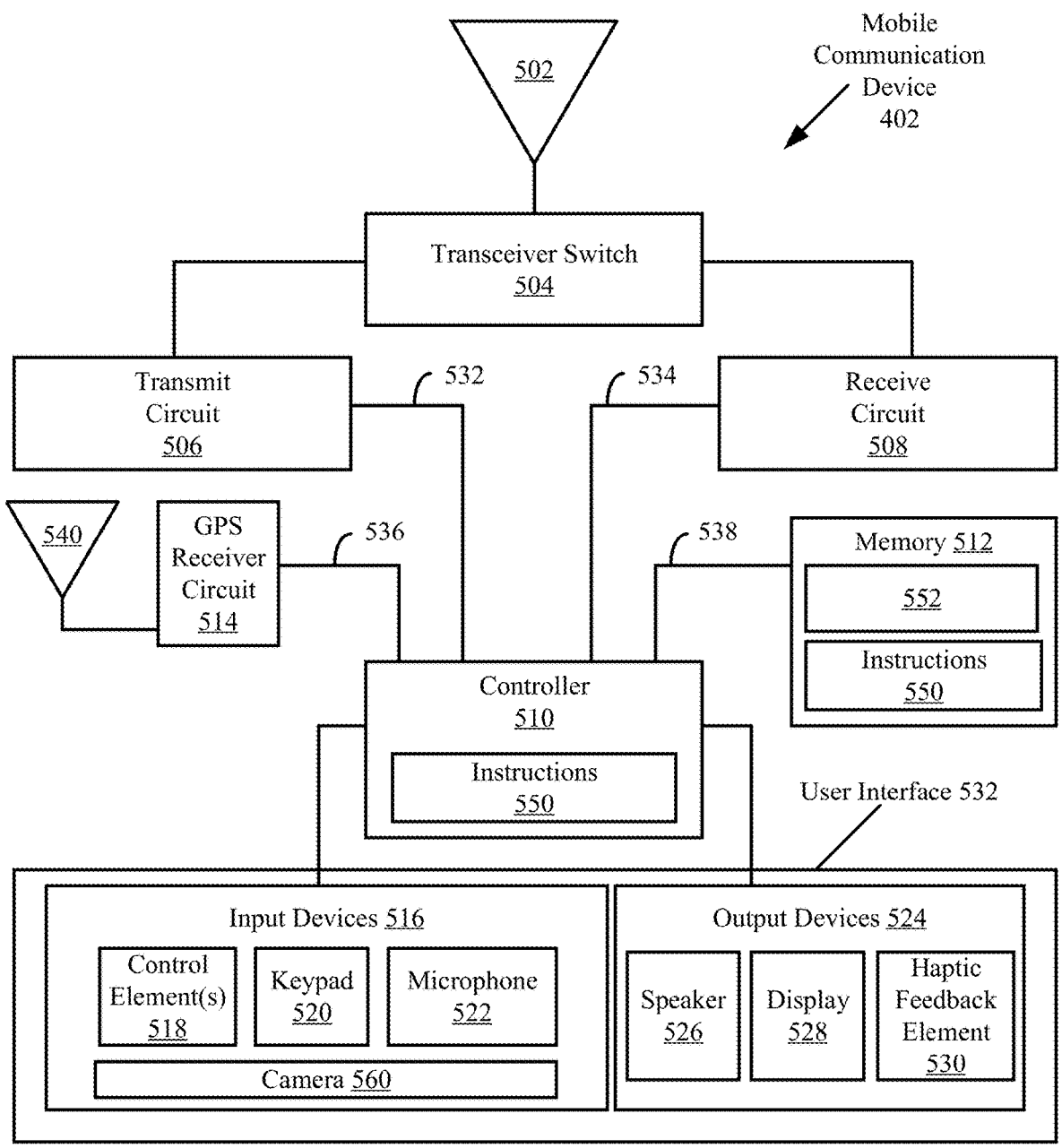
FIG. 5 provides an illustration of an illustrative mobile communication device.

A more detailed block diagram of the mobile communication device 402 is provided in FIG. 5. Notably, the mobile communication device 402 may include more or less components than those shown in FIG. 5. However, the components shown are sufficient to disclose an illustrative hardware architecture implementing the present solution. The hardware architecture of FIG. 5 represents one embodiment of a representative communication device configured to facilitate the remote control of operations and/or functions of a massage chair (e.g., kiosk 100 of FIG. 1). The operations and functions can include, but are not limited to, entering customer loyalty information, scrolling through a list of services that can be purchased (e.g., a massage service, a charging service, a media service), selecting a service to be purchased, initiating a payment transaction for the selected service, selecting a payment type, completing a payment transaction, selecting a type of receipt (e.g., an electronic copy of the receipt), terminating the payment transaction, and/or terminating a remote control session.

As shown in FIG. 5, the mobile communication device 402 comprises an antenna 502 for receiving and transmitting Radio Frequency (RF) signals. A transceiver switch 504 selectively couples the antenna 502 to a transmit circuit 506 and a receive circuit 508 in a manner familiar to those skilled in the art. The present solution is not limited in this regard. The mobile communication device 402 can alternatively comprise one or more antennas for each transceiver circuit 506 and 508, and therefore may be absent of the transceiver switch 504 for selectively connecting the transmit circuit and receive circuit to a common antenna.

Transmit and receive circuits are well known in the art. Still, it should be understood that the transmit circuit 506 is configured to (i) cause information to be transmitted to an external device (e.g., vending massage chair 100 of FIG. 1) via RF signals and (ii) process RF signals received from the external device to extract information therefrom. The transmit and receive circuits 506, 508 are coupled to a controller 510 via respective electrical connections 532, 534. In a transmit mode, the controller 510 also provides information to the transmit circuit 506 for encoding and modulating information into RF signals. The transmit circuit 506 communicates the RF signals to the antenna 502 for transmission to an external device (e.g., the vending massage chair 100 of FIG. 1). In a receive mode, the receive circuit 508 provides decoded RF signal information to the controller 510. The controller 510 uses the decoded RF signal information in accordance with the function(s) of the mobile communication device 402.

An antenna 540 is coupled to GPS receiver circuit 514 for receiving GPS signals. The GPS receiver circuit 514 demodulates and decodes the GPS signals to extract GPS location information therefrom. The GPS location information indicates the location of the mobile communication device 402. The GPS receiver circuit 514 provides the decoded GPS location information to the controller 510. As such, the GPS receiver circuit 514 is coupled to the controller 510 via an electrical connection 536. The controller 510 uses the decoded GPS location information in accordance with the function(s) of the mobile communication device 402.

The controller 510 stores the decoded RF signal information and the decoded GPS location information in a memory 512 of the mobile communication device 402. Accordingly, the memory 512 is connected to and accessible by the controller 510 through an electrical connection 532. The memory 512 may be a volatile memory and/or a non-volatile memory. For example, the memory 512 can include, but is not limited to, a RAM, a Dynamic Random Access Memory (DRAM), a Static Random Access Memory (SRAM), Read-Only Memory (ROM), and/or flash memory.

As shown in FIG. 5, one or more sets of instructions 550 are stored in the memory 512. The instructions 550 can also reside, completely or at least partially, within the controller 510 during execution thereof by the mobile communication device 402. In this regard, the memory 512 and the controller 510 can constitute machine-readable media. The term "machine-readable media", as used here, refers to a single medium or multiple media that store the one or more sets of instructions 550. The term "machine-readable media", as used here, also refers to any medium that is capable of storing, encoding or carrying the set of instructions 550 for execution by the mobile communication device 402 and that cause the mobile communication device 402 to perform one or more of the methodologies of the present disclosure.

The controller 510 is also connected to a user interface 532. The user interface 532 comprises input devices 516, output devices 524, and software routines (not shown in FIG. 5) configured to allow a user to interact with and control software applications 552 installed on the mobile communication device 402. Such input and output devices respectively include, but are not limited to, a display 528, a speaker 526, a keypad 520, a directional pad (not shown in FIG. 5), a directional knob (not shown in FIG. 5), and a microphone 522. The display 528 may be designed to accept touch screen inputs. The input devices 516 also comprise control elements 518. The control elements 518 include, but are not limited to, an on/off switch or button, and/or volume control buttons. Audio can be output from speaker 526 prior to, during, and/or subsequent to the provision of a massage by a massage chair (e.g., massage chair 100 of FIGS. 1-4).

The software application(s) 552 are configured to integrate with a loyalty program to manage one or more customer accounts. Points may be assigned to the customer accounts based on customer use, promotions, etc. Payment for a vending service (e.g., a massage service) may be facilitated by the software application(s) 552. Loyalty points may be used to pay for a vending service via the software application(s) 552 installed on the mobile communication device 402. Promotions and point notifications can be presented to the user of the mobile communication device 402 via the software application(s) 552. The software application(s) 552 may also be configured to provide a social media platform for customers to follow, share and/or like products, vending services, promotions, advertisements, and/or posts by other customers of vending services/products (e.g., the massage chairs, vending carts/stroller systems, etc.). The software application(s) 552 may further support monthly subscription and membership programs.

The software application(s) 552 may be able to register a new customer account using a third-party social network (e.g., ability to connect with an Apple account, a Facebook account, an Instagram account, a Twitter account, a Google account, a WeChat account, and/or a WhatsApp account), a telephone number, an email address, and/or a password. Each customer account can include the following information: a unique customer identifier; a first name; a last name; a date of birth; a gender; an account creation date; an income bracket; a mobile communication device type; an address; a phone number; family member information; an account modification date; an account (in) active state indicator; a point balance; shopping points; welcome points; number of reviews written; first purchase bonus; share on social media platform (e.g., twitter, Facebook, ct.); like on social media platform; following on social media platform (e.g., twitter, Facebook, Instagram, etc.); total amount spent; photo; birthday gift; total number of referrals; and/or sale transaction information. The customer identifier can include one or more letters, numbers and/or symbols. Individuals can login to an existing customer account using a third-party social network (e.g., an Apple account, a Facebook account, an Instagram account, a Twitter account, a Google account, a WeChat account, and/or a WhatsApp account), a telephone number, an email address, and/or a password.

The software application(s) 552 may be configured to obtain permission to receive push notification, access geo-location information, access a camera, access a camera library, access an address book, send Short Message Service (SMS) messages, SRC system(s) (e.g., a Bluetooth system), and/or emailing functions. Information about each session can be stored in memory 512 of the mobile communication device 402 and/or a remote datastore (e.g., datastore 410 of FIG. 4). Accordingly, login sessions can be automatically remembered for future access of the software application(s)

552. The software application(s) 552 may access a map of vending systems (e.g., massage chairs and/or stroller rental vending devices) geographic locations and/or present the same to a user of the mobile communication device 402. The map may also include an indication of the mobile communication device's location relative to the vending system(s). FIGS. 7-36 provide illustrations showing illustrative GUIs that are useful for understanding operations of the software application(s) 552.

A user may select a massage chair from the map or other widget (e.g., a drop down menu) of the software application(s) 552. Alternatively or additionally, the user can use the mobile communication device to (i) scan a code (e.g., a barcode or QR code) attached to a massage chair or presented by the massage chair to obtain a unique identifier for the massage chair and/or (ii) perform a short range communications (e.g., RFID or Bluetooth communication) with the massage chair to obtain the unique identifier from the massage chair. This code scan and/or short range communication constitutes a massage chair selection. Techniques for code scanning are well known in the art. Any known or to be known technique can be used here. For example, a camera 560 of the mobile communication device 402 is used to obtain an image of a barcode display or presented on the massage chair. The image is then processed to obtain information coded in the barcode. The present solution is not limited to the particulars of this example.

Once a massage chair has been selected, the user may be prompted to initiate payment for a massage service or other service provided by the massage chair. Payment can be made via any known or to be known electronic payment technique (e.g., credit card payment, bank card payment, Google Pay, Apple Pay, loyalty point transaction, debit account transaction, etc.).

Once a successful payment transaction has been performed, the user may be prompted to select a massage chair preference for the "paid-for" service. For example, the user is able to select default settings for the massage chair, and/or a pre-defined non-default setting for the massage chair from a plurality of pre-defined non-default settings. The user may also perform user-software interactions to define customized settings for the massage chair. In response to the user's selection of the massage chair settings, the mobile communication device 402 causes the massage chair to program the same and initiate the massage service. The software application(s) 552 also may allow the user to (i) change the massage chair settings, (ii) view a remaining time for the massage service, and (iii) purchase additional time for the massage service while the massage service is being provided by the massage chair. The software application(s) 552 may further allow the user to view statistics from a completed vending massage chair experience, view a total cost of the massage service, view a total amount of loyalty points earned during the massage session, view massage chair vending history, change massage chair preferences, and/or change a method of payment.

The mobile communication device 402 may further comprise a haptic feedback element 530. The haptic feedback element 530 can include, but is not limited to, a sound generator, a visual alert generator, a vibration generator, and/or a haptic motor. All of the listed devices are well known in the art, and therefore will not be described here. The haptic feedback element 530 is configured to provide users with auditory, visual and/or tactile notifications of what operations and/or functions have been selected, initiated, completed, and/or terminated.

Figure 6:
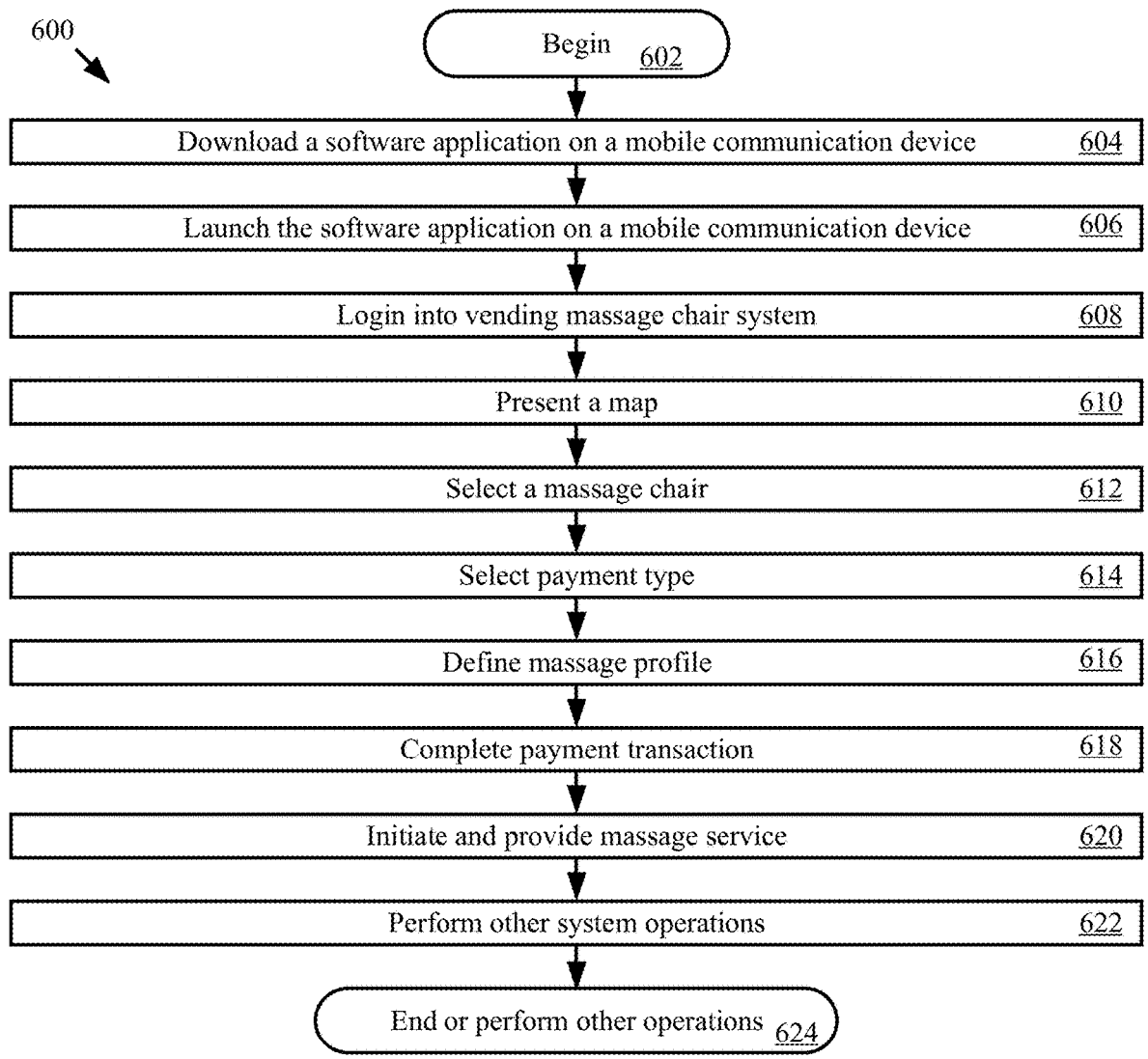
FIG. 6 provides a flow diagram of an illustrative method for the remote control of vending massage chair operations.
Figure 8:

Referring now to FIG. 6, there is provided a flow diagram of an illustrative method 600 for the remote control of massage chair operations. Method 600 begins with 602 and continues to 604 where a software application (e.g., software application 552 of FIG. 5) is downloaded or otherwise installed on a mobile communication device (e.g., mobile communication device 402 of FIG. 4). Techniques for downloading and installing software applications on mobile communication devices are well known in the art, and therefore will not be described herein. Any known or to be known technique for downloading and installing software applications on mobile communication devices can be used herein without limitation. For example, the software application can be downloaded via an online App Store (e.g., Google Play Store and/or Apple App Store).

Figure 7:
Figure 9:
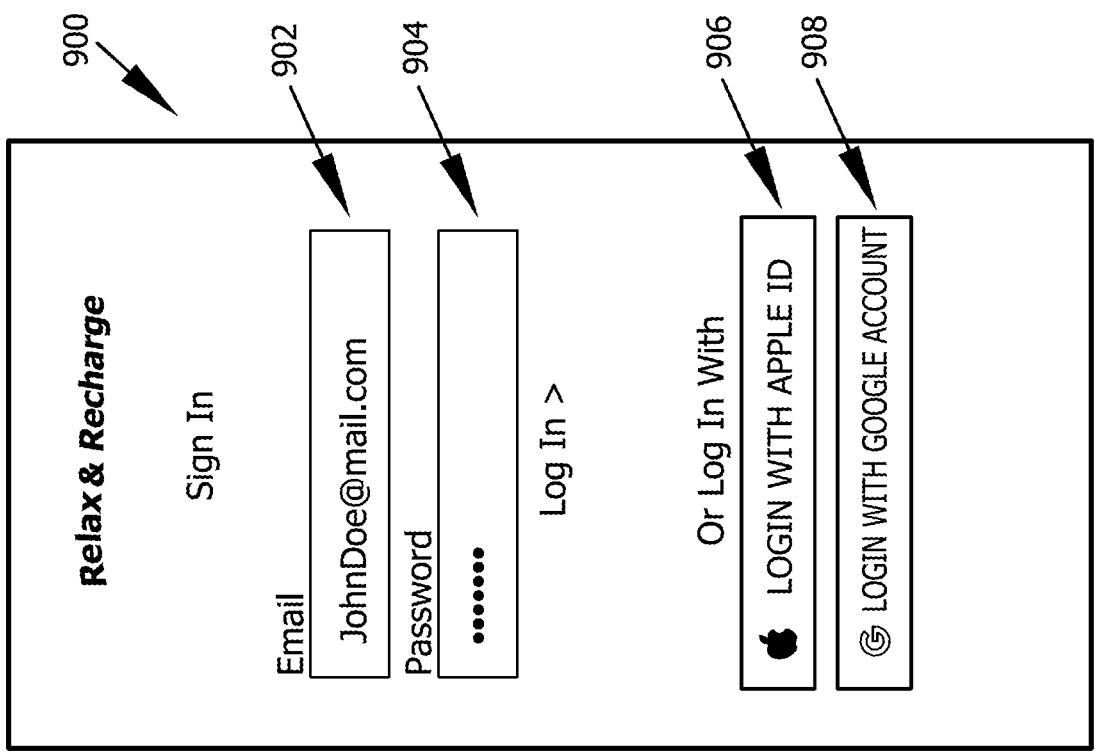
Figure 12:
Figure 11:
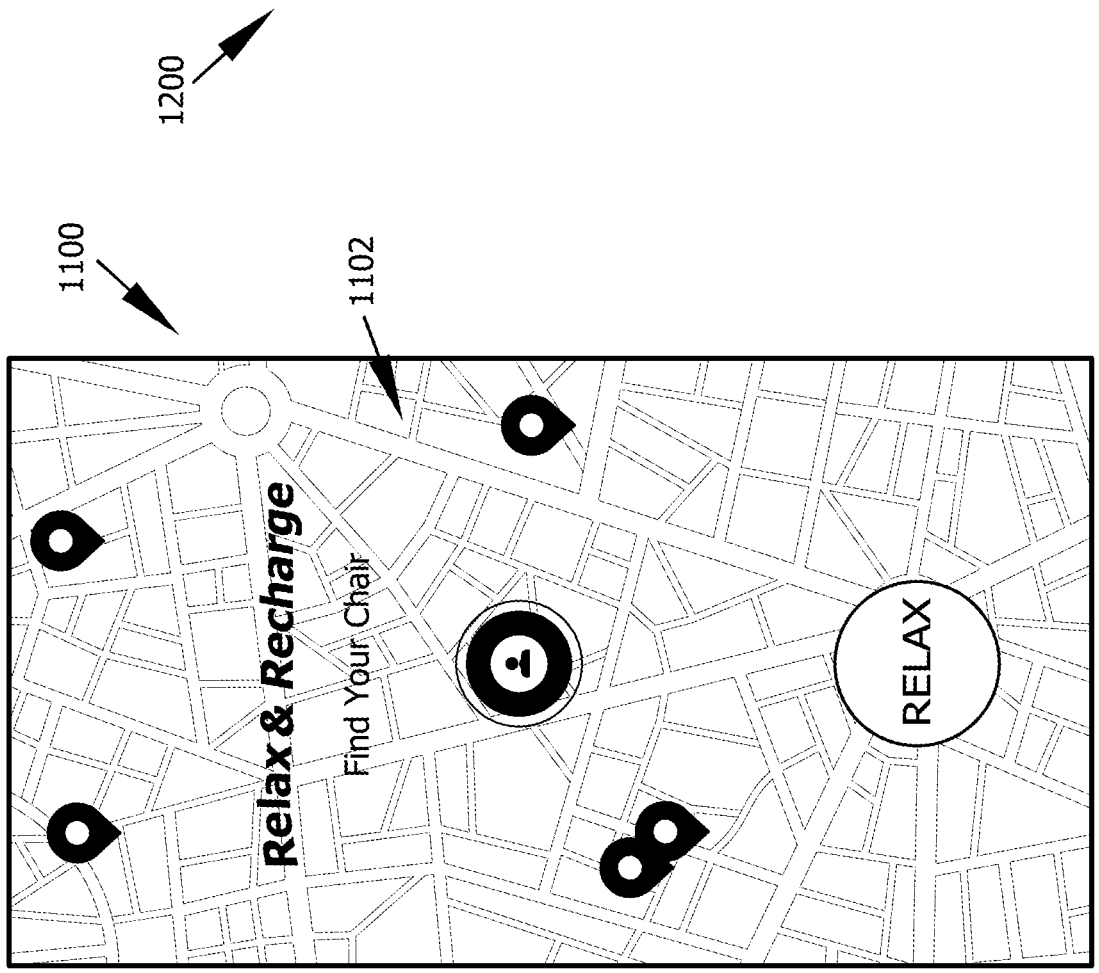
Figure 14:
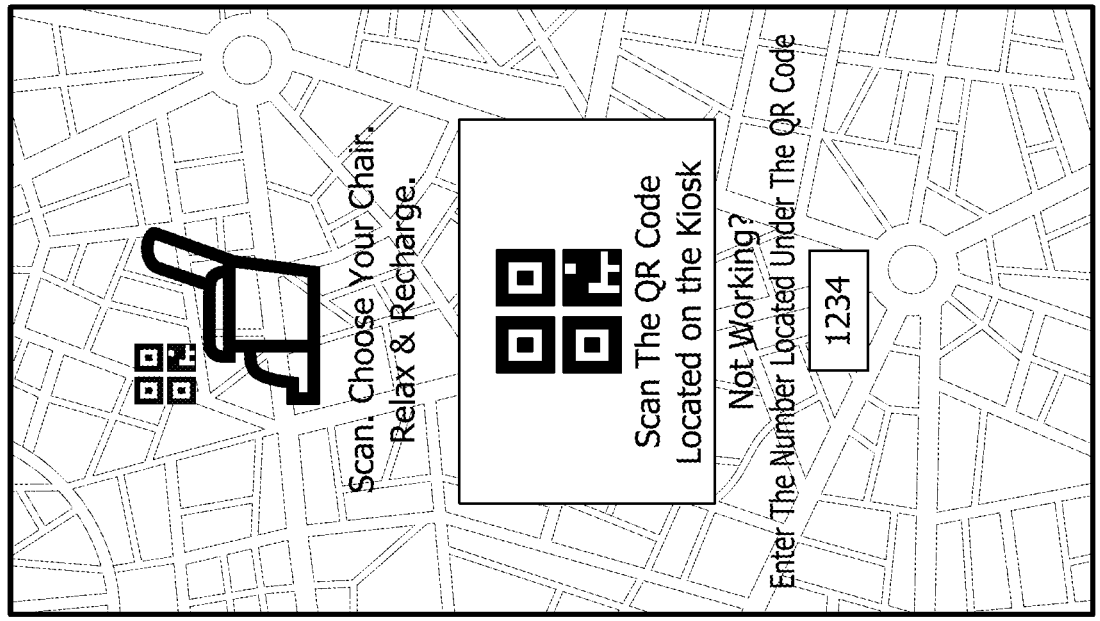
Figure 13:
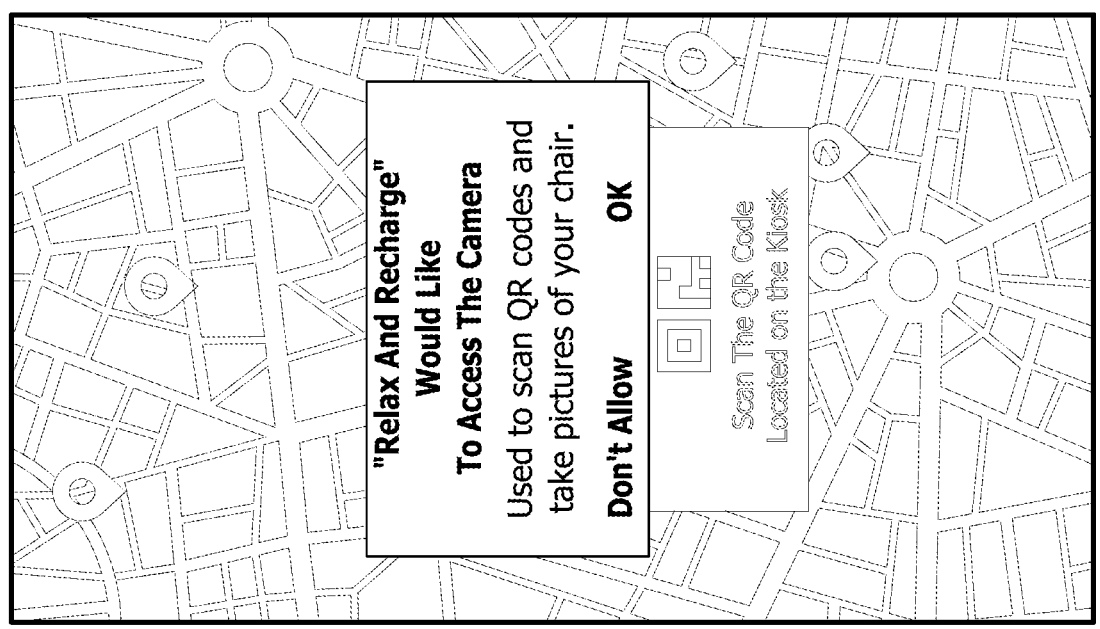
Figure 16:
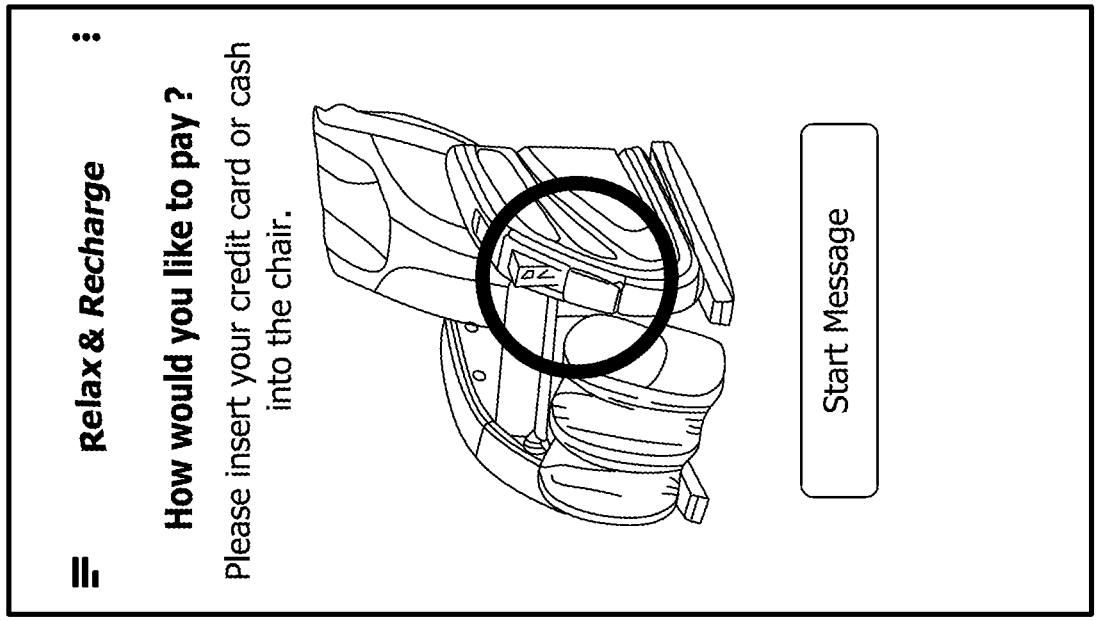
Figure 15:
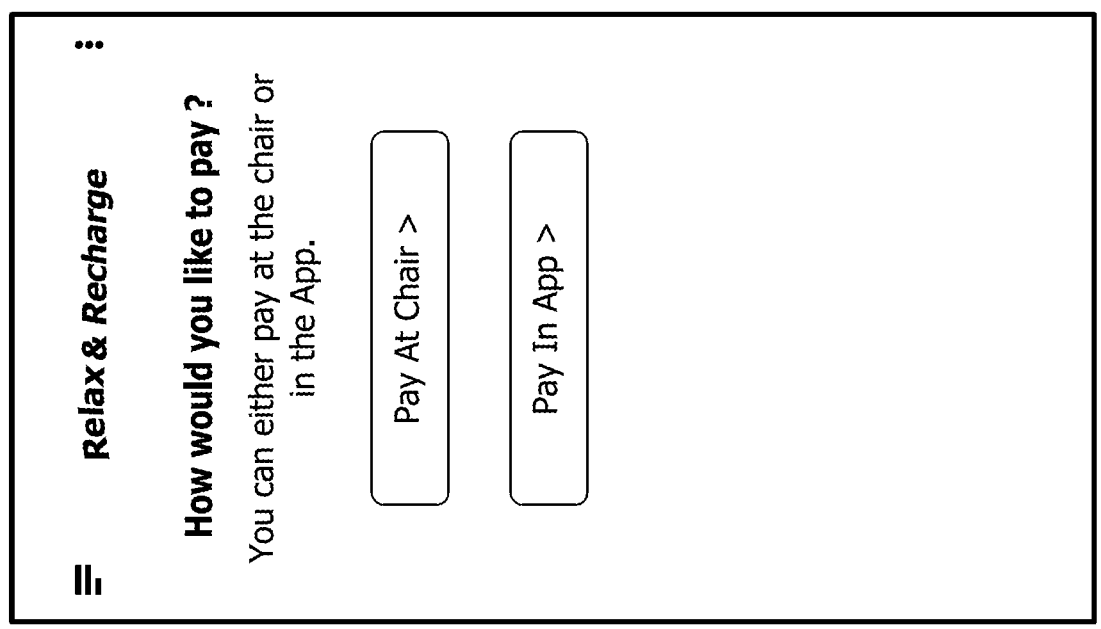
Figure 20:
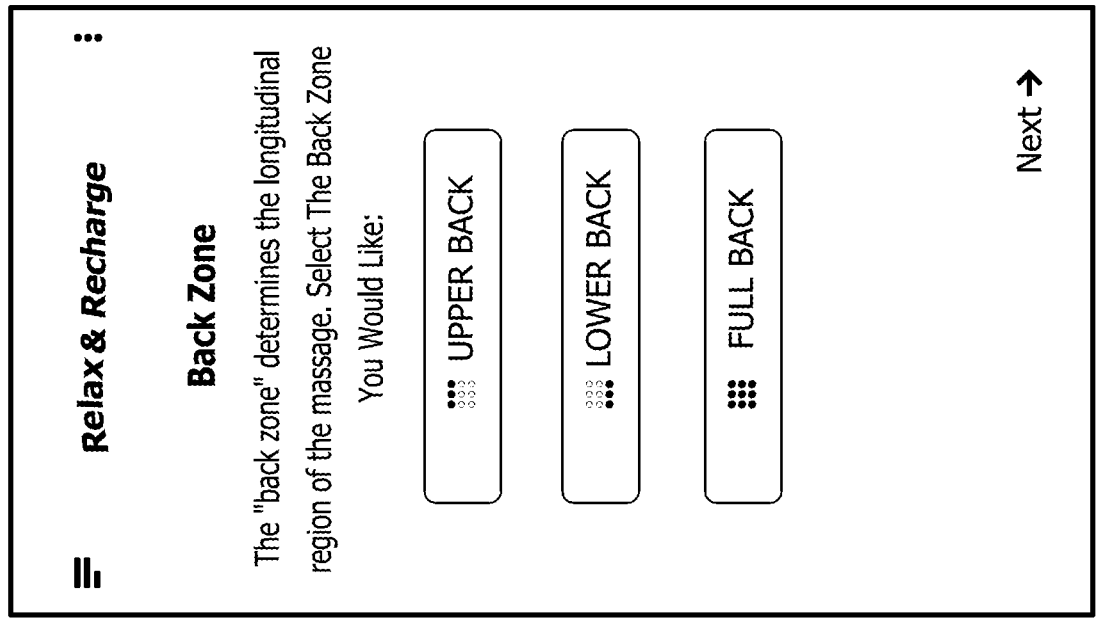
Figure 19:
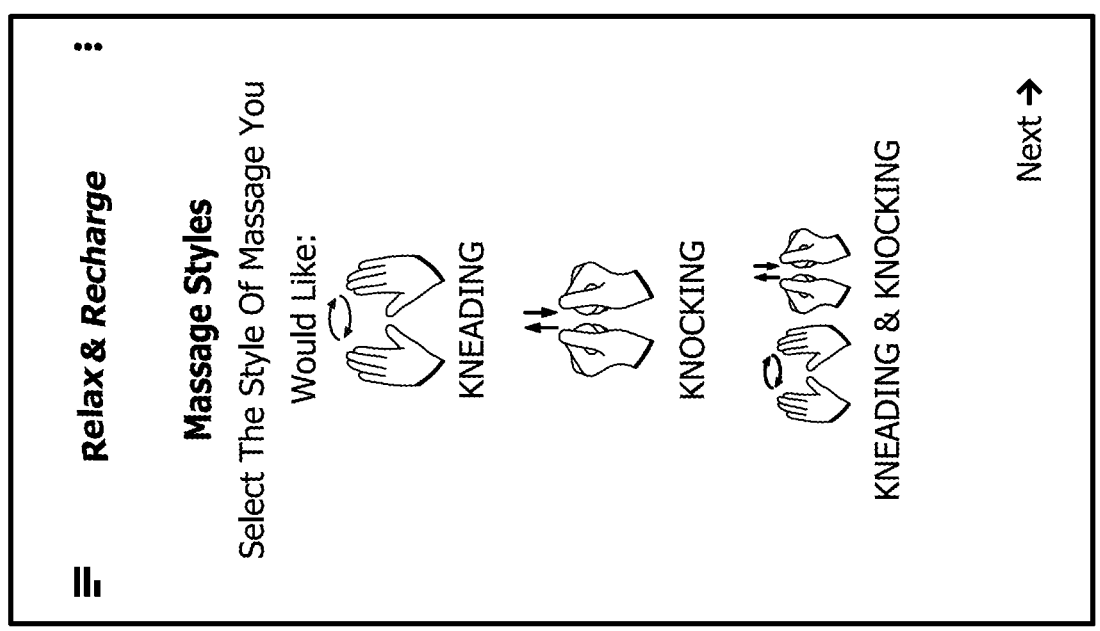
Figure 22:
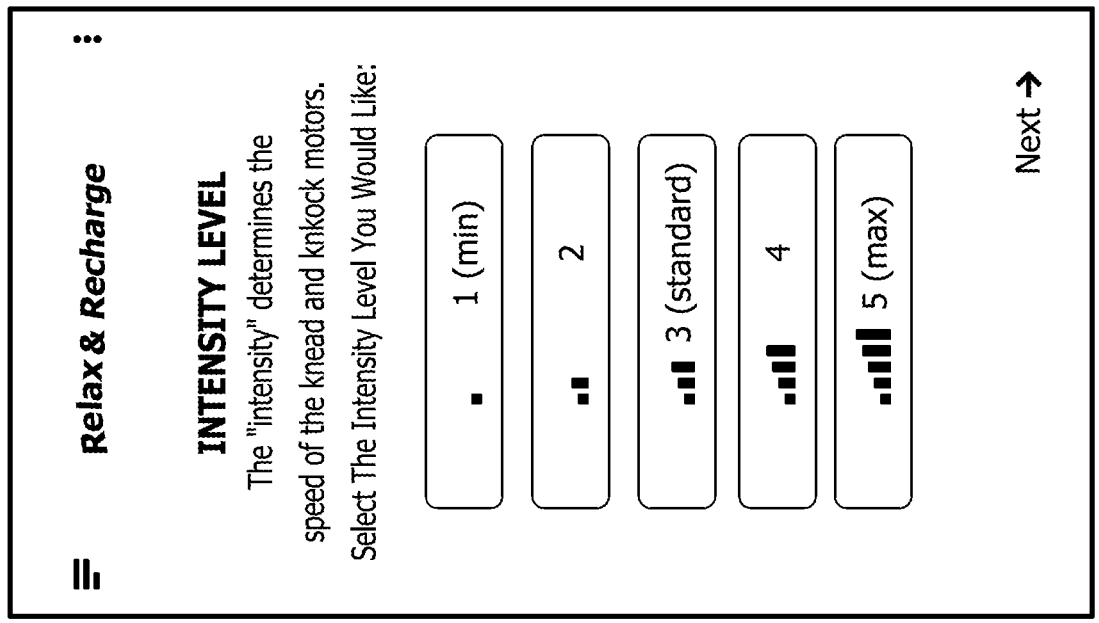
Figure 21:
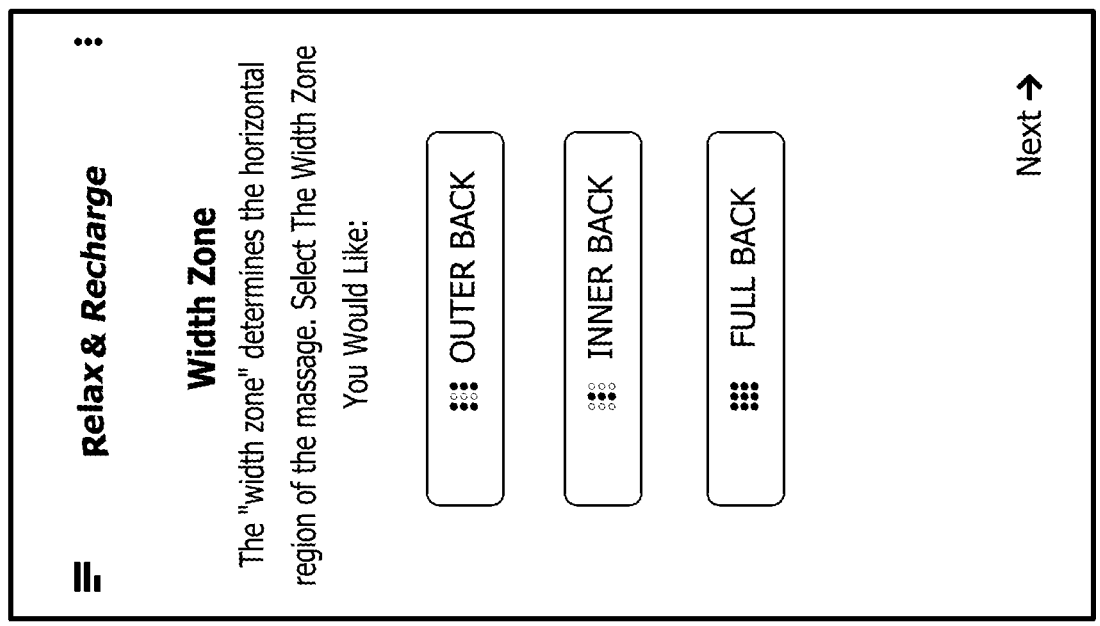
Figure 24:
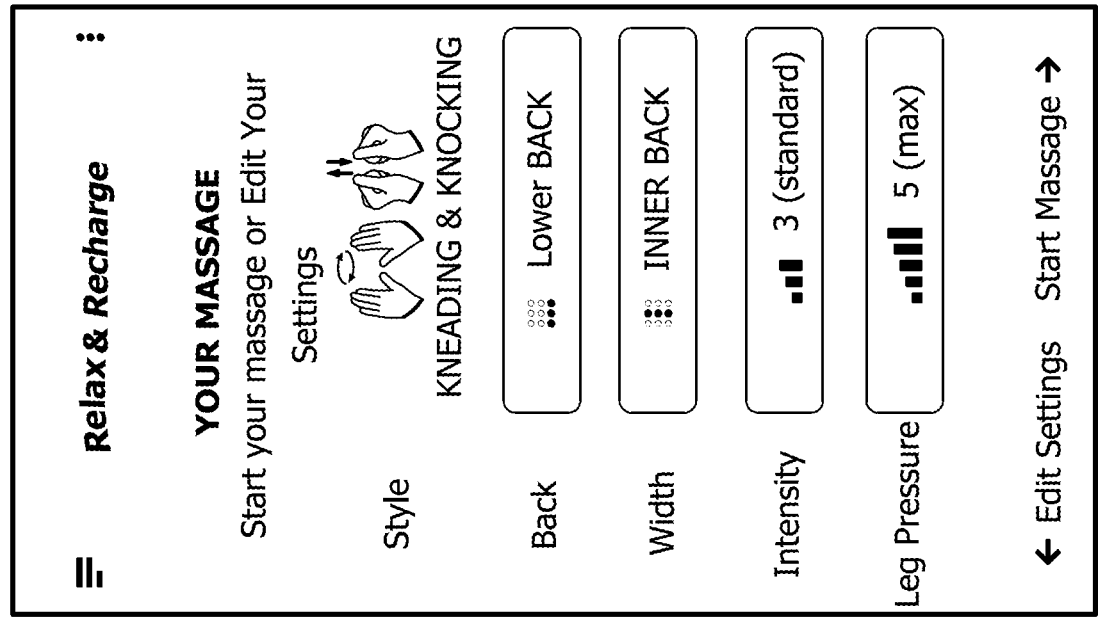
Figure 23:
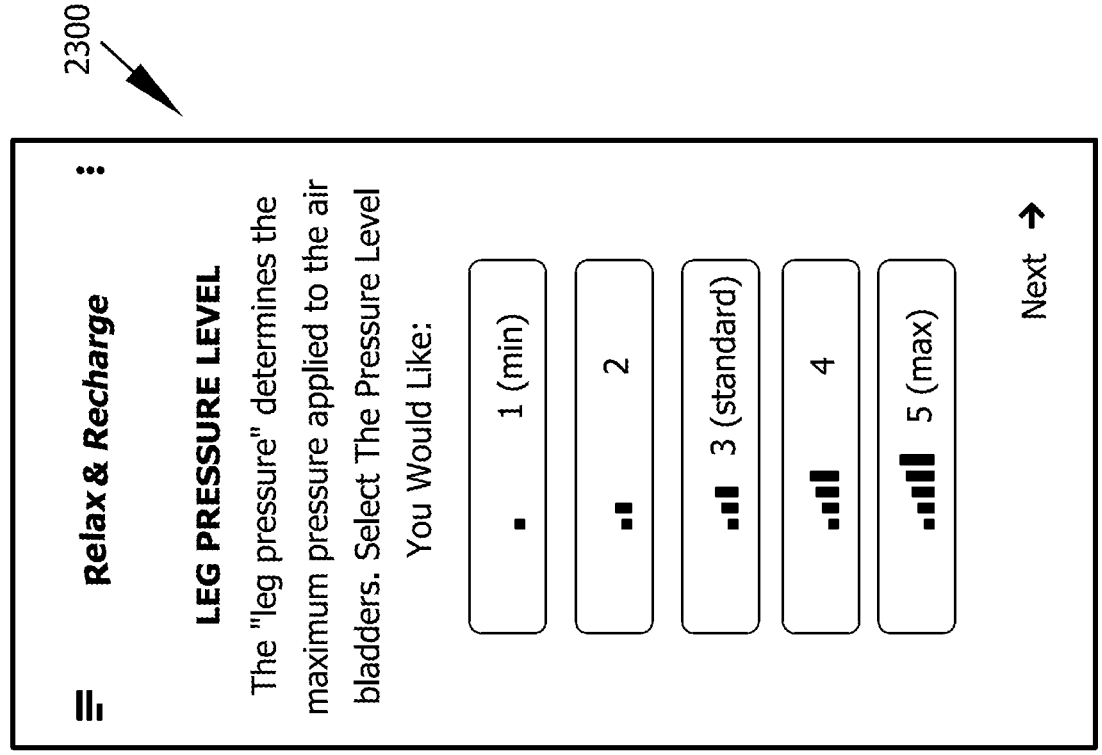
Figure 26:
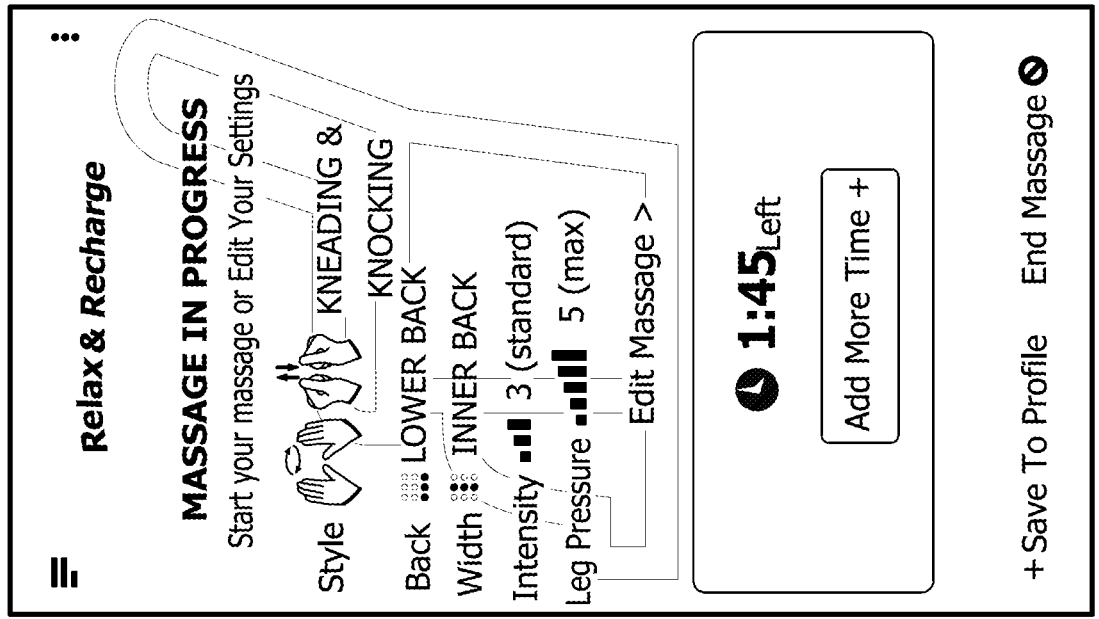
Figure 25:
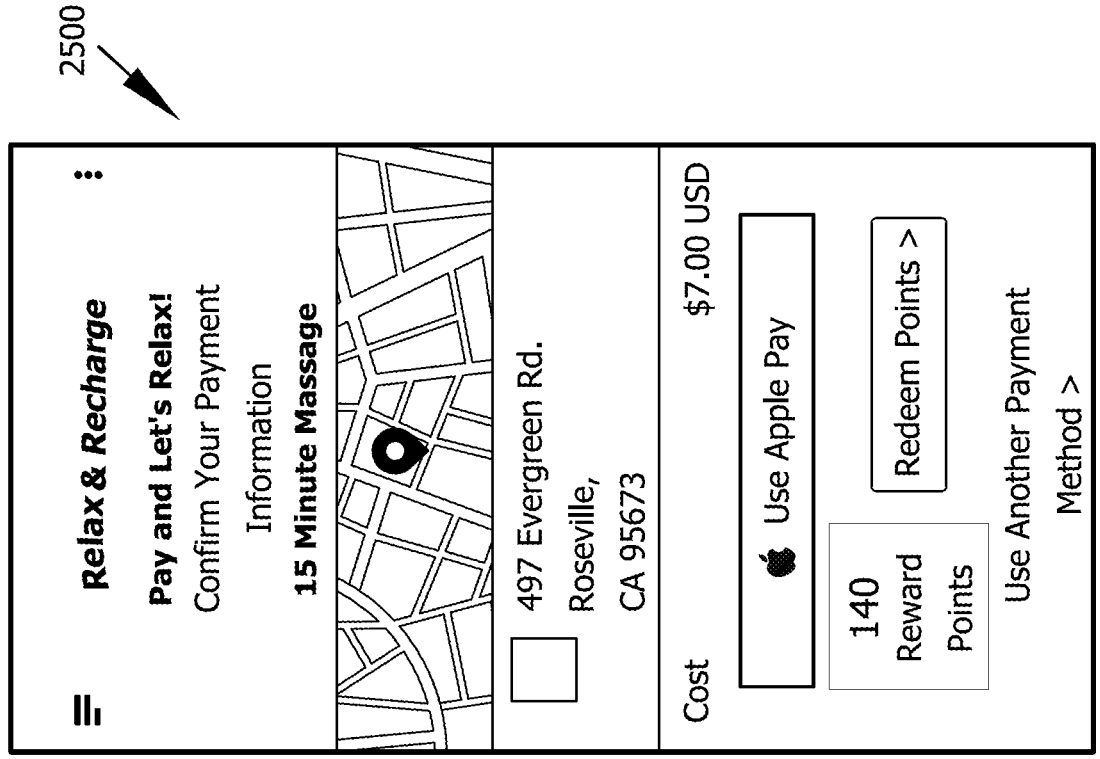
Figure 30:
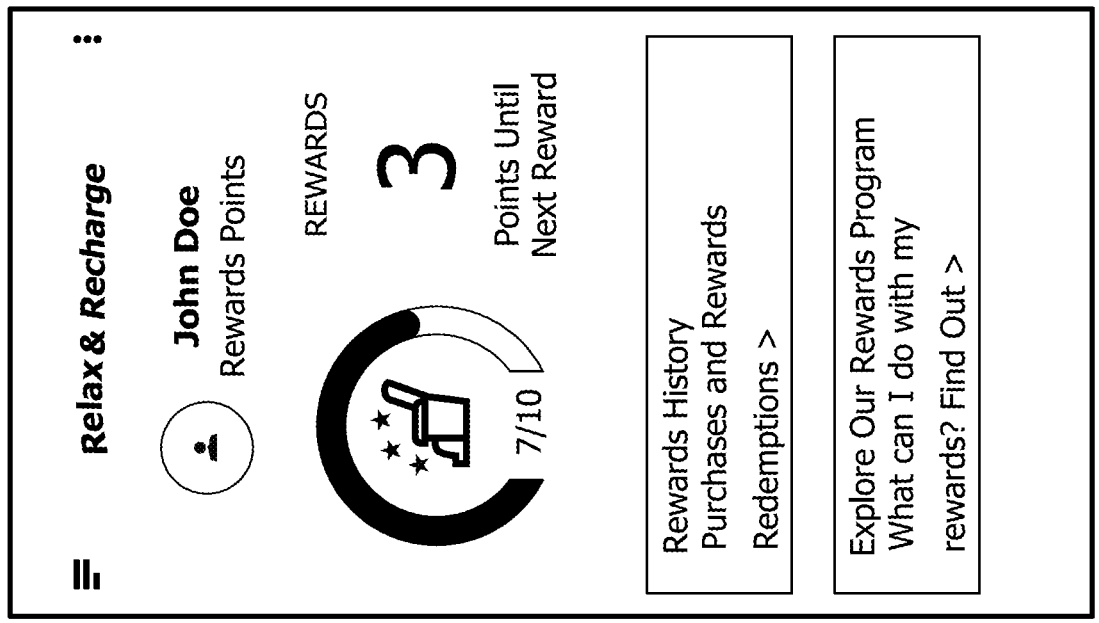
Figure 29:
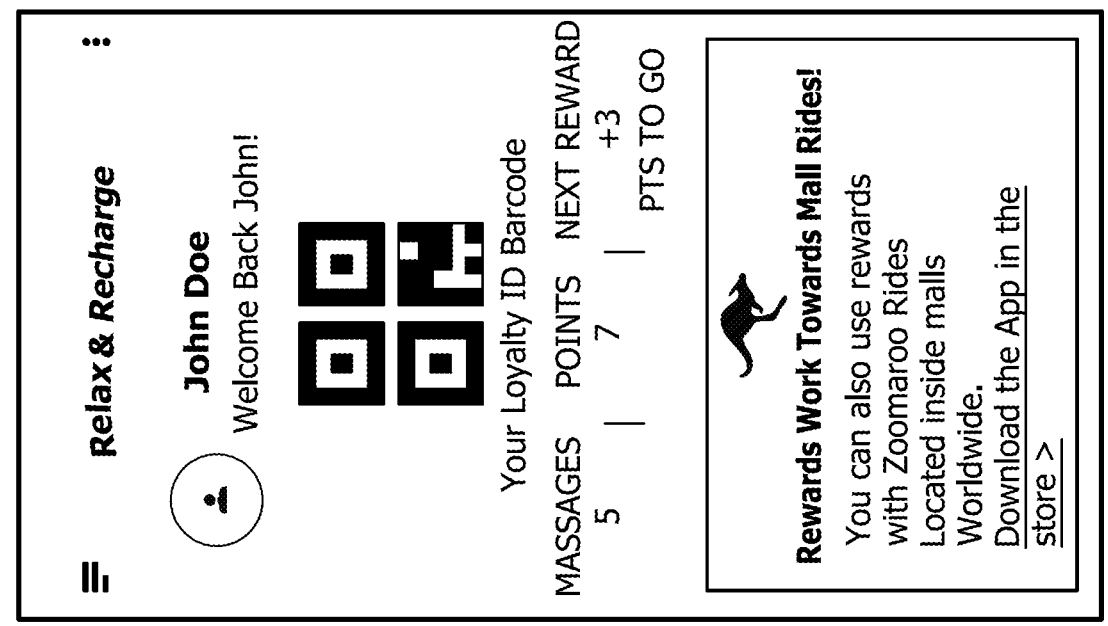
Figure 32:
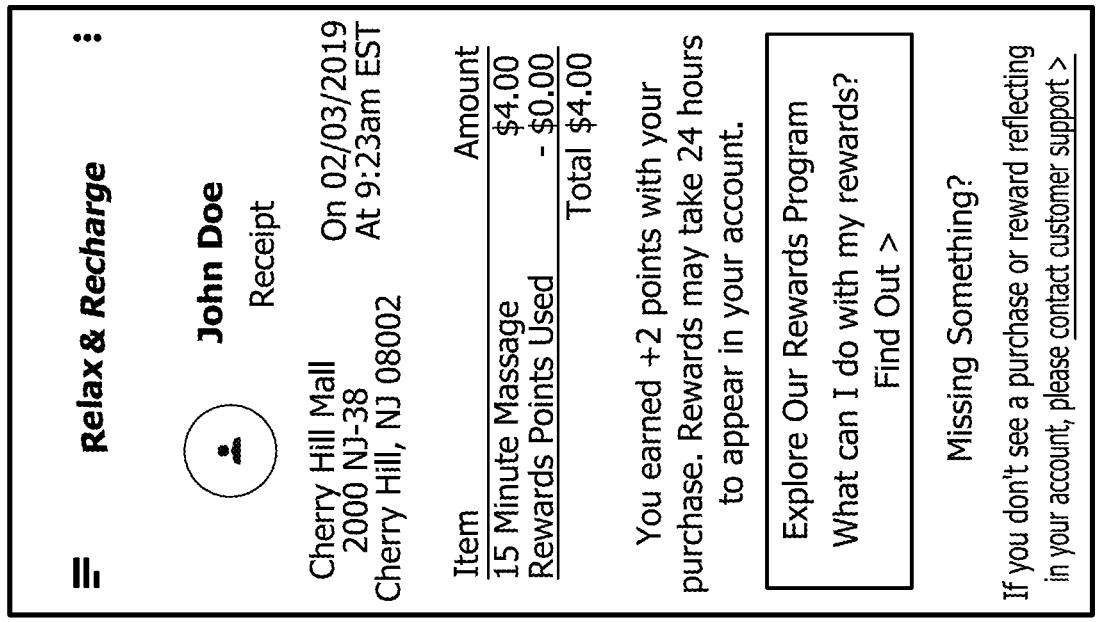
Figure 31:
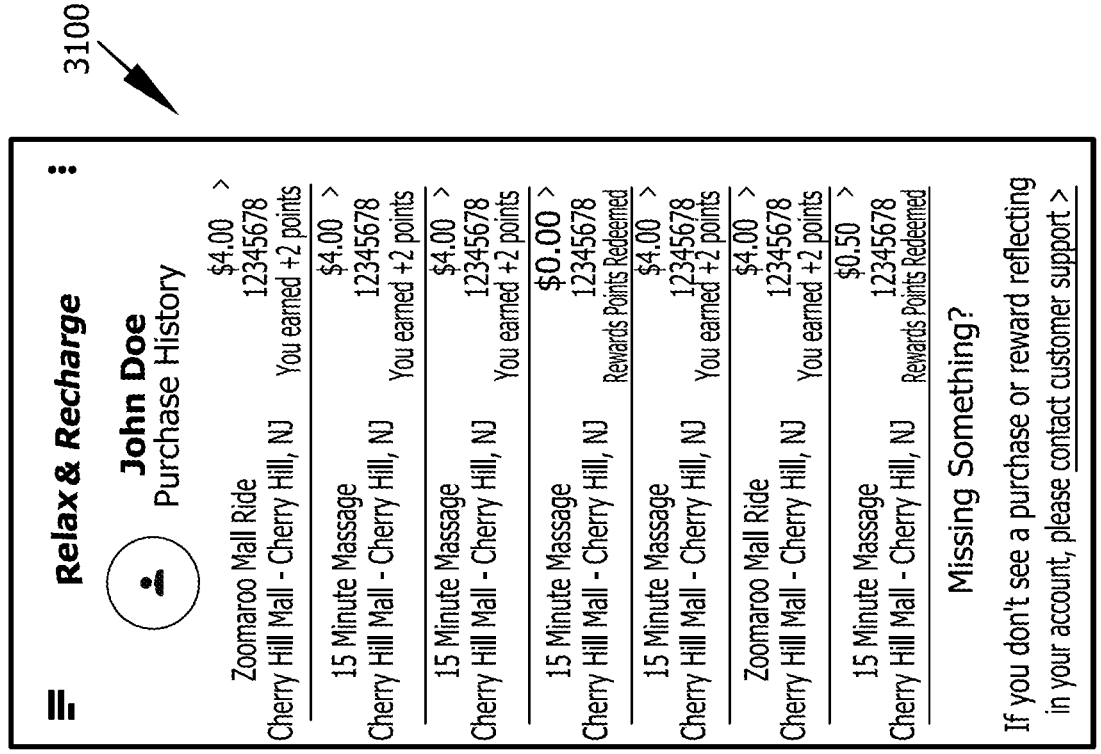
Figures 35, 36:
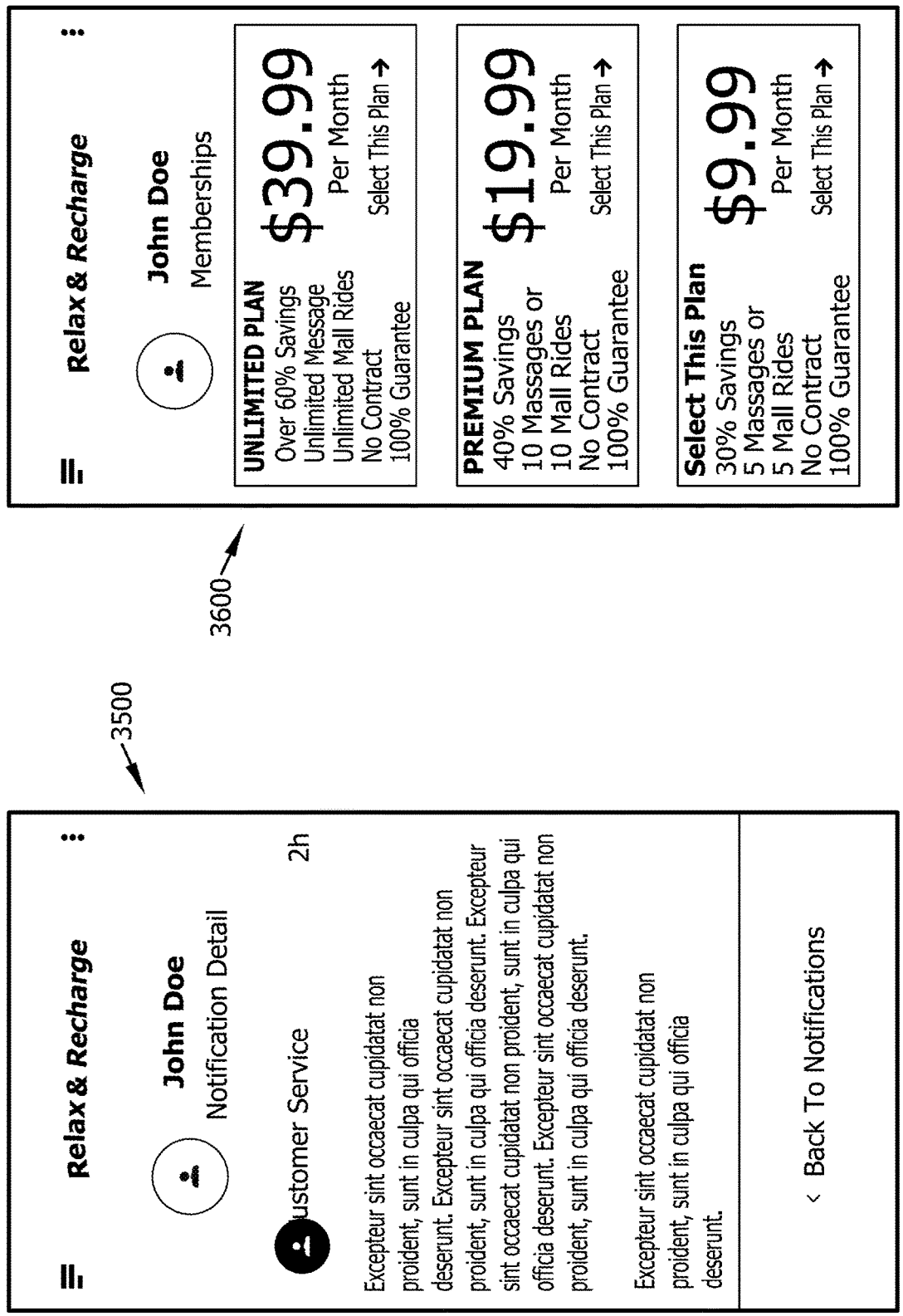

In 606, the software application is launched. An illustration showing an illustrative GUI 700 of the launched software application is provided in FIG. 7. As shown in FIG. 7, the GUI 700 includes a widget 702 for signing up for access to a vending massage chair system (e.g., system 400 of FIG. 4) and a widget 704 for logging into the vending massage chair system. An illustrative GUI 800 is provided in FIG. 8 for signing up for access to a vending massage chair system by creating an account. Techniques for creating accounts are well known, After an account has been created, an individual (e.g., individual 404 of FIG. 4) can perform user-software interactions to login to the vending massage chair system, as shown by 608. An illustration showing an illustrative GUI 900 of logging into the vending massage chair system via the software application is provided in FIG. 9. As shown in FIG. 9, the GUI 900 comprises a text box 902 for entering an email address and a text box 904 for entering a password. The GUI 900 also comprises widgets 906, 908 for logging in with other information (e.g., an Apple ID and/or Google account information).

Figure 10:
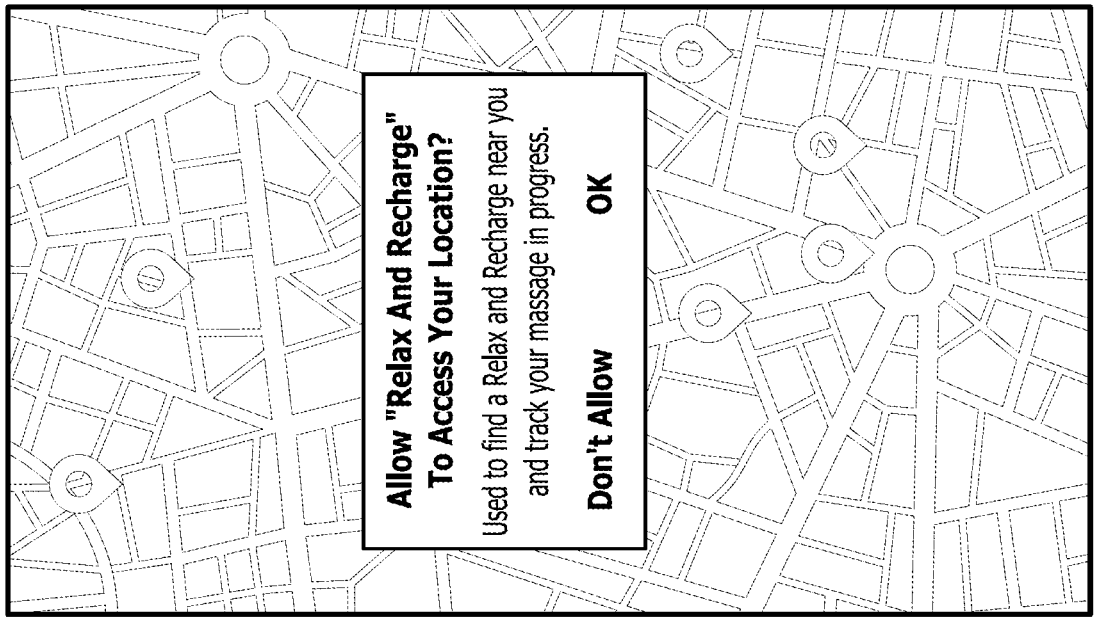

After the individual logs in or sign's up for an account, a map is presented on the mobile communication device showing a plurality of locations where massage chairs are disposed, as shown by 610. If the user allows the vending massage chair system to access a current location of his (her) mobile communication device (e.g., via GUI of FIG. 10), then the map may also include an icon or other indicator of the mobile communication device's location relative to the massage chair locations. An illustration showing an illustrative GUI 1100 comprising a map 1102 is provided in FIG. 11. If this is the first time that the individual is accessing the map 1102, then the individual may be prompted to allow the software application to access certain functions of mobile communication device (e.g., location functions). An illustrative prompt for allowing such access is shown in FIG. 10.

In 610, the individual performs user-software interactions to select a location from the plurality of locations where massage chairs are located. This selection can be achieved by touching an icon or other identifier of a massage chair location displayed on the map.

In 612, the individual performs user-software interactions to find a massage chair at the given location. 612 may involve: placing the mobile communication device in a Bluetooth discovery mode; connecting to a massage chair at the given location via Bluetooth communications; and entering a passcode. An illustration showing an illustrative GUI 1200 to facilitate the operations of 612 is provide in FIG. 12. Alternative illustrative GUIs 1300, 1400 are provided in FIGS. 13-14 to facilitate operations of 612 via barcode scanning technology.

In 614, the individual performs user-software interactions to select a payment type. Illustrative GUIs 1500, 1600 for selecting a payment type are provided in FIGS. 15-16. In 616, the individual performs user-software interactions for define a custom massage profile within the software application. Once defined, the individual can save the custom massage profile to his (her) customer account, and use the custom massage profile at any massage chair once connected. The custom massage profile can be defined by the following editable settings: a duration for a massage (e.g., 5, 10 or 15 minutes); a massage type (e.g., gentle, medium, intense); a massage style (e.g., kneading, knocking, or kneading/knocking); a body location for massage (e.g., upper back, lower back, full back, an outer back, an inner back, a full back); an intensity level or motor speed (e.g., 1, 2, 3, 4, 5 or 6) of a knead motor; an intensity level or motor speed of a knock motor; and/or a pressure level (e.g., 1, 2, 3, 4 or 5). Illustrative GUIs 1700, 1800, 1900, 2000, 2100, 2200, 2300, 2400 for defining a custom massage profile are provided in FIGS. 17-24.

Next in 618, a payment transaction is completed. An illustrative GUI 2500 is provided in FIG. 25 for facilitating the payment transaction. In 620, the massage service is initiated and provided by the massage chair. An illustrative GUI 2600 is provided in FIG. 26 which is displayed on the mobile communication device while the massage is being provided. GUI 2600 comprises information indicating progress of the massage. The individual can optionally pause the massage prior to expiration of the paid-for amount of time, and re-start the massage at a later time. An illustration of an illustrative GUI 2700 to facilitate the re-starting of a previously paused massage is provided in FIG. 27.

In 622, other system operations can be performed. For example, the individual can interact with the software application to access notifications, rewards, saved massages, historical information, settings, and/or profile information. An illustration of an illustrative GUI 2800, 2900, 3000, 3100, 3200, 3300, 3400, 3500, 3600 to facilitate performance of other operations is provided in FIGS. 28-36. Subsequently, 624 is performed where method 600 ends or other operations are performed.

Referring now to FIG. 37, there is provided a flow diagram of another illustrative method 3700 for the remote control of massage chair operations. Method 3700 include operations 3702-3744, which can be performed in the same or different order than that shown in FIG. 37. For example, establishments of a wireless session with the vending massage chair can occur after a successful purchase transaction rather than before a successful purchase transaction. Accordingly, operations 3710-3714 can be performed after operation 3724. The present solution is not limited to the particulars of this example.

Figure 37A:
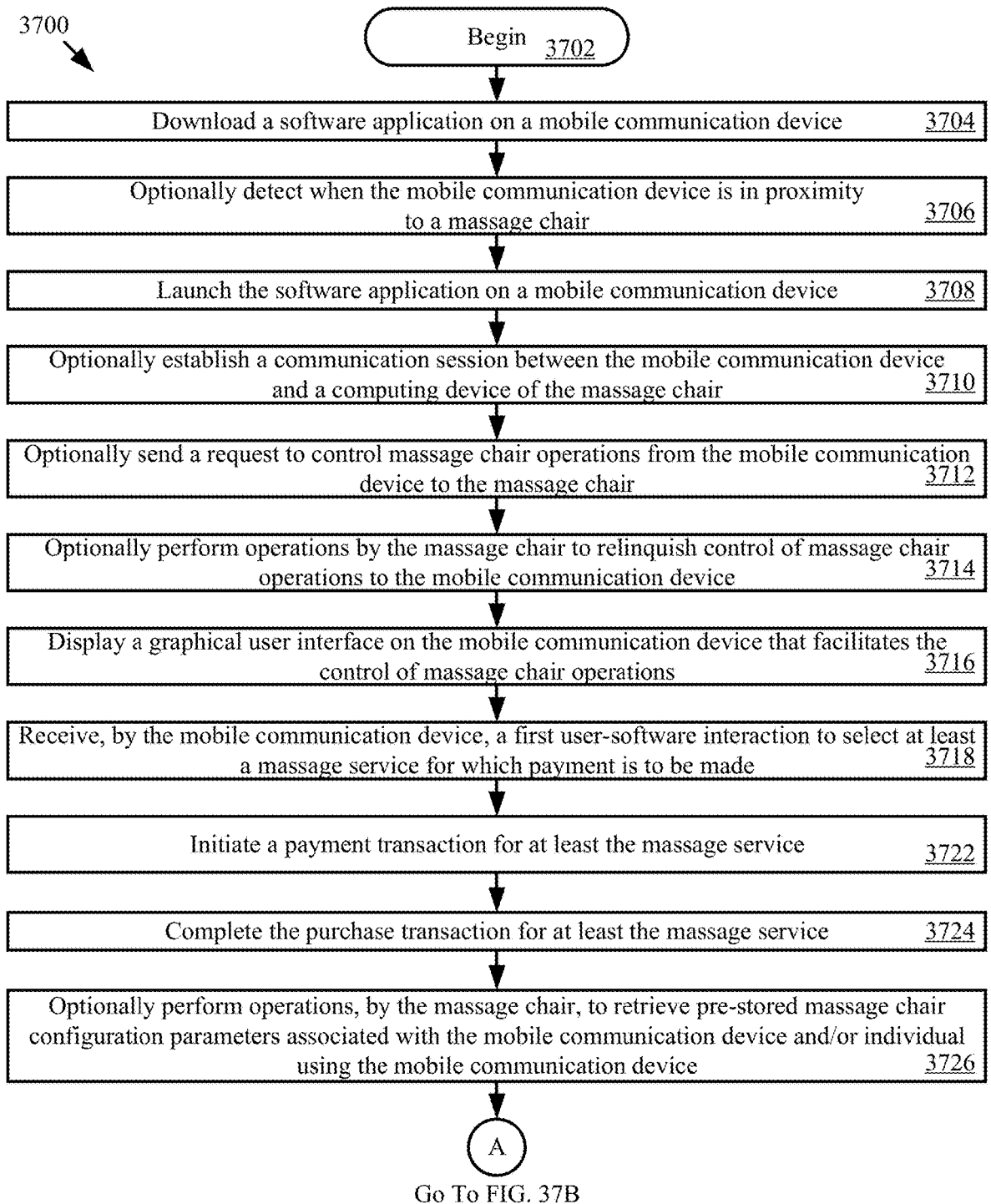
FIGS. 37A-37B (collectively referred to as "FIG. 37") provides a flow diagram of another illustrative method for the remote control of vending massage chair operations.
Figure 37B:
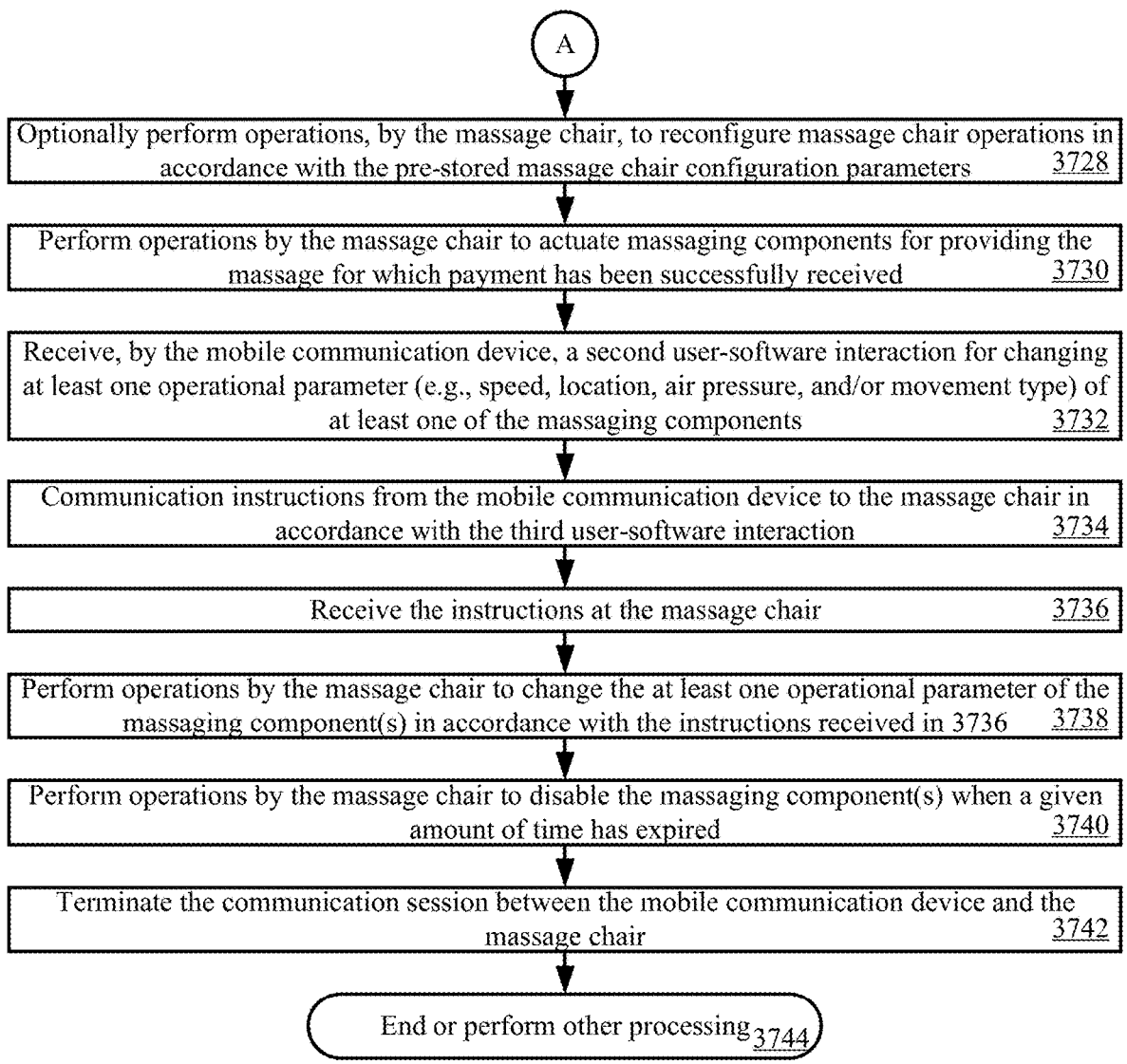
Figure 38:
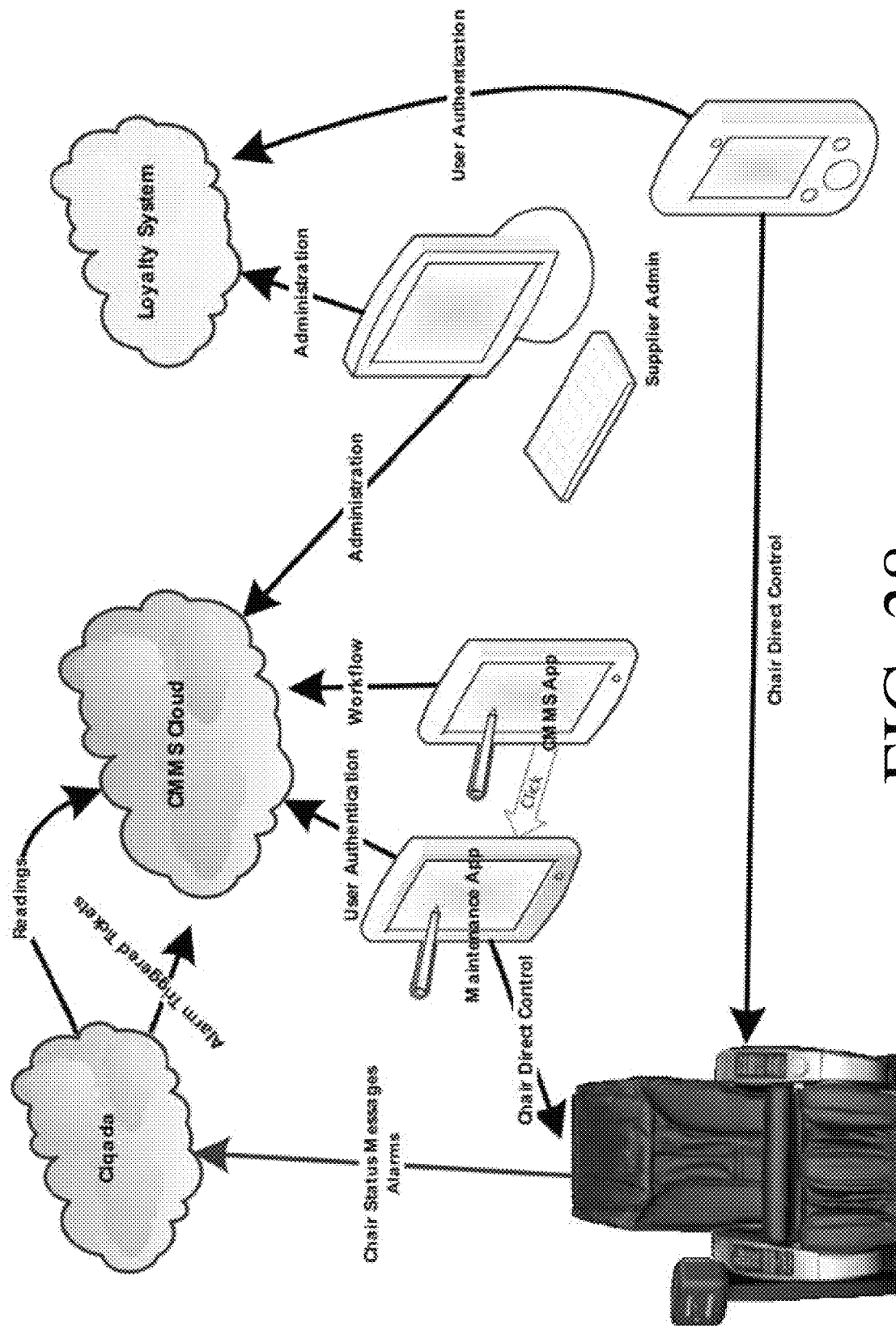
FIG. 38 provides an illustration of an illustrative system in which maintenance of a vending massage chair maintenance can be performed by an administrator and/or field service representative.

As shown in FIG. 37A, method 3700 begins with 3702 and continues with 3704 where a software application (e.g., software application 522 of FIG. 5) is downloaded or otherwise installed on a mobile communication device (e.g., mobile communication device 402 of FIGS. 4-5). Techniques for downloading and installing software applications on mobile communication devices are well known in the art, and therefore will not be described herein. Any known or to be known technique for downloading and installing software applications on mobile communication devices can be used herein without limitation. For example, the software application can be downloaded via an online App Store (e.g., Google Play Store and/or Apple App Store).

In optional 3706, the mobile communication device and/or a massage chair (e.g., vending massage chair 100 of FIGS. 1-4) perform(s) operations to detect when the mobile communication device is in proximity (e.g., <5 feet) of the massage chair. Such detections can be made using NFCs/SRCs, at least one sensor (e.g., sensors 214 of FIG. 2) of the massage chair, and/or at least one sensor (e.g., GPS circuit 540, 514, 510 of FIG. 5) of the mobile communication device.

The software application that was downloaded/installed on the mobile communication device is launched in 3708. In some scenarios, the software application is launched in response to a user-software interaction with the mobile communication device. In other scenarios, the software application is launched in response to a detection that the mobile communication device is in proximity of the massage chair. When the software application is launched for the first time, the user (e.g., user 404 of FIG. 4) may optionally be prompted to create a customer account with the system (e.g., system 400 of FIG. 4), enter customer account information to associate the particular mobile communication device with a given customer account, and/or update customer account information for a given customer account. In this regard, the mobile communication device can communicate with a remote management system (e.g., management system 408 of FIG. 4) (e.g., a remote sever and/or datastore) over a network (e.g., network 406 of FIG. 4).

Once launched and/or a customer account is created/updated, the software application optionally causes the mobile communication device to perform operations in 3710 for establishing a communication session with the massage chair. The communication session can be achieved, for example, using NFC technology and/or SRC technology (e.g., Bluetooth technology). Methods for establishing communication sessions are well known in the art.

Next in 3712, the mobile communication device optionally sends a request to control massage chair operations. In response to the request, the massage chair performs operations in optional 3714 to relinquish control of its operations to the mobile communication device. A validation operation may optionally be performed prior to allowing the mobile communication device to take control of the massage chair operations. For example, the request can include a customer identifier and/or mobile device identifier. The massage chair can validate that the customer identifier and/or mobile device identifier is (are) associated with a valid and/or active customer account and/or an authorized individual. If so, then the massage chair relinquishes control of the massage chair operations to the mobile communication device. If not, then the massage chair causes the mobile communication device to prompt the user (e.g., user 404 of FIG. 4) for information to create or update a customer account. The user entered information is then communicated from the mobile communication device to the remote management system (e.g., management system 408 of FIG. 4). The remote management system then creates or updates a customer account, and sends a notification to the mobile communication device and/or massage chair when the customer account creation/update has been completed. At this time, control of the massage chair is relinquished to the mobile communication device.

In 3716, a GUI is displayed on the mobile communication device. The GUI is designed to facilitate the control of massage chair operations. In some scenarios, the GUI is the same as or similar to the GUI presented on a display (e.g., I/O device 208 of FIG. 2) of the massage chair's control panel (e.g., control panel 114 of FIGS. 1-2). Accordingly, the locations of control widgets may be displayed in the same or substantially similar relative locations on both the mobile communication device and the control panel of the massage chair. In other scenarios, the GUI comprises a virtual control panel for controlling massage chair operations. The virtual control panel can include, but is not limited to, virtual buttons, virtual sliders, virtual joysticks, and/or other virtual widgets. Other input means of the mobile communication device can additionally or alternatively be used to control operations/functions of the massage chair. For example, voice commands and/or gestures can additionally or alternatively be used to control massage chair operations via the mobile communication device. The present solution is not limited to the particulars of these scenarios and/or examples.

In 3718, the mobile communication device receives a first user-software interaction to select at least a massage service for which payment is to be made. Other services which may be selected include, but are not limited to, a charging service for charging a battery of a device external to the massage chair, and/or a media service for accessing media content (e.g., a video, movie, tv show, music station, and/or music playlist). The media service can allow media content (audio and/or visual content) to be streamed to the massage chair for output therefrom and/or to the mobile communication device for output therefrom. Notably, the massage chair may include a discomforting mechanism to prevent people from sitting in the massage chair without payment for a massage service. Accordingly, other services provided by the massage chair (e.g., charging services and/or media services) may only be provided (e.g., as paid-for services or complimentary services) during a duration of time in which a massage is being provided by the massage chair.

In 3722, the mobile communication device performs operations in 3722 to initiate a payment transaction for at least the massage service. Payment transactions are well known in the art, and therefore will not be described here. The payment transaction is completed in 3724. The payment transaction may be facilitated by a payment unit (e.g., payment unit 112 of FIGS. 1-2) of the massage chair.

Upon completion of the payment transaction, the massage chair may optionally perform operations in 3726 to retrieve pre-stored massage chair configuration parameters associated with the mobile communication device and/or the individual using the mobile communication device. Method then continues with 3728 of FIG. 37B where massage chair operations are reconfigured in accordance with the pre-stored massage chair configuration parameters retrieved in 3726.

Next in 3730, the massaging components (e.g., massaging components 206 of FIG. 2) are actuated or otherwise enabled for providing the massage for which payment has been successfully received. The operational parameters of the massaging components may be changed or otherwise adjusted by a user of the massage chair. Accordingly, the mobile communication device receives a second user-software interaction in 3732 for changing at least one operational parameter of at least one massaging component. The operational parameter can include, but is not limited to, a motor speed, a tissue manipulator location, a bladder air pressure, and/or a movement type (e.g., a linear up/down movement, a linear side-to-side movement, a rotational movement, a serpentine movement, and/or vibratory movement). Instructions in accordance with the second user-software interaction are then sent in 3734 from the mobile communication device to the massage chair. The instructions are received by the massage chair in 3736. In response to the instructions, the massage chair performs operations to change the operational parameter(s) of the massaging component(s). When a given amount of time has expired, the massage chair disables or deactivates the massaging component(s).

Subsequently, the communication session between the mobile communication device and the massage chair is terminated. The communication session can be terminated in a variety of ways. For example, the communication session can be terminated by: performance of a user-software interaction with the mobile communication device; performance of a user-software interaction with the massage chair; automatically when the mobile communication device moves a certain distance from the massage chair; and/or session activity has not occurred in a threshold period of time. Upon termination of the communication session, 3742 is performed where method 3700 ends or other processing is performed (e.g., return to 3708 or 3710 of FIG. 37A).

The present solution has been described above in relation to a software application that allows a user or customer to control operations of the massage chair. The present solution is not limited in this regard. The software application can also be configured to allow an administrator and/or field service representative to control operations of the vending massage chair which are the same as or different than the massage chair operations controlled by the customer's mobile communication device. The administrator and/or field service representative can use the software application (installed on a mobile communication device) to diagnose an operational state of the massage chair, turn on one or more electrical components of the massage chair, generate and view reports concerning use of the massage chair, generate and view reports concerning operations and/or system faults of the massage chair, complete audit sheets, track movement of the massage chair, record and/or order parts needed to repair and/or service the massage chair, and/or record chair maintenance. Illustration that are useful for understanding how vending massage chair maintenance can be performed by an administrator and/or field service representative is provided in FIG. 39, FIG. 55 and FIG. 56. The system may require that the administrator and/or field service representative be registered and/or authenticated prior to being allowed to interface with the vending massage chair software and/or hardware via a computing device (e.g., a remote server and/or a mobile communication device). Illustrative GUIs to facilitate vending massage chair maintenance are provided in FIGS. 40-50 and FIGS. 52-56.

Figure 39:
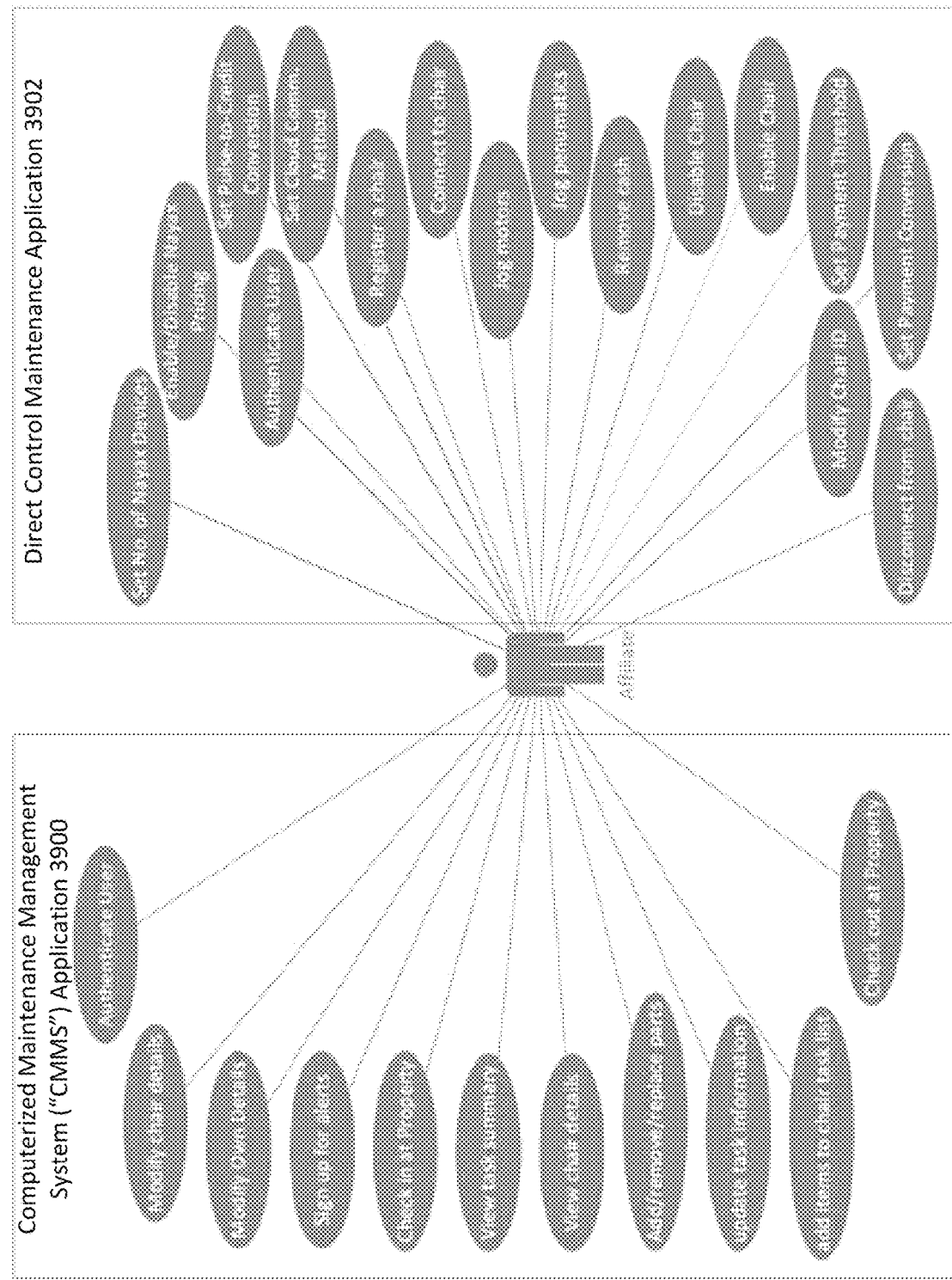
FIG. 39, FIG. 55 and FIG. 56 provide illustrations that are useful for understanding how vending massage chair maintenance can be performed by an administrator and/or field service representative using the system of FIG. 38.

Referring now to FIG. 39, there are three applications for the present solution. These three applications include (i) an administrator application, (ii) a Field Service Representative (FSR) mobile application and (iii) a consumer mobile application. The administrator is an employee of an entity who manages supervisors of FSRs. The FSR is a person who performs maintenance on a vending massage chair and has his (her) own unique login to a mobile application for data tracking purposes. The following discussion is directed to applications (i) and (ii) since application (iii) was discussed in detail above.

Figure 40:
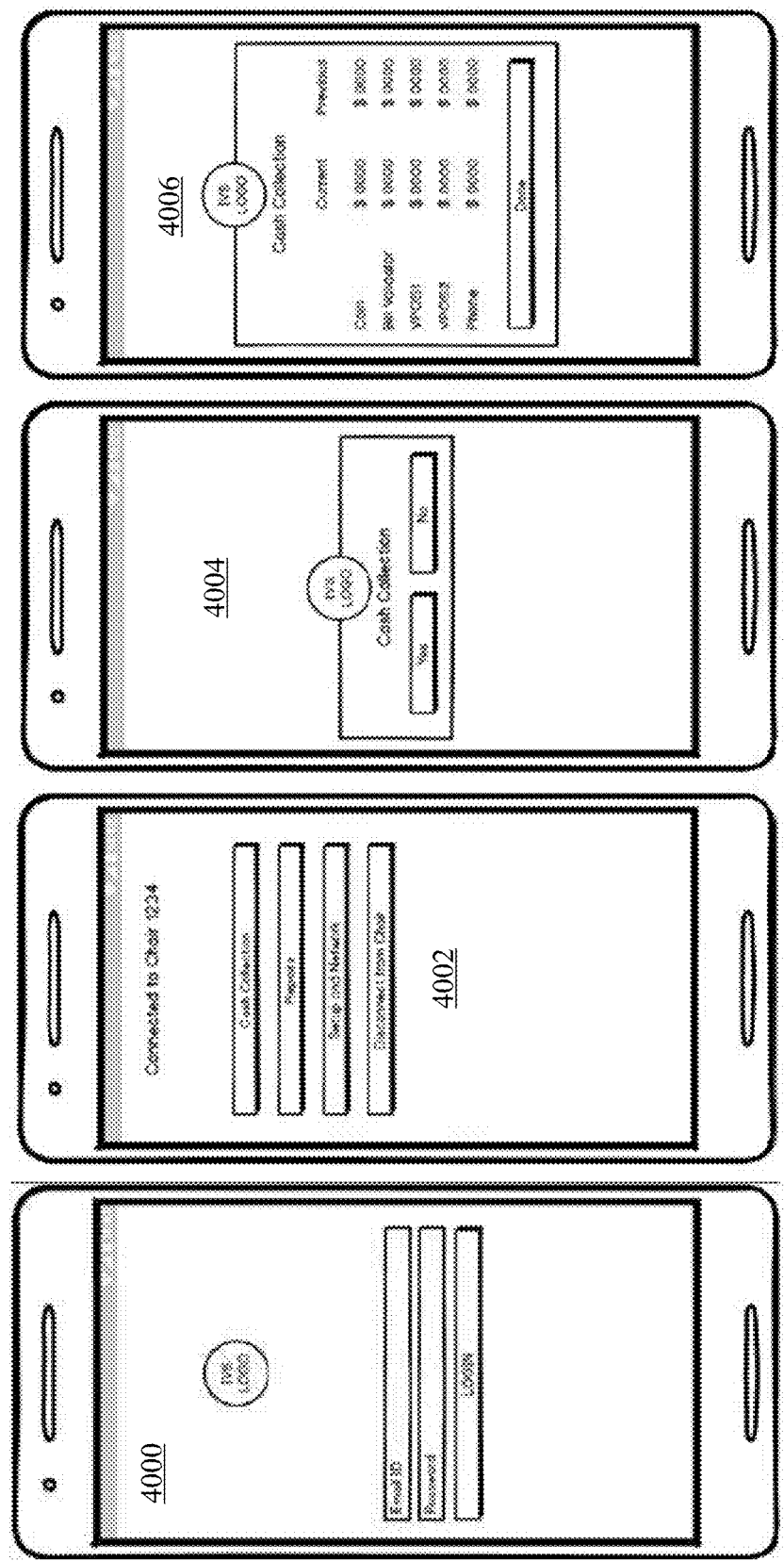
FIGS. 40-54 provide illustrations of illustrative GUIs to facilitate vending massage chair maintenance by a field service representative.
Figure 41:
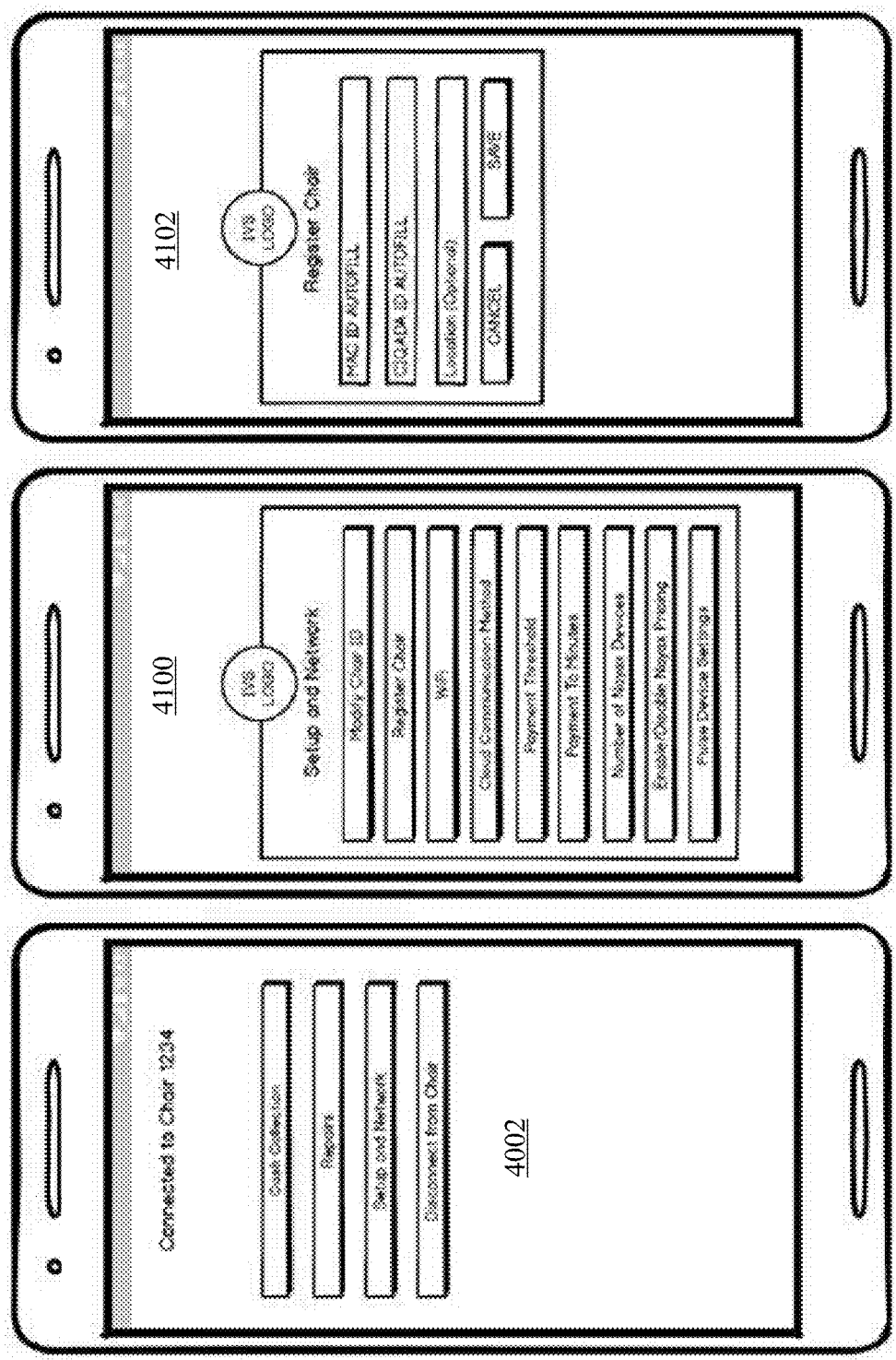
Figure 42:
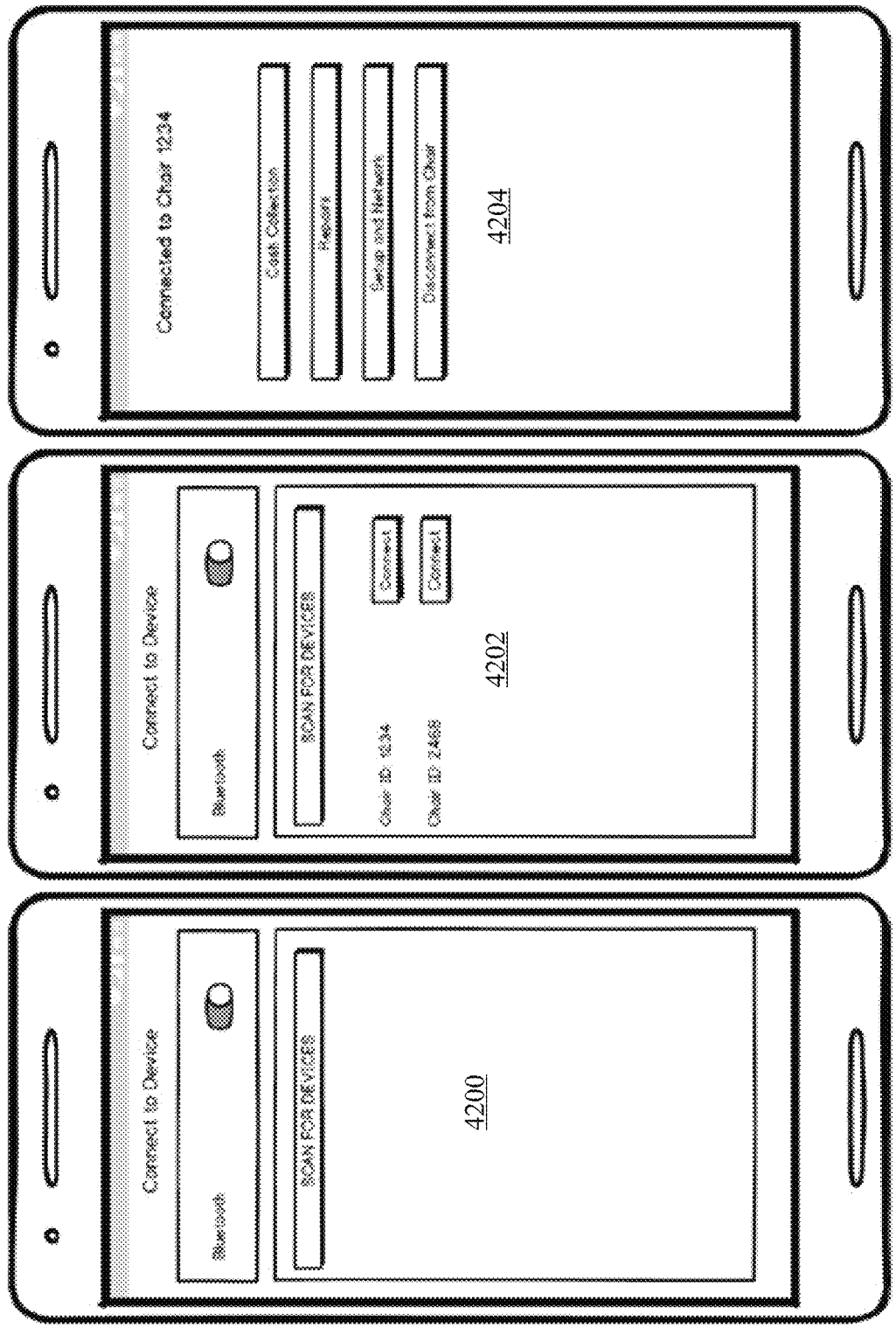
Figure 43:
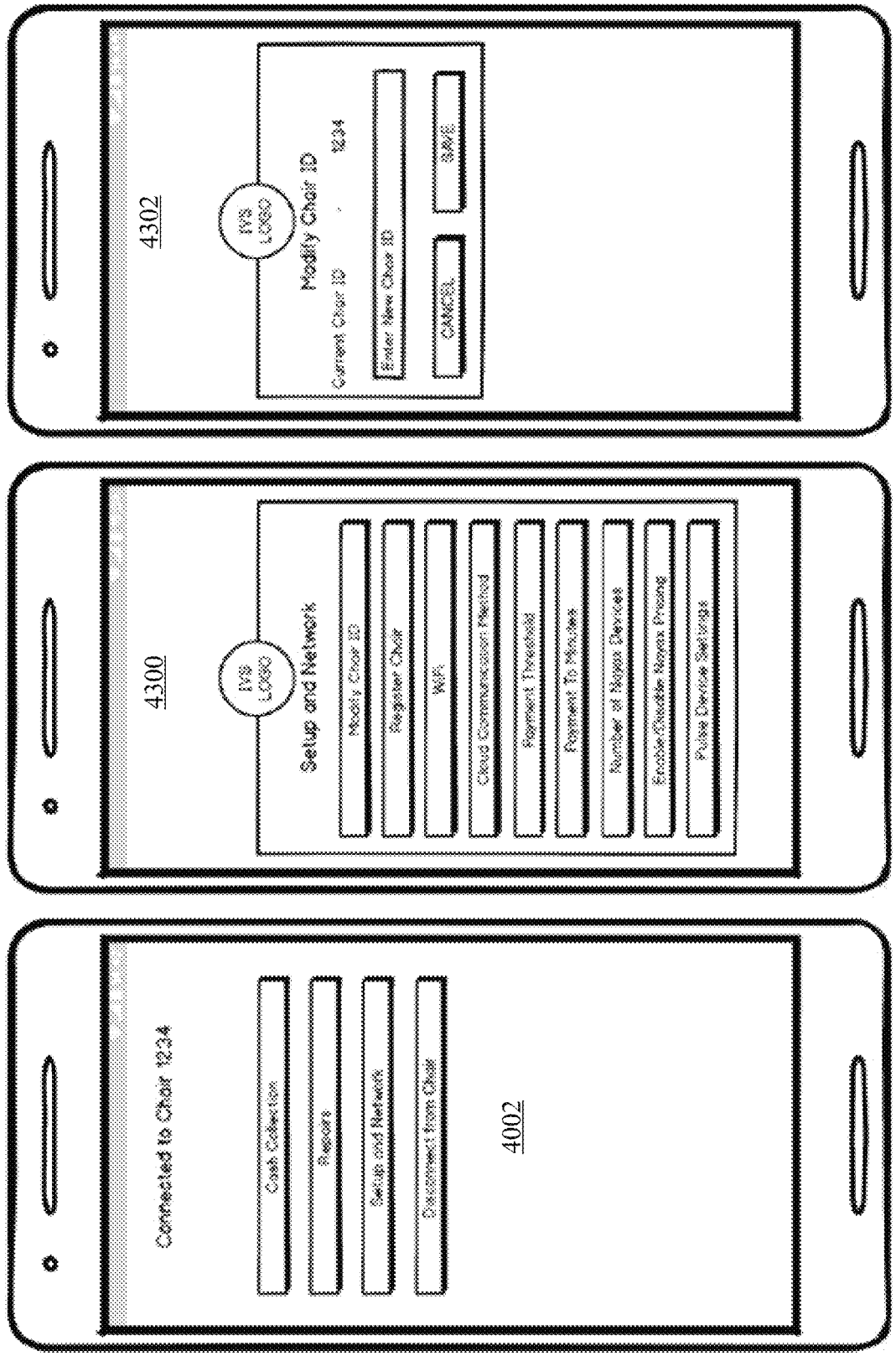
Figure 44:
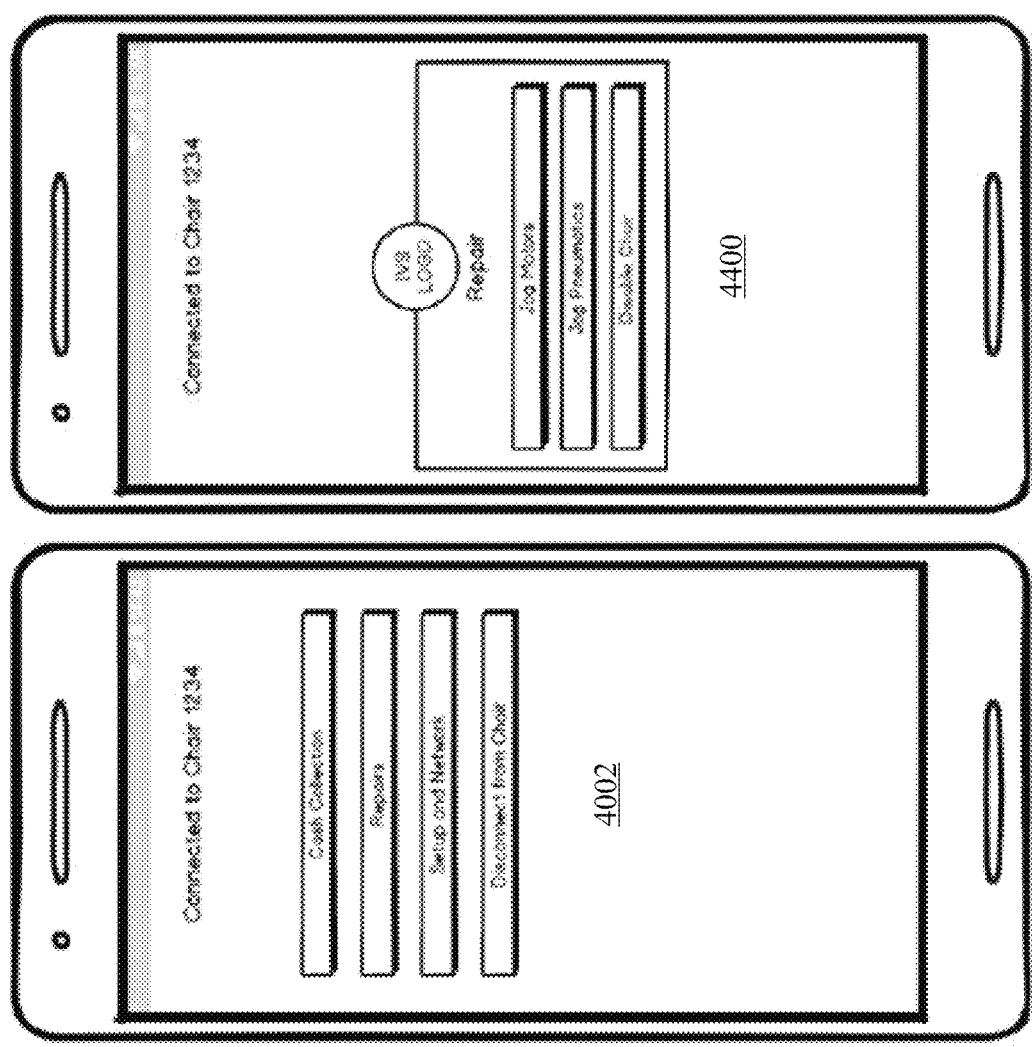
Figure 45:
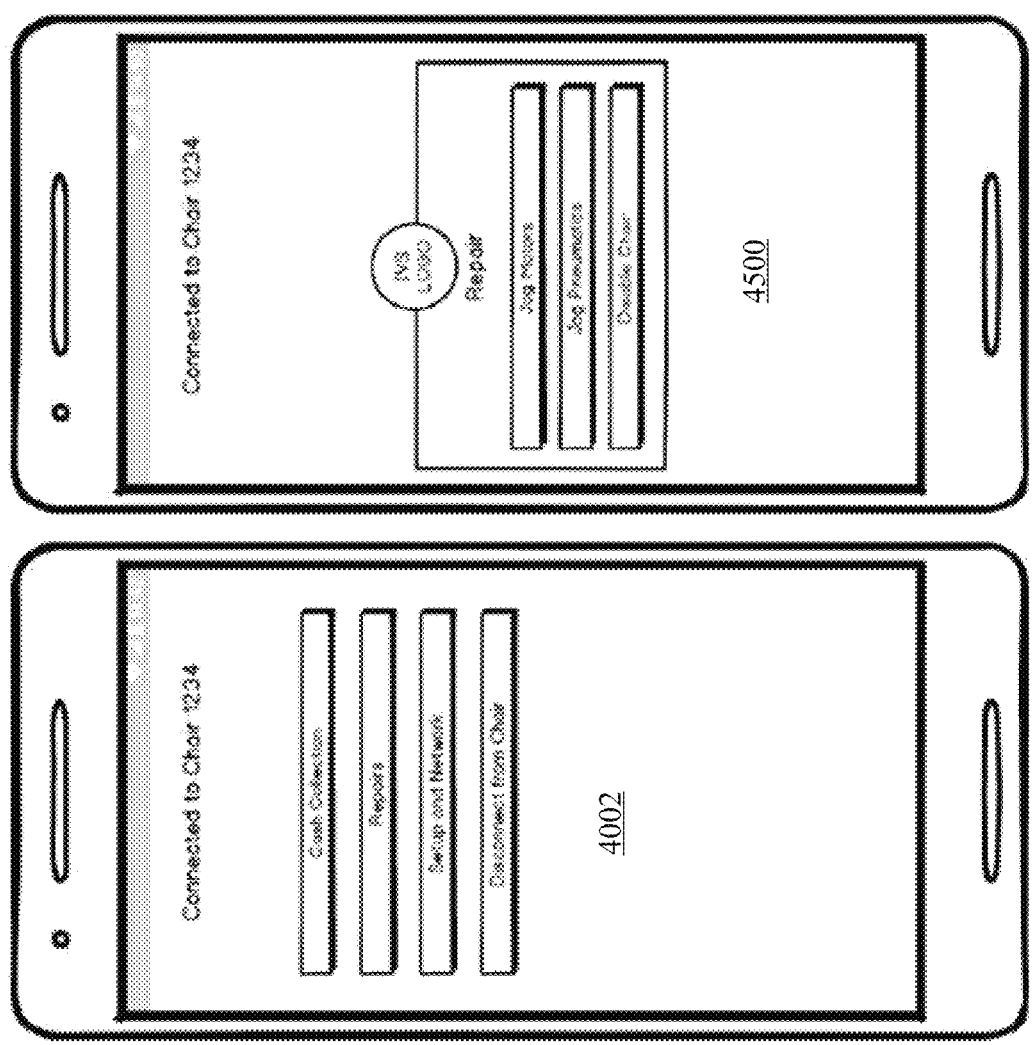
Figure 46:
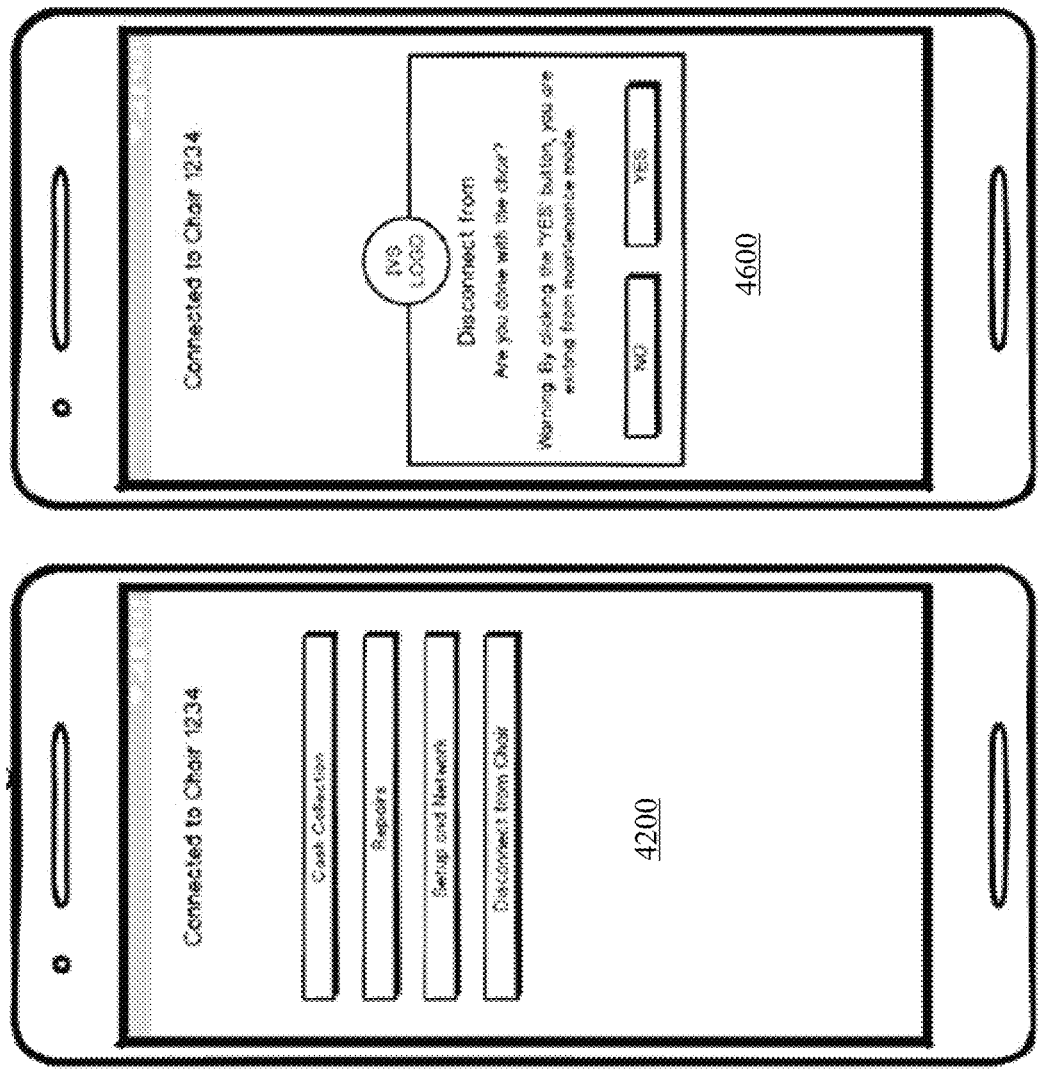
Figure 47:
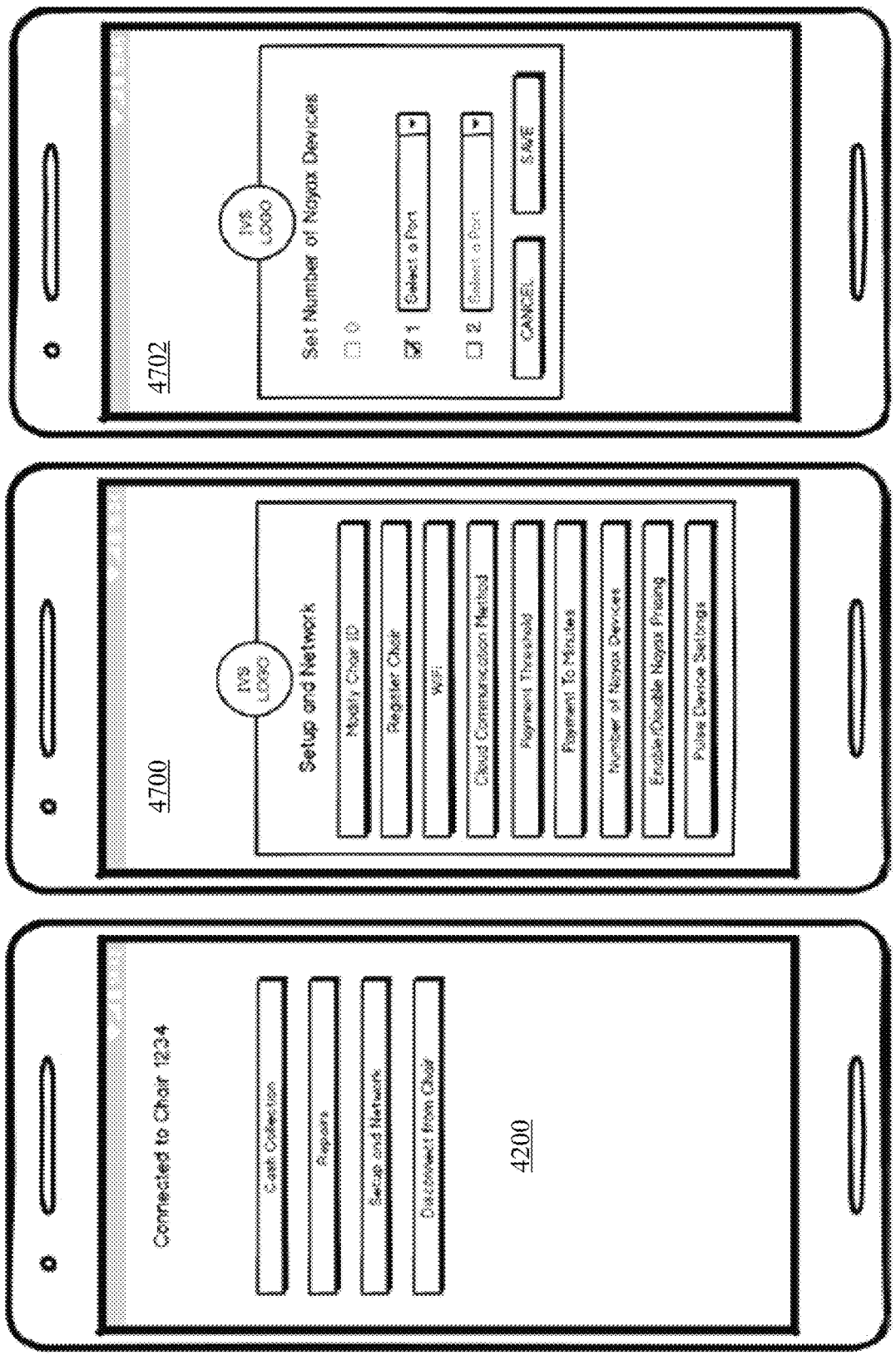
Figure 48:
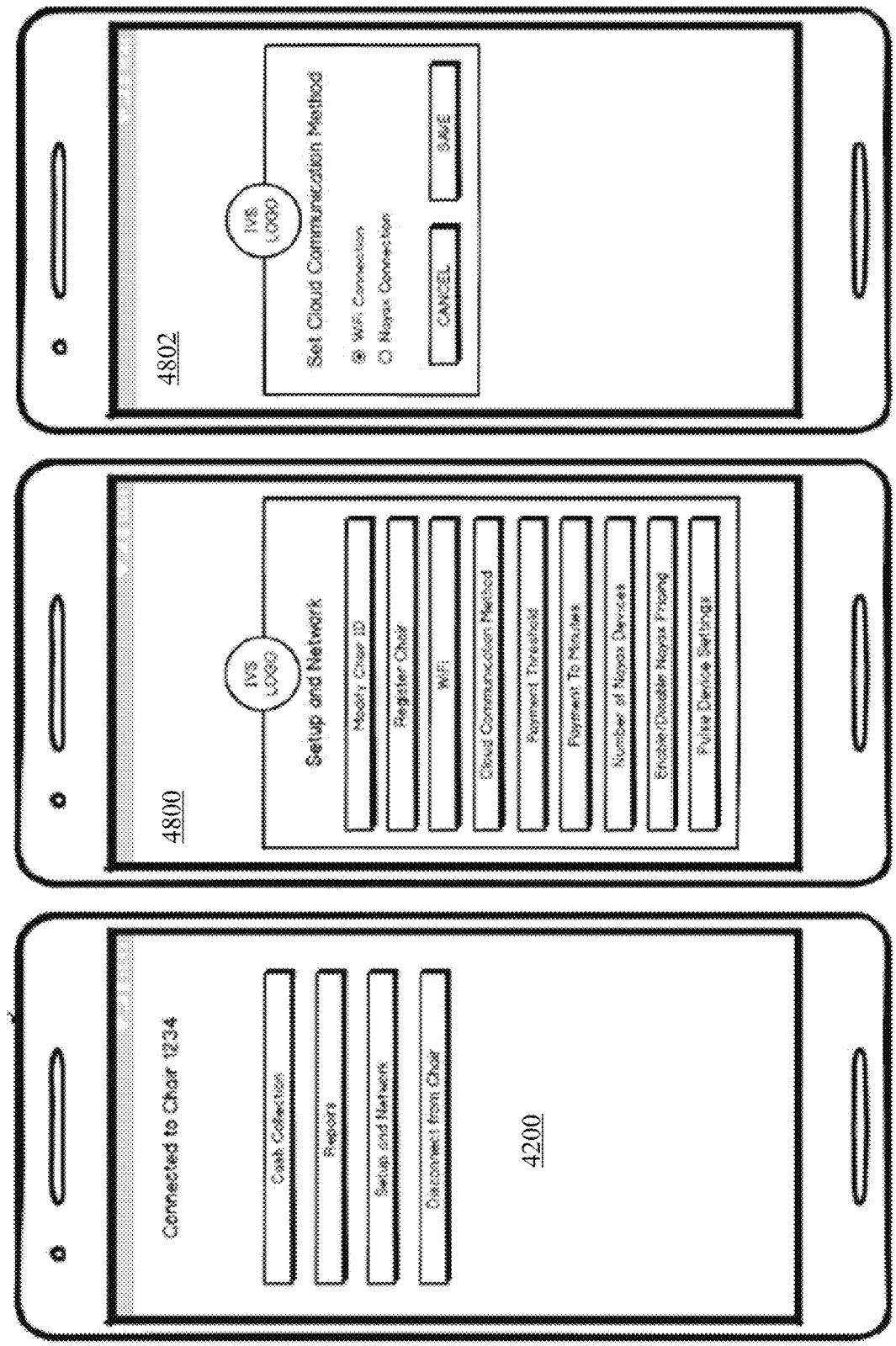
Figure 49:
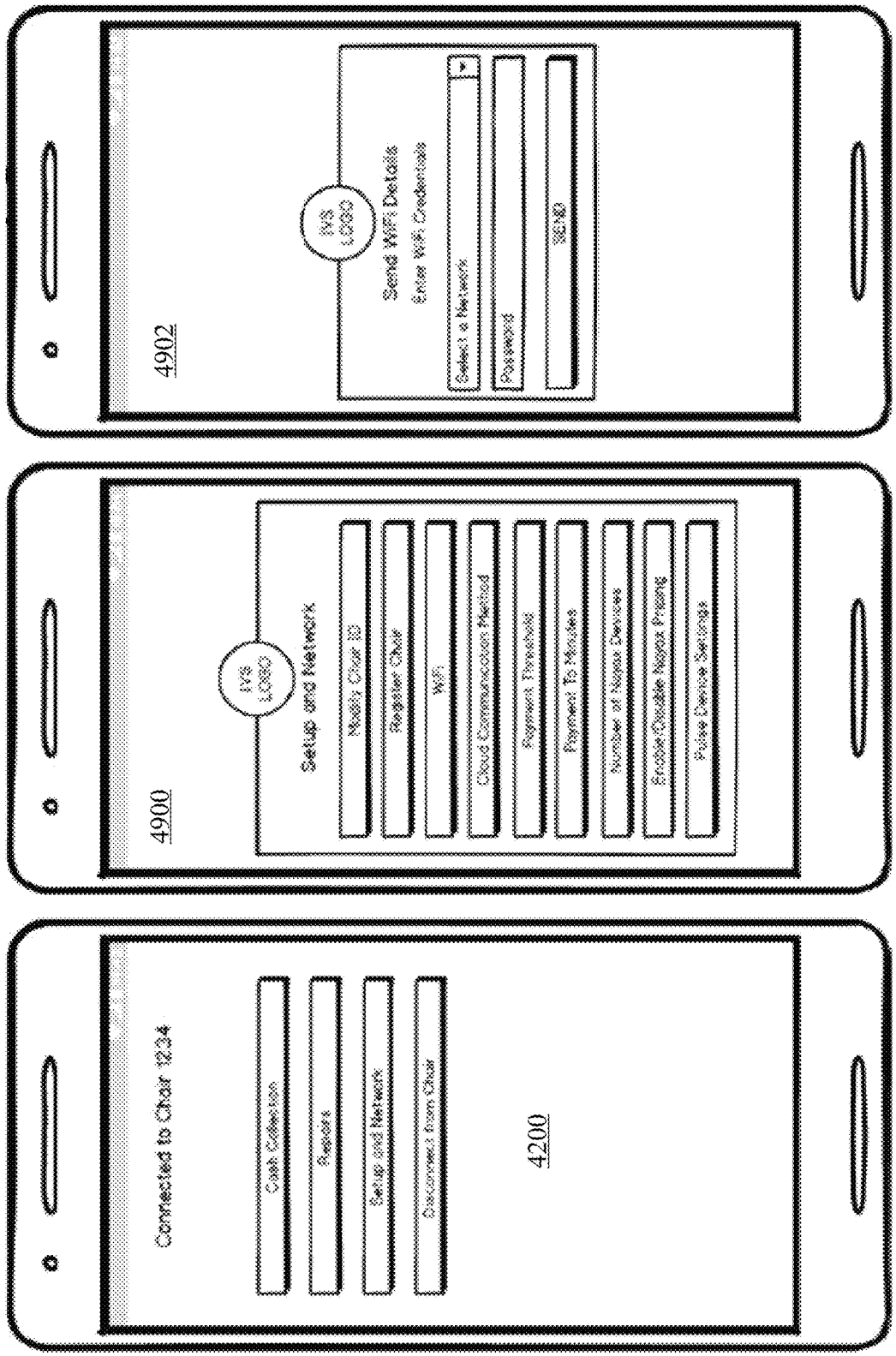
Figure 50:
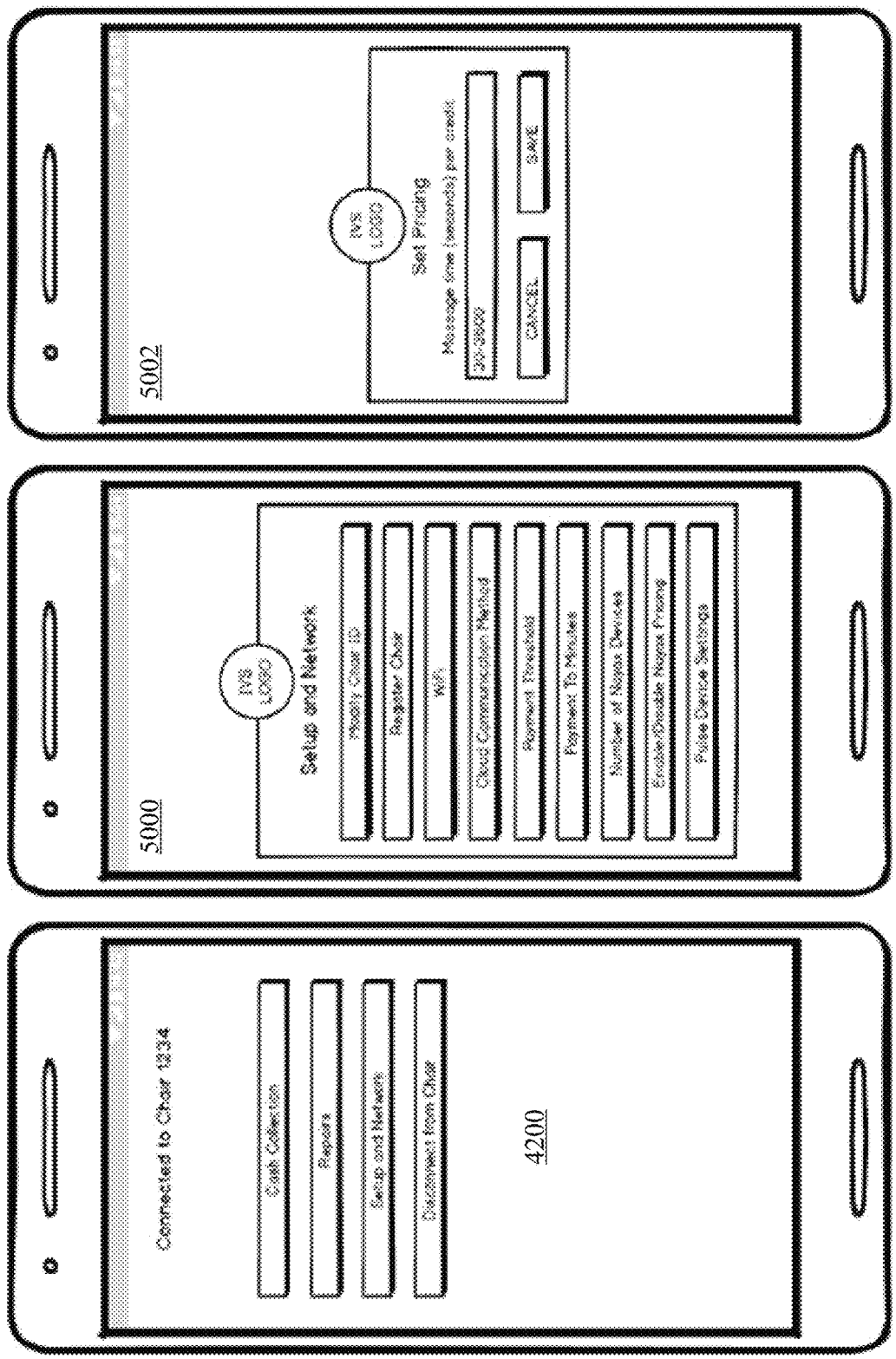

As shown in FIG. 40, the FSR mobile application may be implemented as two applications, namely a Computerized Maintenance Management System (CMMS) application 3900 and a Direct Massage Chair Control (DMCC) application 3902. The CMMS application 3900 is configured to facilitate the logging, management and tracking of maintenance activities. In this regard, the CMMS application 3900 is configured to allow an FSR to modify chair details (e.g., unique identifier and/or location), modify own details (e.g., email address and/or phone number), sign-up for electronic alerts from a given vending massage chair (e.g., email or text massage based alerts), check-in at a site or property, view task summary, view chair details, add/remove/replace parts, update task information, add items to chair task list, and/or check-out of a site or property. The DMCC application 3902 is configured to allow an FSR to set a number of devices, enable/disable device pricing, set a pulse-to-credit conversion, set a cloud communication method, register a massage chair, connect to a massage chair, jog motors, jog pneumatics, remove cash from a payment unit of a massage chair, disable a massage chair, enable a massage chair, set a payment threshold, modify a massage chair identifier, set a payment conversion, and/or disconnect from a massage chair.

The FSR may be required to register with a cloud-based system, and will be prompted for his (her) unique identifier and password when attempting to access the cloud-based system via the applications 3900, 3902. An illustrative GUI 4000 for FSR authentication are provided in FIG. 40.

As noted above, the FSR has the ability to remove cash from a vending massage chair while the vending massage chair is in a maintenance mode. Once the cash is removed, the FSR performs user-software interaction(s) with the DMCC application 3902 to reset a counter of a vending massage chair (e.g., massage chair 100 of FIG. 1) to zero. The counter is for cash present in a cash box of the vending massage chair. Illustrative GUIs 4002, 4004, 4006 for this cash removal function of the DMCC application 3902 are provided in FIG. 40. If the FSR select "No" on GUI 4004, then the DMCC application 3902 will present the previous screen 4002. If the FSR select "Yes" on GUI 4004, then the DMCC application 3902 will present a next screen 4006. If the FSR select "Done" on GUI 4006, then the DMCC application 3902 will cause clearing of a cash positon for the vending massage chair. A clearing of a cash position is defined as setting the previous totals equal to the current totals, and then setting the current totals equal to zero. The current totals and previous totals are read from the vending massage chair once per session when entering a maintenance mode.

As also noted above, the FSR has the ability to register a vending massage chair with the cloud-based system via the DMCC application 3902. This registration establishes the vending massage chair with a datastore (e.g., datastore 410 of FIG. 4). Illustrative GUIs 4100, 4102 for registering a massage chair with the cloud-based system are provided in FIG. 41.

As further noted above, the FSR has the ability to connect a mobile communication device directly to a vending massage chair via the DMCC application 3902. This connection can be established via SRC(s) (e.g., a Bluetooth communication(s)). Once connected, the DMCC application 3902 causes the vending massage chair to transition from a service mode (in which customers can be provided services (such as a massage server) by the vending massage chair) into a maintenance mode (in which customers cannot be provided services by the vending massage chair). While in the maintenance mode, the vending massage chair may not record cash, coin or credit transaction towards the current totals and previous totals. Illustrative GUIs 4200, 4202, 4204 for connecting a mobile communication device to a vending massage chair are provided in FIG. 42.

The FSR may assign and/or modify an identifier for a vending massage chair via the CMMS application 3900. This identifier is displayed on a display of the vending massage chair when a customer is not being serviced thereby. In some scenarios, the vending massage chair identifier comprises a location identifier and a chair identifier. Illustrative GUIs 4300, 4302 for assigning and/or modifying an identifier for a vending massage chair are provided in FIG. 43.

The FSR may cycle the motors of the vending massage chair to observe their function. This motor jogging is facilitated by the DMCC application 3902. An illustrative GUI 4400 for cycling motors of a vending massage chair is provided in FIG. 44.

The FSR may also be able to activate the pneumatic valves of a vending massage chair to observe their functions. This pneumatic valve activation is facilitated by the DMCC application 3902. An illustrative GUI 4500 for cycling motors of a vending massage chair is provided in FIG. 45.

The FSR may be able to disable/enable a vending massage chair via the DMCC application 3902. The vending massage chair is prevented from accepting payment and/or moving motors when the vending massage chair is in a disabled state/condition. The disabled condition may persist even after the FSR's mobile communication device is disconnected from the vending massage chair. The vending massage chair can be transitioned from the disabled state/condition to an enabled state/condition via the DMCC application 3902 when the vending massage chair is in the maintenance mode as opposed to the service mode. An illustrative GUI 4500 for disabling/enabling a vending massage chair is provided in FIG. 45.

The FSR may be able to disconnect his (her) mobile communication device from the vending massage chair (e.g., for ending a Bluetooth session) via the DMCC application 3902. When this disconnection occurs, the vending massage chair automatically transitions from the maintenance mode to the service mode. An illustrative GUI 4600 for disabling/enabling a vending massage chair is provided in FIG. 46.

Figure 51:
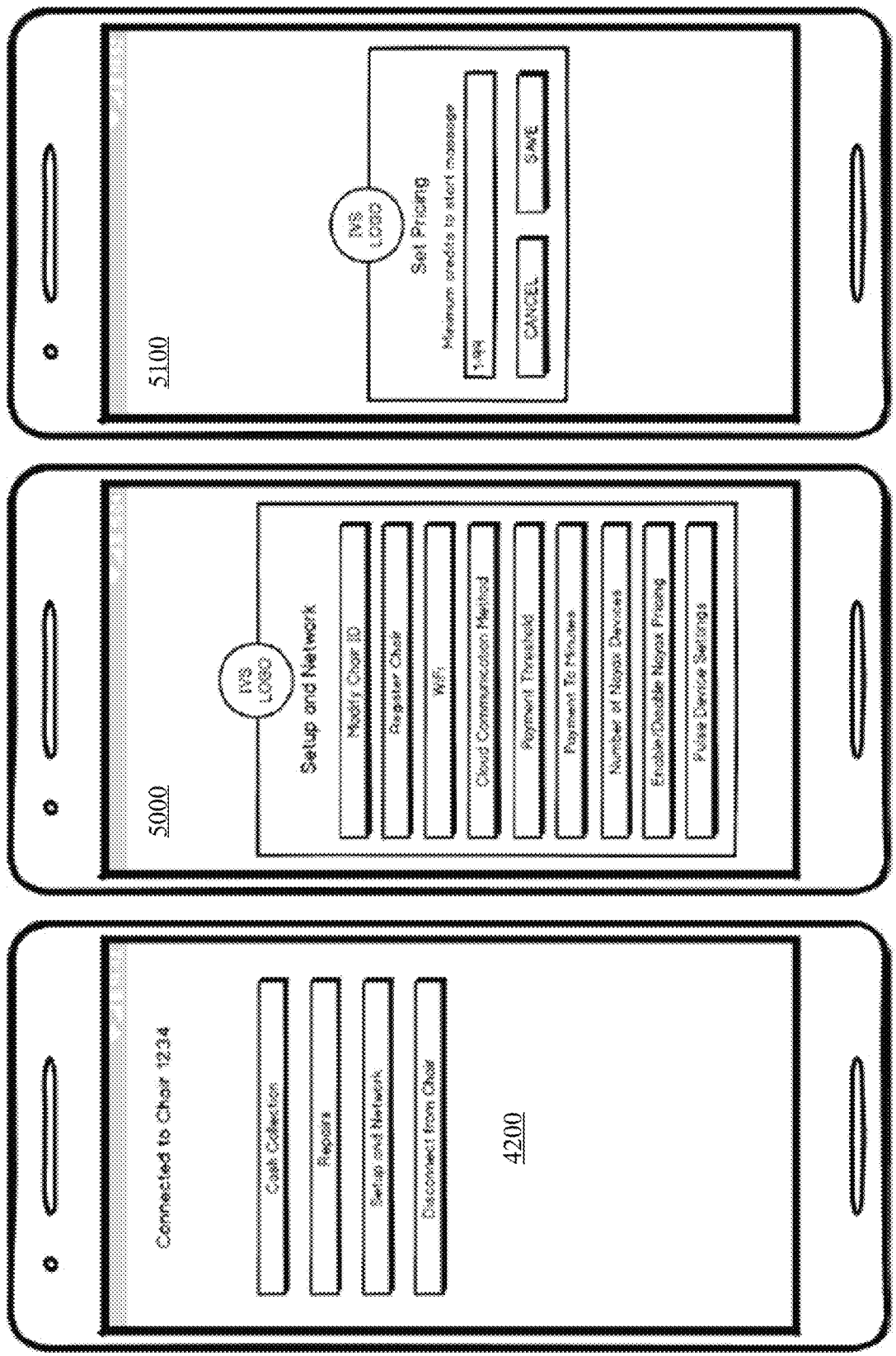
Figure 52:
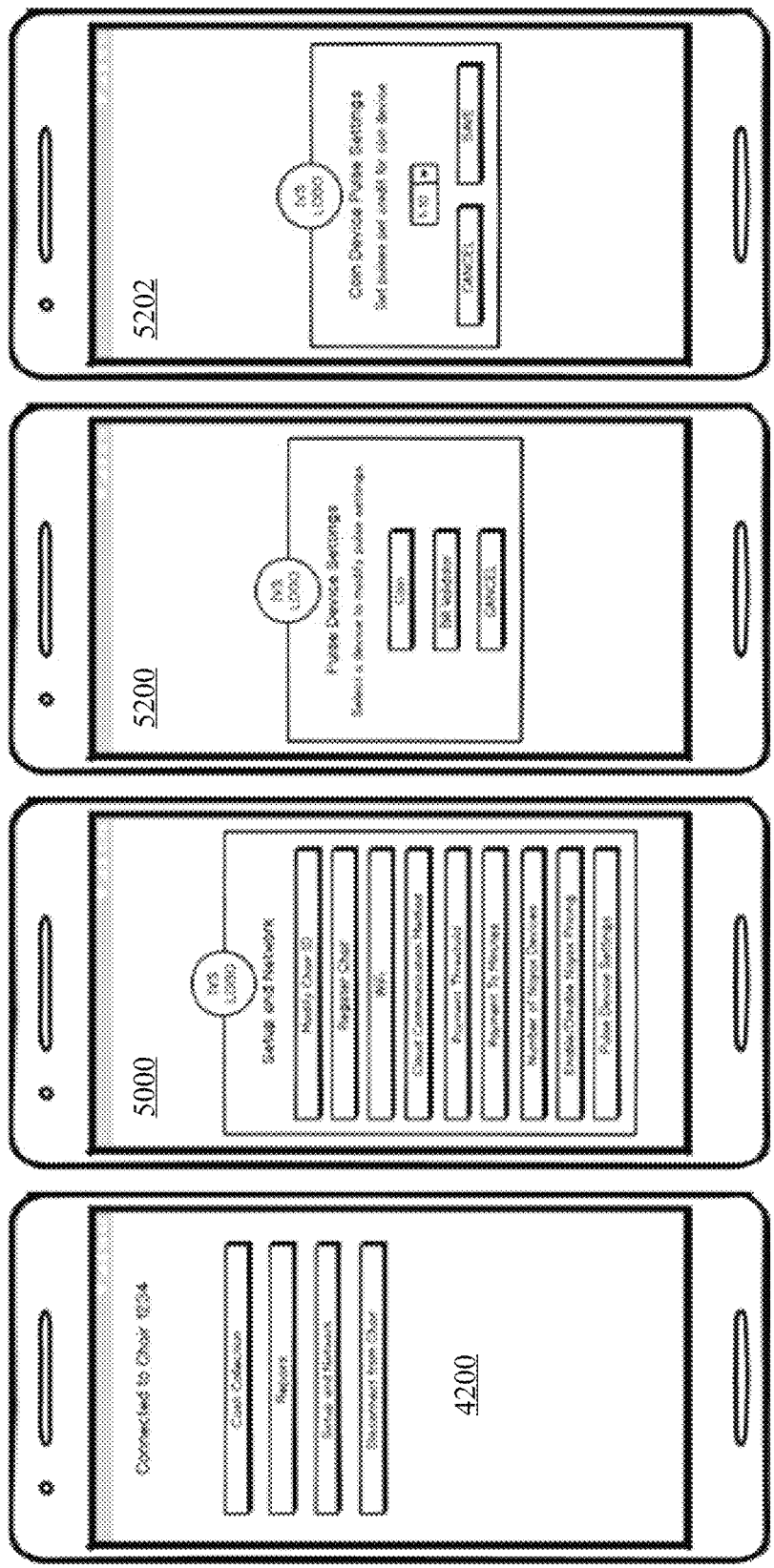
Figure 53:
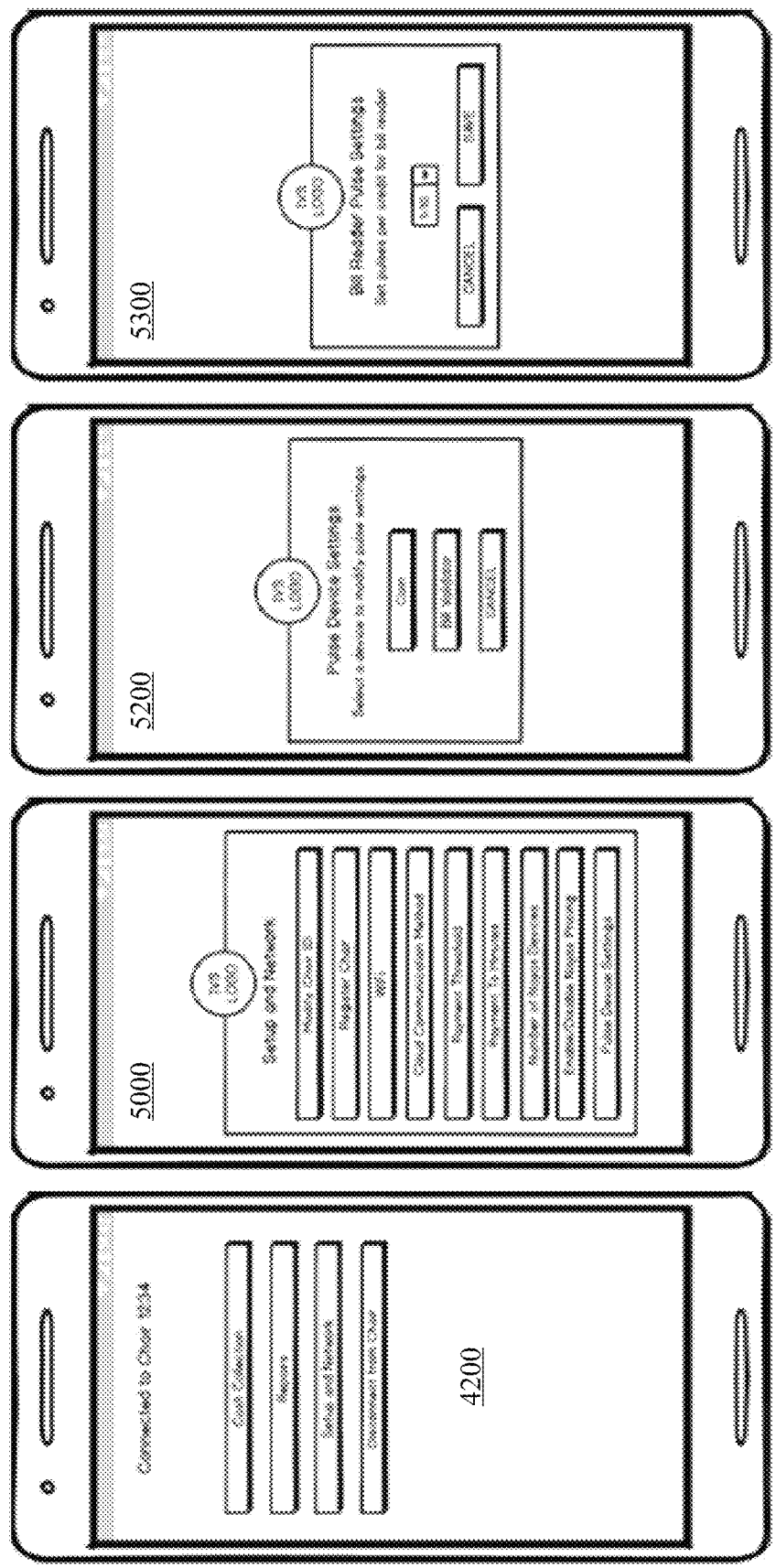
Figure 54:
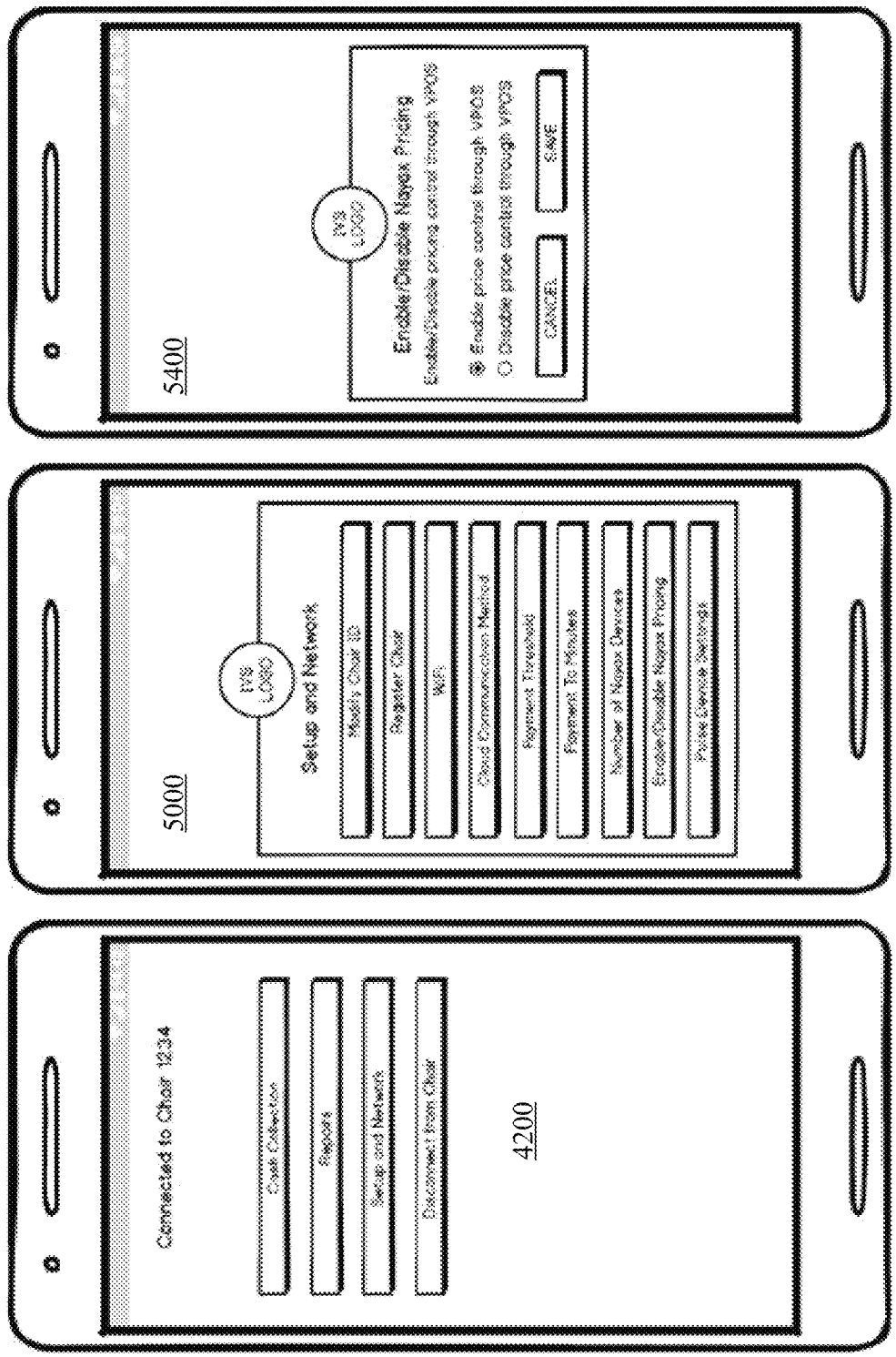

The DMCC application 3902 may also allow the FSR to set the number of devices on a vending massage chair, set a cloud communication method, set WiFi credentials, set a conversion rate between payment device credits and minute of massage time, set a payment threshold, set the conversion rate between pulses and credits for each payment device input, and/or set device pricing. Illustrative GUIs 4700, 4702 for setting a number of devices of a vending massage chair is provided in FIG. 47. Illustrative GUIs 4800, 4802 for setting a cloud communication method for a vending massage chair is provided in FIG. 48. Illustrative GUIs 4900, 4902 to set-up WiFi credentials for a vending massage chair is provided in FIG. 49. Illustrative GUIs 5000, 5002 to set a conversion rate for a vending massage chair is provided in FIG. 50. An illustrative GUI 5100 to set a payment threshold for a vending massage chair is provided in FIG. 51. Illustrative GUIs 5200, 5202, 5300 to set a pulse-to-credit conversion rate for a vending massage chair is provided in FIGS. 52-53. An illustrative GUI 5400 to set device pricing for a vending massage chair is provided in FIG. 54.

Figure 55:
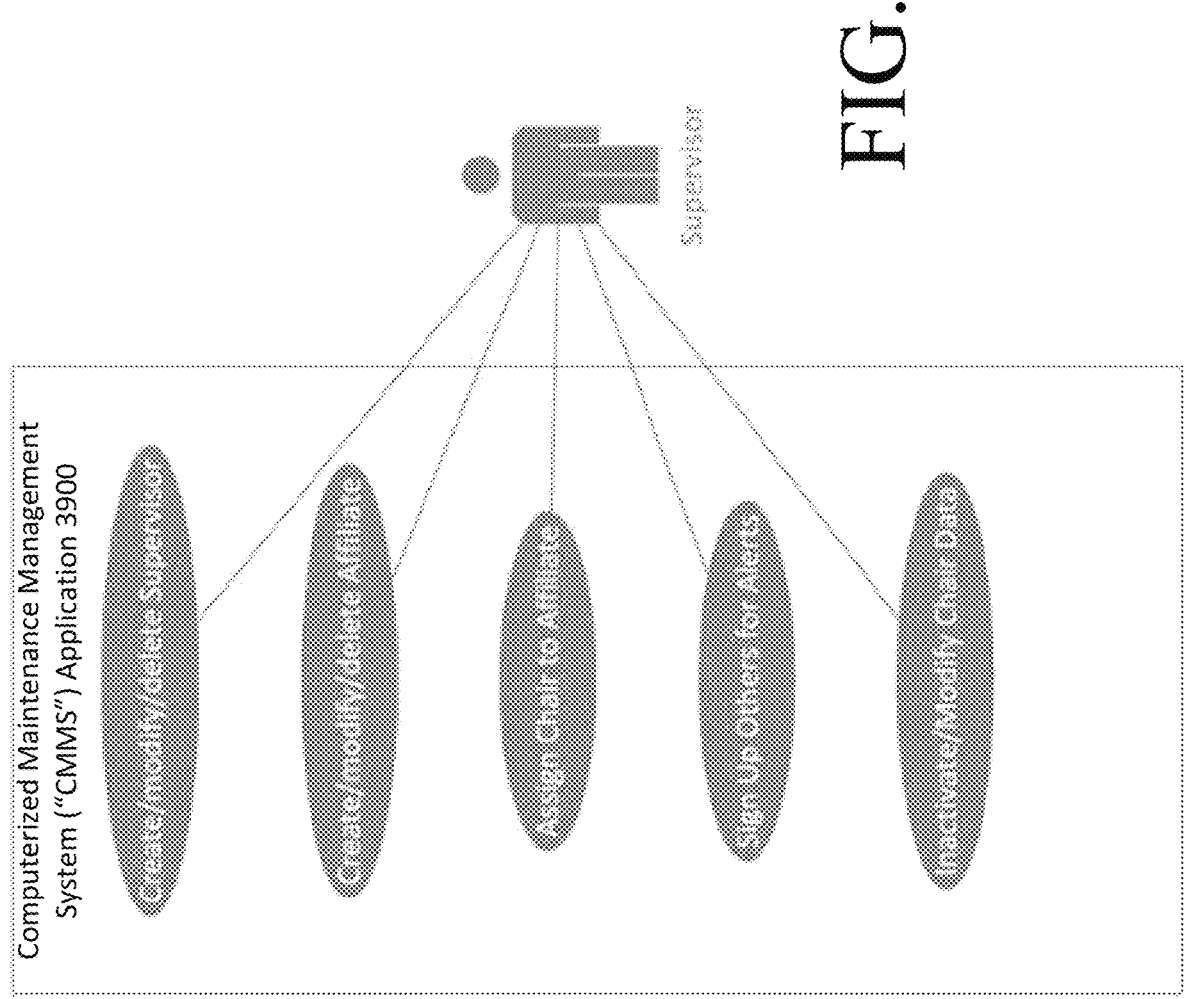

As shown in FIG. 55, the supervisor application is implemented by the CMMS application 3900. The CMMS application 3900 is configured to allow the supervisor to create/modify/delete supervisor information, create/modify/delete affiliate or FSR information, assign a vending massage chair to an affiliate and/or FSR, sign-up people (e.g., FSRs) to receive alerts from given vending massage chairs, activate/inactivate vending massage chairs, and/or modify data associated with vending massage chairs.

Figure 56:
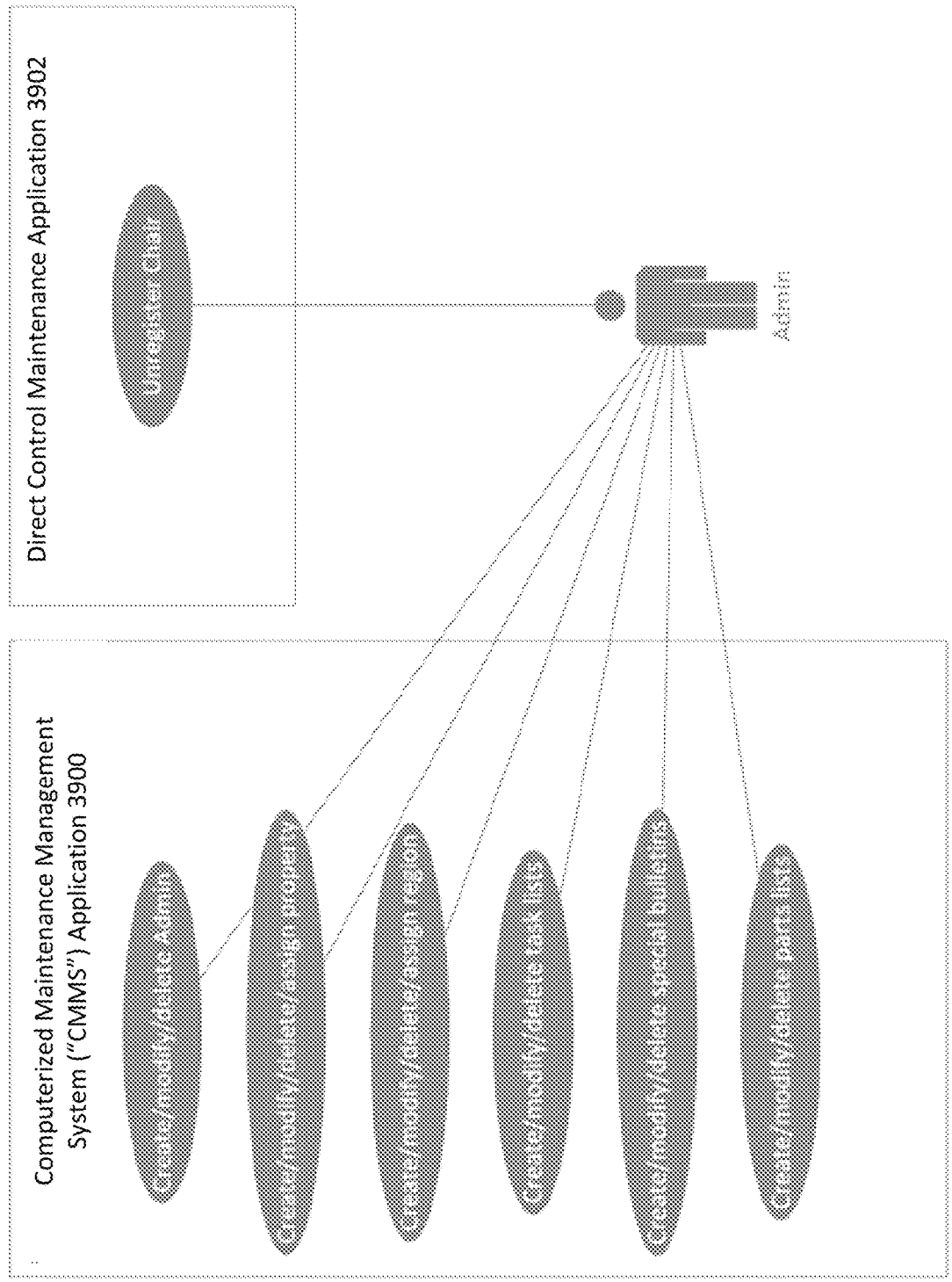

As shown in FIG. 56, the CMMS application 3900 is configured to allow an administrator to create/modify/delete an administrator, create/modify/delete/assign property to an FSR and/or vending massage chair, create/modify/delete assign region to an FSR and/or vending massage chair, create/modify/delete task list, create/modify/delete special bulletin, and/or create/modify/delete parts list. The DMCC application 3902 is configured to allow the administrator to register/unregister vending massage chairs. Once a vending massage chair has been unregistered, the cloud based system will no longer process massages from the vending massage chair, and the consumer mobile application will no longer function with the unregistered vending massage chair.

Figure 57:
FIG. 57 provides a flow diagram of an illustrative method for method for user control of a vending massage chair.

Referring now to FIG. 57, there is provided a flow diagram of an illustrative method 5700 for user control of a vending massage chair (e.g., vending massage chair 100 of FIGS. 1-3). Method 5700 begins with 5702 and continues with 5704 where the vending massage chair detects a mobile communication device (e.g., mobile communication device 402 of FIGS. 4-5) that is located in proximity thereto. This detection can be made via wireless communication technology (e.g., NFC and/or SRC technology) and/or sensor technology (e.g., beam break sensor technology, imaging technology and/or audio technology) of the vending massage chair. In response to a detection that the mobile communication device is proximate to the vending massage chair, the vending massage chair triggers or otherwise initializes operations to relinquish operational control to the mobile communication device, as shown by 5706. Operations for relinquishing control from one device to another device are well known.

In 5708, the vending massage chair receives a wireless signal that was transmitted from the mobile communication device. In response to the reception of the wireless signal, the vending massage chair may perform operations of 5710 and/or 5712. 5710 involves optionally validating an identification of a user who is in possession of the mobile communication device. Methods for validating user and/or device identification(s) are well known. 5712 involves performing operations to relinquish control of massage chair operation(s) to the mobile communication device. Techniques for relinquishing control of a device to another device are well known. The vending massage chair may also cause the mobile device to output haptic feedback to notify the user thereof that control of the vending massage chair has been relinquished to the mobile communication device. The massage chair operation(s) can include, but is (are) not limited to, an operational mode change, a massage service operation, a media service operation, a charging operation, an advertisement operation, a survey operation, or a diagnostic operation. After control has been relinquished, the massage chair operation(s) is (are) performed in 5714 by the vending massage chair in response to a wireless command issued by the mobile communication device.

In 5716, the vending massage chair transmits a wireless signal to cause the mobile communication device to provide haptic feedback. The haptic feedback can be provided to notify the user of initialization, performance, termination and/or completion of the massage chair operation. The haptic feedback can include auditory feedback, visual feedback and/or tactile feedback.

In 5718, the vending massage chair detects an emotional state of a user of the mobile communication device using at least one of AI and/or a machine learning algorithm. The emotional state of the user may be detected based on images captured by a camera of at least one of the vending massage chair and the mobile communication device, audio captured by a microphone of at least one of the vending massage chair and the mobile communication device, and/or information specifying user inputs to the mobile communication device.

Various operations can subsequently be performed by the vending massage chair based on the detected emotional state. Some of these optional operations are shown in 5720-5724. 5720-5724 involve: optionally modifying the massage chair operation(s) based on the detected emotional state of the user; optionally enabling or disabling internal circuit(s) (e.g., charger 212 of FIG. 2, massaging components 206 of FIG. 2, sensor(s) 214 of FIG. 2, speaker 352 of FIG. 3, display 354 of FIG. 3, and/or light device 356 of FIG. 3) responsive to the detected emotional state of the user; and/or generating a recommendation for characteristics of a massage service based on the detected emotional state of the user. The characteristics of the message service can include, but are not limited to, speed, degree of pressure (e.g., gentle or hard), message component movement patterns (e.g., vertical, horizontal or circular), and/or duration(s) (e.g., total duration of a massage service or particular portions of a massager service). The recommendation can be output from the vending massage chair and/or the mobile communication device. The user may perform user-software interactions to accept or decline the recommendation via the user interface(s) of the vending massage chair and/or mobile communication device. Subsequently, 5726 is performed where method 5700 ends or other operations are performed.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for user control of a vending massage chair, comprising:
    detecting, by the vending massage chair, when a mobile communication device is located in proximity to the vending massage chair;
    triggering operations by the vending massage chair to relinquish operational control to the mobile communication device, in response to a detection that the mobile communication device is proximate to the vending massage chair;
    receiving, by the vending massage chair subsequent to said triggering, a wireless signal that was transmitted from the mobile communication device;
    performing operations, by the vending massage chair, to relinquish control of at least one massage chair operation other than a therapeutic service operation and a media service operation to the mobile communication device in response to a reception of the wireless signal;
    performing the at least one massage chair operation by the vending massage chair in response to a wireless command issued by the mobile communication device subsequent to a relinquishment of control to the at least one message chair operation;
    detecting, by the vending message chair, an emotional state of a user of the mobile communication device based on machine learned patterns of user-software interactions therewith indicating respective emotional states with degrees of likelihoods or probabilities;

selecting, by the vending message chair, at least one auxiliary output device of a plurality of auxiliary output devices based on the emotional state of the user that was detected, the plurality of auxiliary output devices being remote from the mobile communication device and configured to facilitate acoustic and visual enhancements to an environment surrounding the vending message chair; and enabling, disabling or causing an operational mode change of the at least one auxiliary output device which was selected.

2. The method according to claim 1, further comprising performing operations by the vending massage chair to validate an identification of the person who is in possession of the mobile communication device.

3. The method according to claim 2, wherein the vending massage chair relinquishes control of the at least one massage chair operation when the identification of the person is validated.

4. The method according to claim 1, further comprising transmitting a wireless signal from the vending massage chair to cause the mobile communication device to provide haptic feedback for notifying a user that the at least one massage chair operation has been initiated, completed or terminated.

5. The method according to claim 1, wherein the at least one massage chair operation comprises an operational mode change to a mode in which the vending massage chair is unable to provide massage services to users, a massage service operation, a media service operation, a charging operation, an advertisement operation, or a survey operation for selection and/or display of surveys.

6. The method according to claim 1, wherein the emotional state of a user of the mobile communication device is further detected using artificial intelligence.

7. The method according to claim 6, further comprising modifying the at least one massage chair operation based on the detected emotional state of the user.

8. The method according to claim 6, wherein the emotional state of the user is detected based on at least one of images captured by a camera of at least one of the vending massage chair and the mobile communication device, and or audio captured by a microphone of at least one of the vending massage chair and the mobile communication device.

9. The method according to claim 6, wherein the plurality of auxiliary output devices comprises at least a light device, a display and a speaker.

10. The method according to claim 1, further comprising generating, by the vending massage chair, a recommendation for characteristics of a massage service based on the detected emotional state of the user.

11. A vending massage chair, comprising:
a processor; and
a non-transitory computer-readable storage medium comprising programming instructions that are configured to cause the processor to implement a method for user control of a vending massage chair, wherein the programming instructions comprise instructions to:
detect when a mobile communication device is located in proximity to the vending massage chair;
trigger a relinquishment of operational control of the vending massage chair to the mobile communication device, in response to a detection that the mobile communication device is proximate to the vending massage chair;
receive, subsequent to said triggering, a wireless signal that was transmitted from the mobile communication device;
perform operations to relinquish control of at least one massage chair operation other than a therapeutic service operation and a media service operation to the mobile communication device in response to a reception of the wireless signal;
cause performance of the at least one massage chair operation by the vending massage chair, in response to a wireless command issued by the mobile communication device subsequent to a relinquishment of control of the at least one massage chair operation;
detect an emotional state of a user of the mobile communication device based on machine learned patterns of user-software interactions therewith indicating respective emotional states with degrees of likelihoods or probabilities;
select at least one auxiliary output device of a plurality of auxiliary output devices based on the emotional state of the user that was detected, the plurality of auxiliary output devices being remote from the mobile communication device and configured to facilitate acoustic and visual enhancements to an environment surrounding the vending massage chair; and
enable, disable or cause an operational mode change of the at least one auxiliary output device which was selected.

12. The vending massage chair according to claim 11, wherein the programming instructions further comprise instructions to validate an identification of the person who is in possession of the mobile communication device.

13. The vending massage chair according to claim 12, wherein the at least one massage chair operation is relinquished to the mobile communication device when the identification of the person is validated.

14. The vending massage chair according to claim 11, wherein the programming instructions further comprise instructions to cause the mobile communication device to provide haptic feedback for notifying a user that the at least one massage chair operation has been initiated, completed or terminated.

15. The vending massage chair according to claim 11, wherein the at least one massage chair operation comprises an operational mode change to a mode in which the vending massage chair is unable to provide massage services to users, an advertisement operation, or a survey operation for a selection and/or display of surveys.

16. The vending massage chair according to claim 11, wherein the emotional state of a user of the mobile communication device is further detected using of artificial intelligence.

17. The vending massage chair according to claim 16, wherein the programming instructions further comprise instructions to modify the at least one massage chair operation based on the detected emotional state of the user.

18. The vending massage chair according to claim 16, wherein the emotional state of the user is detected based on at least one of images captured by a camera of at least one of the vending massage chair and the mobile communication device, and or audio captured by a microphone of at least one of the vending massage chair and the mobile communication device.

19. The vending massage chair according to claim 16, wherein the plurality of auxiliary output devices comprises at least a light device, a display and a speaker.

20. The vending massage chair according to claim 11, wherein the programming instructions further comprise instructions to generate a recommendation for characteristics of a massage service based on the detected emotional state of the user.

\* \* \* \* \*